US011732079B2

(12) United States Patent
Geramita et al.

(10) Patent No.: US 11,732,079 B2
(45) Date of Patent: *Aug. 22, 2023

(54) PREPARATION OF POLYMERIC RESINS AND CARBON MATERIALS

(71) Applicant: Group14 Technologies, Inc., Woodinville, WA (US)

(72) Inventors: Katharine Geramita, Seattle, WA (US); Benjamin E. Kron, Seattle, WA (US); Henry R. Costantino, Woodinville, WA (US); Aaron M. Feaver, Seattle, WA (US); Avery J. Sakshaug, Snohomish, WA (US); Leah A. Thompkins, Seattle, WA (US); Alan Tzu-Yang Chang, Renton, WA (US)

(73) Assignee: GROUP14 TECHNOLOGIES, INC., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,296

(22) Filed: Aug. 12, 2022

(65) Prior Publication Data

US 2022/0389146 A1 Dec. 8, 2022

Related U.S. Application Data

(63) Continuation of application No. 17/860,011, filed on Jul. 7, 2022, which is a continuation of application No. 15/199,318, filed on Jun. 30, 2016, now Pat. No. 11,401,363, which is a continuation of application No. 13/763,448, filed on Feb. 8, 2013, now Pat. No. 9,409,777.

(60) Provisional application No. 61/597,121, filed on Feb. 9, 2012.

(51) Int. Cl.
| | |
|---|---|
| *H01M 4/587* | (2010.01) |
| *C08G 8/22* | (2006.01) |
| *H01G 11/34* | (2013.01) |
| *H01G 11/44* | (2013.01) |
| *H01M 10/0525* | (2010.01) |
| *C01B 32/336* | (2017.01) |
| *C01B 32/05* | (2017.01) |
| *H01M 4/133* | (2010.01) |
| *H01M 4/14* | (2006.01) |
| *H01M 4/36* | (2006.01) |
| *H01M 4/96* | (2006.01) |
| *H01M 10/054* | (2010.01) |
| *H01M 12/08* | (2006.01) |
| *H01M 4/62* | (2006.01) |
| *H01M 10/06* | (2006.01) |
| *H01M 12/06* | (2006.01) |

(52) U.S. Cl.
CPC ............... *C08G 8/22* (2013.01); *C01B 32/05* (2017.08); *C01B 32/336* (2017.08); *H01G 11/34* (2013.01); *H01G 11/44* (2013.01); *H01M 4/133* (2013.01); *H01M 4/14* (2013.01); *H01M 4/36* (2013.01); *H01M 4/587* (2013.01); *H01M 4/96* (2013.01); *H01M 10/054* (2013.01); *H01M 10/0525* (2013.01); *H01M 12/08* (2013.01); *H01M 4/625* (2013.01); *H01M 10/06* (2013.01); *H01M 12/06* (2013.01); *Y02E 60/13* (2013.01)

(58) Field of Classification Search
CPC ............................ H01M 4/587; C01B 32/336
See application file for complete search history.

(56) References Cited

U.S. PATENT DOCUMENTS

| | | | |
|---|---|---|---|
| 2,282,235 A | 5/1942 | Moberly | |
| 3,518,123 A | 6/1970 | Katsoulis et al. | |
| 3,582,288 A | 6/1971 | Taylor et al. | |
| 3,619,428 A | 11/1971 | David | |
| 3,634,028 A * | 1/1972 | Hohne | C10K 1/32 95/135 |
| 3,790,659 A * | 2/1974 | Storp et al. | B01J 21/18 423/230 |
| 3,876,505 A | 4/1975 | Stoneburner | |
| 3,892,580 A | 7/1975 | Messing | |
| 3,977,901 A | 8/1976 | Buzzelli | |
| 4,082,694 A | 4/1978 | Wennerberg et al. | |
| 4,159,913 A | 7/1979 | Birchall et al. | |
| 4,198,382 A | 4/1980 | Matsui | |
| 4,206,095 A | 6/1980 | Wynstra et al. | |
| 4,543,341 A | 9/1985 | Barringer et al. | |
| 4,580,404 A | 4/1986 | Pez et al. | |
| 4,769,197 A | 9/1988 | Kromrey | |

(Continued)

FOREIGN PATENT DOCUMENTS

| | | |
|---|---|---|
| CA | 2176452 A1 | 11/1997 |
| CN | 1762900 A | 4/2006 |

(Continued)

OTHER PUBLICATIONS

"A Basic Guide to Particle Characterization," Malvern Instruments Worldwide—White Paper, Retrieved from the Internet: URL:http://golik.co.il/Data/ABasicGuidtoParticleCharacterization(2)1962085150.pdf, XP55089322A, 2012. (26 Pages).
"Chemical Basics of Polymer Insulation Materials: 3.6 Implementation Method of Stepwise Polymerization," in Changming Li (eds.), *HITP Harbin Institute of Technology Press*, 2007, pp. 73 (With English Translation) (4 Pages).
"Determination of density by volumetric displacement—Skeleton density by gas pycnometry," International Standard 1(ISO 12154):2014, (17 pages).
Abánades et al., "Experimental Analysis of Direct Thermal Methane Cracking," *International Journal of Hydrogen Energy* 36(20):12877-12886, 2011.

(Continued)

*Primary Examiner* — Stuart L Hendrickson
(74) *Attorney, Agent, or Firm* — Seed IP Law Group LLP

(57) ABSTRACT

The present application is directed to methods for preparation of carbon materials. The carbon materials comprise enhanced electrochemical properties and find utility in any number of electrical devices, for example, as electrode material in ultracapacitors or batteries.

20 Claims, 23 Drawing Sheets

(56) References Cited

U.S. PATENT DOCUMENTS

| | | |
|---|---|---|
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,583,162 A | 12/1996 | Li et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,055 A | 1/1999 | Jahnke et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,268,081 B1 | 7/2001 | Clough |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,631,072 B1 | 10/2003 | Paul et al. |
| 6,631,073 B1 | 10/2003 | Sakata et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Markavov et al. |
| 8,361,659 B2 | 1/2013 | Richard |
| 8,366,979 B2 | 2/2013 | Dai et al. |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,734,991 B2 | 5/2014 | Takano et al. |
| 8,797,717 B2 | 8/2014 | Feaver et al. |
| 8,809,230 B2 | 8/2014 | Worsley et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,005,812 B2 | 4/2015 | Ma et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,666,860 B2 | 5/2017 | Lam et al. |
| 9,680,159 B2 | 6/2017 | Feaver et al. |
| 9,704,685 B2 | 7/2017 | Lozano et al. |
| 9,714,172 B2 | 7/2017 | Geramita et al. |
| 9,985,289 B2 | 5/2018 | Costantino et al. |
| 10,008,338 B2 | 6/2018 | Stadermann et al. |
| 10,049,824 B2 | 8/2018 | Tsukada et al. |
| 10,141,122 B2 | 11/2018 | Feaver et al. |
| 10,147,950 B2 | 12/2018 | Sakshaug et al. |
| 10,173,900 B2 | 1/2019 | Ludvik et al. |
| 10,195,583 B2 | 2/2019 | Costantino et al. |
| 10,273,328 B2 | 4/2019 | Kron et al. |
| 10,287,170 B2 | 5/2019 | Feaver et al. |
| 10,361,428 B2 | 7/2019 | Kim et al. |
| 10,454,094 B2 | 10/2019 | Xia et al. |
| 10,454,103 B2 | 10/2019 | Sakshaug et al. |
| 10,490,358 B2 | 11/2019 | Feaver et al. |
| 10,522,836 B2 | 12/2019 | Thompkins et al. |
| 10,590,277 B2 | 3/2020 | Costantino et al. |
| 10,600,581 B2 | 3/2020 | Feaver et al. |
| 10,608,254 B2 | 3/2020 | Sakshaug et al. |
| 10,711,140 B2 | 7/2020 | Costantino et al. |
| 10,714,744 B2 | 7/2020 | Sakshaug et al. |
| 10,756,347 B2 | 8/2020 | Sakshaug et al. |
| 10,763,501 B2 | 9/2020 | Feaver et al. |
| 10,784,512 B2 | 9/2020 | Sakshaug et al. |
| 10,814,304 B2 | 10/2020 | Costantino et al. |
| 10,923,722 B2 | 2/2021 | Sakshaug et al. |
| 11,174,167 B1 | 11/2021 | Dhanabalan et al. |
| 11,335,903 B2 | 5/2022 | Costantino et al. |
| 11,401,363 B2 | 8/2022 | Geramita et al. |
| 11,437,621 B2 | 9/2022 | Sakshaug et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0075627 A1 | 6/2002 | Shinozaki et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0013804 A1 | 1/2003 | Phillips et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0010090 A1 | 1/2004 | Chino et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa |
| 2004/0180264 A1 | 9/2004 | Honbo et al. |
| 2004/0182711 A1 | 9/2004 | Liang et al. |

(56) References Cited

U.S. PATENT DOCUMENTS

| | | |
|---|---|---|
| 2004/0201567 A1 | 10/2004 | Yu et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0253220 A1 | 11/2005 | Lin et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0078682 A1 | 4/2006 | McDaniel et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |
| 2007/0167534 A1 | 7/2007 | Coronado et al. |
| 2008/0011986 A1 | 1/2008 | Yamakawa et al. |
| 2008/0044726 A1 | 2/2008 | Feng et al. |
| 2008/0107804 A1 | 5/2008 | Kondo |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0277115 A1 | 11/2008 | Rediger et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0253248 A1 | 10/2009 | Sun et al. |
| 2009/0286160 A1 | 11/2009 | Kozono et al. |
| 2009/0301972 A1 | 12/2009 | Hines et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0092778 A1 | 4/2010 | Watanabe et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0163791 A1 | 7/2010 | Fukui et al. |
| 2010/0213104 A1* | 8/2010 | Hughes ............... B01J 20/0266 208/293 |
| 2010/0215563 A1 | 8/2010 | Yambayashi |
| 2010/0256298 A1 | 10/2010 | Wu et al. |
| 2010/0279172 A1 | 11/2010 | Hwang et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0281180 A1 | 11/2011 | Kim et al. |
| 2011/0287189 A1 | 11/2011 | Shembel |
| 2011/0300447 A1 | 12/2011 | Archer |
| 2011/0311873 A1 | 12/2011 | Schultz et al. |
| 2012/0045685 A1 | 2/2012 | Seki et al. |
| 2012/0129049 A1 | 5/2012 | Rayner |
| 2012/0156493 A1 | 6/2012 | Maisels et al. |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0082213 A1 | 4/2013 | Duncan et al. |
| 2013/0169238 A1 | 7/2013 | Rojeski |
| 2013/0189472 A1 | 7/2013 | Takaoka |
| 2013/0189575 A1 | 7/2013 | Anguchamy et al. |
| 2013/0196158 A1 | 8/2013 | Yoshida et al. |
| 2013/0209348 A1 | 8/2013 | Ludvik et al. |
| 2013/0211005 A1 | 8/2013 | Ludvik et al. |
| 2013/0244862 A1 | 9/2013 | Ivanovici et al. |
| 2013/0252082 A1 | 9/2013 | Thompkins et al. |
| 2013/0295462 A1 | 11/2013 | Atanassova et al. |
| 2013/0337334 A1 | 12/2013 | Tao et al. |
| 2013/0344363 A1 | 12/2013 | Upadhyaya |
| 2013/0344391 A1 | 12/2013 | Yushin et al. |
| 2014/0038042 A1 | 2/2014 | Rios et al. |
| 2014/0057179 A1 | 2/2014 | Yushin et al. |
| 2014/0148560 A1 | 5/2014 | Qureshi et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0087731 A1 | 3/2015 | Dong et al. |
| 2015/0155546 A1 | 6/2015 | Yushin et al. |
| 2015/0162603 A1 | 6/2015 | Yushin et al. |
| 2015/0207148 A1 | 7/2015 | Kimura et al. |
| 2015/0238917 A1 | 8/2015 | Mulik et al. |
| 2015/0306570 A1 | 10/2015 | Mayes et al. |
| 2016/0010250 A1 | 1/2016 | Taninaka et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0316888 A1 | 11/2017 | Geramita et al. |
| 2018/0097240 A1 | 4/2018 | Feaver et al. |
| 2018/0294484 A1 | 10/2018 | Fredrick et al. |
| 2019/0088931 A1 | 3/2019 | Abrahamson et al. |
| 2019/0097222 A1 | 3/2019 | Feaver et al. |
| 2019/0103608 A1 | 4/2019 | Costantino et al. |
| 2019/0144287 A1 | 5/2019 | Park et al. |
| 2019/0259546 A1 | 8/2019 | Kron et al. |
| 2020/0020935 A1 | 1/2020 | Costantino et al. |
| 2020/0048098 A1 | 2/2020 | Feaver et al. |
| 2020/0144619 A1 | 5/2020 | Hamilton et al. |
| 2020/0259178 A1 | 8/2020 | Chang et al. |
| 2020/0259181 A1 | 8/2020 | Thompkins et al. |
| 2020/0280070 A1 | 9/2020 | Sakshaug et al. |
| 2020/0290882 A1 | 9/2020 | Fredrick et al. |
| 2021/0054213 A1 | 2/2021 | Costantino et al. |
| 2021/0057736 A1 | 2/2021 | Feaver et al. |
| 2021/0126251 A1 | 4/2021 | Sakshaug et al. |

(56) References Cited

U.S. PATENT DOCUMENTS

| | | | |
|---|---|---|---|
| 2021/0175498 | A1 | 6/2021 | Feaver et al. |
| 2021/0237029 | A1 | 8/2021 | Costantino et al. |
| 2021/0276875 | A1 | 9/2021 | Mason et al. |
| 2022/0055905 | A1 | 2/2022 | Dhanabalan et al. |
| 2022/0055906 | A1 | 2/2022 | Costantino et al. |
| 2022/0059818 | A1 | 2/2022 | Dhanabalan et al. |
| 2022/0064008 | A1 | 3/2022 | Dhanabalan et al. |
| 2022/0074045 | A1 | 3/2022 | Yilmaz et al. |
| 2022/0246914 | A1 | 8/2022 | Costantino et al. |

FOREIGN PATENT DOCUMENTS

| | | |
|---|---|---|
| CN | 1877888 A | 12/2006 |
| CN | 1986401 A | 6/2007 |
| CN | 101284665 A | 10/2008 |
| CN | 101292389 A | 10/2008 |
| CN | 101318648 A | 12/2008 |
| CN | 101604743 A | 12/2009 |
| CN | 101292389 B | 9/2010 |
| CN | 101969120 A | 2/2011 |
| CN | 102214817 A | 10/2011 |
| CN | 102623680 A | 8/2012 |
| CN | 102820455 A | 12/2012 |
| CN | 103094528 A | 5/2013 |
| CN | 103456929 A | 12/2013 |
| CN | 103746098 A | 4/2014 |
| CN | 104108698 A | 10/2014 |
| CN | 102509781 B | 11/2015 |
| CN | 105680023 A | 6/2016 |
| CN | 106207108 A | 12/2016 |
| DE | 102014211012 A1 | 12/2015 |
| EP | 0 126 191 A2 | 11/1984 |
| EP | 0 649 815 A1 | 4/1995 |
| EP | 0 861 804 A1 | 9/1998 |
| EP | 0 891 943 A1 | 1/1999 |
| EP | 1 049 116 A1 | 11/2000 |
| EP | 1 052 716 A2 | 11/2000 |
| EP | 1 514 859 A2 | 3/2005 |
| EP | 2 117 068 A1 | 11/2009 |
| EP | 2 330 676 A1 | 6/2011 |
| EP | 2 983 186 A1 | 2/2016 |
| JP | 2-300222 A | 12/1990 |
| JP | 3-90615 A | 4/1991 |
| JP | H3-137010 A | 6/1991 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-311512 A | 11/1993 |
| JP | 5-320955 A | 12/1993 |
| JP | 8-59919 A | 3/1996 |
| JP | 8-112539 A | 5/1996 |
| JP | 9-63905 A | 3/1997 |
| JP | 9-275042 A | 10/1997 |
| JP | 10-297912 A | 11/1998 |
| JP | 2001-89119 A | 4/2001 |
| JP | 2001-278609 A | 10/2001 |
| JP | 2003-303588 A | 10/2003 |
| JP | 2004-67498 A | 3/2004 |
| JP | 2004-203715 A | 7/2004 |
| JP | 2004-221332 A | 8/2004 |
| JP | 2004-315283 A | 11/2004 |
| JP | 2005-132696 A | 5/2005 |
| JP | 2005-136397 A | 5/2005 |
| JP | 2005-187320 A | 7/2005 |
| JP | 2006-117475 A | 5/2006 |
| JP | 2006-248848 A | 9/2006 |
| JP | 2006-264993 A | 10/2006 |
| JP | 2007-039289 A | 2/2007 |
| JP | 2007-115749 A | 5/2007 |
| JP | 2008-7387 A | 1/2008 |
| JP | 2008-8539 A | 1/2008 |
| JP | 2008-94925 A | 4/2008 |
| JP | 2009-259803 A | 11/2009 |
| JP | 5339107 B1 | 11/2013 |
| JP | 2015-130287 A | 7/2015 |
| JP | 5796263 B1 | 10/2015 |
| JP | 2016-27222 A | 2/2016 |
| JP | 2016-100225 A | 5/2016 |
| JP | 2016-100226 A | 5/2016 |
| JP | 2016-132608 A | 7/2016 |
| KR | 10-2004-0080010 A | 9/2004 |
| KR | 10-2007-0030881 A | 3/2007 |
| KR | 10-2011-0130628 A | 12/2011 |
| KR | 10-2014-0112451 A | 9/2014 |
| WO | 95/01165 A1 | 1/1995 |
| WO | 02/39468 A2 | 5/2002 |
| WO | 2004/087285 A1 | 10/2004 |
| WO | 2004/099073 A2 | 11/2004 |
| WO | 2005/043653 A1 | 5/2005 |
| WO | 2009/032104 A2 | 3/2009 |
| WO | 2010/138760 A2 | 12/2010 |
| WO | 2011/157013 A1 | 12/2011 |
| WO | 2022/035879 A1 | 2/2022 |
| WO | 2022/040327 A1 | 2/2022 |
| WO | 2022/040328 A1 | 2/2022 |
| WO | 2022/067030 A1 | 3/2022 |
| WO | 2022/072715 A1 | 4/2022 |

OTHER PUBLICATIONS

Abraham et al., "A Polymer Electrolyte-Based Rechargeable Lithium/Oxygen Battery," *J. Electrochem. Soc.* 143(1):1-5, Jan. 1996.
Alcañiz-Monge et al., "Methane Storage in Activated Carbon Fibres," *Carbon* 35(2):291-297, 1997.
Alias et al., "Silicon/graphite nanocomposite electrodes prepared by low pressure chemical vapor deposition," *Journal of Power Sources* 174:900-904, 2007.
Al-Muhtaseb et al., "Preparation and Properties of Resourcinol Formaldehyde Organic and carbon Gels," *Advanced Materials* 15(2):101-114, 2003.
Anderegg, "Grading Aggregates: II—The Application of Mathematical Formulas to Mortars," *Industrial and Engineering Chemistry* 23(9):1058-1064, 1931.
Andreasen et al., "Ueber die Beziehung zwischen Komabstufung und Zwischenraum in Produkten aus losen Körnern (mit einigen Experimenten)," *Kolloid-Zeitschrift* 50(3):217-228, Mar. 1930, with translation of summary. (17 pages).
Babić et al., "Carbon cryogel as support of platinum nano-sized electrocatalyst for the hydrogen oxidation reaction," *Electrochimica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," Weinheim, Wiley-VCH, Weinheim, New York, 398-401, Dec. 31, 1999.
Bock et al., "Structural Investigation of Resorcinol Formaldehyde and Carbon Aerogels Using SAXS and BET," *Journal of Porous Materials* 4:287-294, 1997.
Buiel et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.
Cao et al., "Li-ion capacitors with carbon cathode and hard carbon/stabilized lithium metal powder anode electrodes," *Journal of Power Sources* 213:180-185, Apr. 2012.
Chmiola et al., "Anomalous Increase in Carbon Capacitance at Pore Sizes Less Than 1 Nanometer," *Science* 313:1760-1763, Sep. 22, 2006.

(56) References Cited

OTHER PUBLICATIONS

Conway et al., "Partial Molal Volumes of Tetraalkylammonium Halides and Assignment of Individual Ionic Contributions," *Trans. Faraday Soc.* 62:2738-2749, 1966.
Coppey et al., "Fluidized Bed Chemical Vapor Deposition of Silicon on Carbon Nanotubes for Li-Ion Batteries," *Journal of Nanoscience and Nanotechnology* 11(9):8392-8395, 2011.
Czakkel et al., "Influence of drying on the morphology of resorcinol-formaldehyde-based carbon gels," *Microporous and Mesoporous Materials* 86:124-133, 2005.
Débart et al., "α-MnO2 Nanowires: A Catalyst for the O2 Electrode in Rechargeable Lithium Batteries," *Agnew. Chem. Int. Ed.* 47:4521-4524, 2008.
Ding et al., "How Conductivities and Viscosities of PC-DEC and PC-EC Solutions of LiBF4, LiPF6, LiBOB, Et4NBF4, and Et4NBF6 Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Fotouhi et al., "A Low Cost, Disposable Cable-Shaped Al-Air Battery for Portable Biosensors," *J. Micromech. Microeng.* 26:055011, 2016, (8 pages).
Fraas, "Using vibrations in fluidized beds for processes that do not require a high flow rate of sweep gas, the complex-mode vibration fluidized bed offers lower power needs, attrition rates, and elutriation rates than gas-fluidized beds or rotary kilns," *Mechanical Engineering*:76-79, Jan. 7, 1998.
Furnas, "Grading Aggregates I—Mathematical Relations for Beds of Broken Solids of Maximum Density," *Industrial and Engineering Chemistry* 23(9):1052-1058, 1931.
Gao et al., "Nitrogen-rich graphene from small molecules as high performance anode material," *Nanotechnology* 25:415402, 2014, 8 pages.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hogness et al. "The Thermal Decomposition of Silane," *J. Am. Chem. Soc.* 58(1):108-112, 1936.
Hong et al., "Hydrogen evolution inhibition with diethylenetriamine modification of activated carbon for a lead-acid battery," *RSC Adv.* 4:33574-33577, 2014.
Hsieh et al., "Synthesis of mesoporous carbon composite and its electric double-layer formation behavior," *Microporous andMesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Huang et al., "Nitrogen-containing mesoporous carbons prepared from melamine formaldehyde resins with $CaCl_2$ as a template," *J. Colloid Interface Sci.* 363(1):193-198, 2011.
Hwang et al., "Capacitance control of Carbon Aerogel Electrode," *Journal of Non-Crystalline Solids* 347(1-3):238-245, 2004.
Indo German Carbons Limited, "Activated Carbon," Apr. 2009, URL=http://www.igcl.com/php/activated_carbon.php, download date Nov. 29, 2018, 3 pages.
Inomata et al., "Natural gas storage in activated carbon pellets without a binder," *Carbon* 40:87-93, 2002.
Job et al., "Carbon aerogels, cryogels and xerogels: Influence of the drying method on the textural properties of porous carbon materials," *Carbon* 43:2481-2494, 2005.
Job et al., "Highly dispersed platinum catalysts prepared by impregnation of texture-tailored carbon xerogels," *Journal of Catalysis* 240:160-171, 2006.
Job et al., "Synthesis of transition metal-doped carbon xerogels by solubilization of metal salts in resorcinol-formaldehyde aqueous solution," *Carbon* 42:3217-3227, 2004.
Katsaros et al., "Preparation and characterisation of gas selective microporous carbobn membranes," *Microporous andMesoporous Materials* 99:181-189, 2007.
Kim et al., "Correlation between the capacitor performance and pore structure," *Tanso* 221:31-39, 2006 (English Abstract).
Kim et al., "Adsorption of phenol and reactive dyes from aqueous solution on carbon cryogel microspheres with controlled porous structure," *Microporous and Mesoporous Materials* 96:191-196, 2006.
Kocklenberg et al., "Texture control of freeze-dried resorcinol-formaldehyde gels," *Journal of Non-Crystalline Solids* 225:8-13, 1998.
Kowalczyk et al., "Estimation of the pore-size distribution function from the nitrogen adsorption isotherm. Comparison of density functional theory and the method of Do and co-workers," *Carbon* 47:1113-1125, 2003.
Lee et al., "Synthesis of Resorcinol/Formaldehyde Gel Particles by the Sol-Emulsion Gel Technique," *Material Letters* 37(4-5):197-200, 1998.
Lozano-Castelló et al., "Influence of pore structure and surface chemistry on electric double layer capacitance in non-aqueous electrolyte," *Carbon* 47:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci.* 5:9363-9373, 2012.
Nishihara et al., "Preparation of resorcinol-formaldehyde carbon cryogel microhoneycombs," *Carbon* 42:899-901, 2004.
Ogasawara et al., "Rechargeable LI2O2 Electrode for Lithium Batteries," *Journal of the American Chemical Society* 128(4):1390-1393, 2006.
Otowa et al., "Production and adsorption characteristics of MAXSORB: High-surface-area active carbon," *Gas Separation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.

(56) References Cited

OTHER PUBLICATIONS

Pimenta et al., "Studying disorder in graphite-based systems by Raman spectroscopy," *Phys. Chem. Chem. Phys.* 9:1276-1291, 2007.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from N2, Ar, and CO2 Adsorption Isotherms," *Langmuir* 16:2311-2320, 2000.
Read, "Ether-Based Electrolytes for the Lithium/Oxygen Organic Electrolyte Battery," *J. Electrochem. Soc.* 153(1):A96-A100, 2006.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between a High Resolution αs-Plot and the Pore Size Distribution for Activated Carbon," *Carbon* 36(10):1459-1467, 1998.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 47:2981-2990, 2003.
Toyo Tanso Carbon Products, "Special Graphite and Compound Material Products," Toyo Tanso Co., Ltd. Catalog published 2008.
Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
Webb, "Volume and Density Determinations for Particle Technologists," Micromeritics Instrument Corp., Feb. 16, 2001, Retrieved from http://www.micormeritics.com/pdf/app_articles/density_determinations.pdf (15 pages).
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Woo et al., "Silicon Embedded Nanoporous Carbon Composite for the Anode of Li Ion Batteries," *Journal of the Electrochemical Society* 159(8):A1273-A1277, 2012.
Wu et al., "Fabrication and nano-structure control of carbon aerogels via a microemulsion-templated sol-gel polymerization method," *Carbon* 44:675-681, 2006.
Xiang et al., "Beneficial effects of activated carbon additives on the performance of negative lead-acid battery electrode for high-rate partial-state-of-charge operation," *Journal of Power Sources* 241:150-158, 2013.
Xie et al., "Pore size control of Pitch-based activated carbon fibers by pyrolytic deposition of propylene," *Applied Surface Science* 250:152-160, 2005.
Xu et al., "Comparison of sizing small particles using different technologies," *Powder Technology* 132:145-153, 2003.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Porous properties of carbon gel microspheres as adsorbents for gas separation," *Carbon* 42:1671-1676, 2004.
Yamamoto et al., "Control of mesoporosity of carbon gels prepared by sol-gel polycondensation and freeze drying," *Journal of Non-Crystalline Solids* 288:46-55, 2001.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte Li/O2 battery," *Journal of Power Sources* 195:1235-1240, 2010.
Zhao et al., "Highly-Ordered Mesoporous Carbon Nitride with Ultrahigh Surface Area and Pore Volume as a Superior Dehydrogenation Catalyst," *Chem. Mater.* 26(10):3151-3161, 2014.

\* cited by examiner

PREPARATION OF POLYMERIC RESINS AND CARBON MATERIALS

CROSS-REFERENCE TO RELATED APPLICATION

This application is a continuation application of U.S. patent application Ser. No. 17/860,011, filed Jul. 7, 2022, which is a continuation application of U.S. patent application Ser. No. 15/199,318, filed Jun. 30, 2016, now U.S. Pat. No. 11,401,363, which is a continuation application of U.S. patent application Ser. No. 13/763,448, filed Feb. 8, 2013, now U.S. Pat. No. 9,409,777, which claims priority to U.S. Provisional Application No. 61/597,121, filed Feb. 9, 2012, the disclosure of which, along with all documents cited therein, is incorporated by reference in its entirety.

BACKGROUND

Technical Field

The present invention generally relates to novel methods for preparing polymeric resin materials and preparation of carbon materials from the same.

Description of the Related Art

Activated carbon is commonly employed in electrical storage and distribution devices. The surface area, conductivity and porosity of activated carbon allows for the design of electrical devices having desirable electrochemical performance. Electric double-layer capacitors (EDLCs or "ultracapacitors") are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly used in electric vehicles such as electric cars, trains, buses and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles and/or upon aging. This decreased performance has been attributed, at least in part, to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

In addition to purity, another known limitation of carbon-containing electrical devices is the pore structure of the activated carbon itself. While activated carbon materials typically comprise high porosity, the pore size distribution is not optimized for use in electrical energy storage and distribution devices. Such optimization may include a blend of both micropores and mesopores. Additionally in some applications a high surface area carbon may be desirable, while in others a low surface are material is preferred. Idealized pore size distributions can maximize performance attributes including but not limited to, increased ion mobility (i.e., lower resistance), increased power density, improved volumetric capacitance, increased cycle life efficiency of devices prepared from the optimized carbon materials.

One common method for producing carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in a carbon material having an unoptimized pore structure and an ash content (e.g., metal impurities) of 1% or higher.

Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. However, such chemical activation also produces an activated carbon material not suitable for use in high performance electrical devices.

Another approach for producing high surface area activated carbon materials is to prepare a synthetic polymer from carbon-containing organic building blocks (e.g., a polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. Although such methods may be applicable in laboratory or small-scale settings, preparation of large quantities of carbon materials via synthetic polymers may be limited at large scales. For example, the solid polymer gel monoliths generally obtained may be difficult to work with (e.g., transfer from one vessel to another, milling, grinding, etc.) at the scales needed for industrial applicability, and the exothermic nature of the polymerization may be difficult to control. Accordingly, methods for preparation of high grade carbon materials that are applicable to large scale-scale syntheses are needed.

While significant advances have been made in the field, there continues to be a need in the art for improved methods for preparation of high purity carbon materials comprising an optimized pore structure for use in electrical energy storage devices. The present invention fulfills these needs and provides further related advantages.

BRIEF SUMMARY

In general terms, the current invention is directed to novel methods for preparation of carbon materials comprising an optimized pore structure. The methods generally comprise preparation of a mixture of polymer precursors (i.e., a polymer phase) and a continuous phase and allowing the polymer precursors (e.g., resorcinol and formaldehyde) to polymerize. The mixture may be an emulsion and/or a suspension. The resulting polymer can then optionally be converted to carbon materials by any number of post-processing procedures, including pyrolysis and/or activation. Advantageously, the present inventors have discovered that the presently disclosed methods allow for preparation of polymer gels (e.g., condensation polymer gels) and carbon materials at commercially relevant scales, and physical properties such as the pore structure and particle size of the gels and carbon materials can be controlled through optimization of the process parameters (e.g., continuous phase selections, etc.).

Accordingly, in one embodiment the present disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises a surfactant in a concentration equal to or greater than the critical micelle concentration and the volume average particle size (Dv,50) of the polymer particles is less than or equal to 1 mm.

In another embodiment, the disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is less than or equal to 1 mm.

In still other embodiments, the disclosure is directed to a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is greater than or equal to 1 mm.

In some embodiments of the foregoing methods, the Dv,50 of the polymer particles is less than or equal to 0.5 mm. For example, in certain embodiments the Dv,50 of the polymer particles is less than or equal to 0.1 mm.

In still other embodiments of some of the foregoing methods, the Dv,50 of the polymer particles is less than or equal to 2 mm. For example, in certain embodiments the Dv,50 of the polymer particles is greater than or equal to 4 mm.

In other embodiments of the foregoing, the carrier fluid comprises one or more vegetable oils, one or more minerals oils having from about 15 to about 40 carbon atoms, one or more chlorinated hydrocarbons, one or more paraffinic oils, or any combination thereof.

In more embodiments, the monomer component is an aqueous mixture comprising the one or more phenolic compounds and one or more catalysts. For example, in some embodiments the one or more catalysts comprises an organic acid. In other embodiments, the one or more catalysts comprises a volatile basic salt. In still other embodiments, the one or more catalysts comprises a volatile basic salt and comprises an organic acid. For example, in certain embodiments the volatile basic salt is ammonium carbonate, ammonium bicarbonate, ammonium acetate, or ammonium hydroxide, or a combination thereof. In other embodiments, the organic acid is acetic acid, formic acid, propionic acid, maleic acid, oxalic acid, uric acid, lactic acid, or a combination thereof. In still more embodiments, the one or more catalysts contains a total of less than 500 ppm moieties comprising arsenic, antimony, bismuth, or ions thereof, or a halogen.

In other embodiments, a molar ratio of the one or more phenolic compounds to the one or more catalysts ranges from about 5 to about 400. For example, in some embodiments a molar ratio of the one or more phenolic compounds to the one or more catalysts ranges from about 5 to about 50.

In certain other embodiments of the foregoing methods, the polymer particles in gel form are made via the suspension process, the reactant mixture is a suspension and the method further comprises agitation of the suspension with a mixer.

In some embodiments, the methods further comprise separating the polymer particles from the carrier fluid to provide separated polymer particles in gel form.

In other embodiments, the methods further comprise heating the reactant mixture to a temperature ranging from about 30° C. to about 100° C. In other embodiments, the reactant mixture is at a temperature of about 80° C. or more during polymerization of the reactant mixture. In still other embodiments, the reactant mixture is at a temperature ranging from about 80° C. to about 150° C. during polymerization of the monomer component.

In some more embodiments of the foregoing methods, the reactant mixture has a pH of less than 7 during polymerization. In some other examples, the reactant mixture has a pH of less than 5 during polymerization. In still more embodiments, the reactant mixture has a pH of less than 4 during polymerization.

In other embodiments, the one or more phenolic compounds and the one or more crosslinking compounds are prepolymerized with one another to form a prepolymer prior to making the polymer particles in gel form via the emulsion or suspension process.

Other embodiments further comprise admixing a silicon-containing electrochemical modifier with the polymer precursor mixture, the polymer phase or the continuous phase, and other embodiments further comprise admixing a nitrogen-containing electrochemical modifier with the polymer precursor mixture, the polymer phase or the continuous phase. For example, in some embodiments the nitrogen-containing electrochemical modifier is urea, melamine, or combination thereof.

In certain embodiments of the above, the reaction mixture further comprises 0.01% to 20% of a non-ionic surfactant having a molecular weight of from about 100 Daltons to about 2,000 Daltons.

In some other embodiments, the reactant mixture is aged for 12 hours or less at a temperature between about 45 and 70 C. In still more embodiments, the reactant mixture is aged for 6 hours or less at a temperature between about 45 and 70 C.

In certain embodiments, the polymer gel particles comprise a total pore volume of between about 0.01 and 1.5 cm3/g, and in other embodiments the polymer gel particles comprise a total pore volume of between about 0.1 and 0.9 cm3/g.

In other embodiments of any of the foregoing methods, the methods further comprise pyrolyzing the polymer gel particles by a method comprising heating the polymer gel particles in an inert atmosphere at temperatures ranging from 500° C. to 2400° C. For example, in some embodiments the pyrolyzed polymer gel particles have a total pore volume greater than 0.8 cm3/g and a gerameter (GM) between 9 and 21.

In other embodiments, the methods further comprise:

a) pyrolyzing the polymer gel particles by a method comprising heating the condensation polymer gel particles in an inert atmosphere at temperatures ranging from 500° C. to 2400° C., and b) activating the pyrolzyed polymer gel particles in an atmosphere comprising carbon dioxide, carbon monoxide, steam, oxygen or combinations thereof at a temperature may ranging from 800° C. to 1300° C. In certain embodiments, the pyrolyzed and activated polymer gel particles have a total pore volume greater 38. The method according to claim 37, wherein than 0.6 cm3/g and a gerameter (GM) greater than or equal to 21. In other embodiments, the pyrolyzed and activated polymer gel particles have a total pore volume greater than 1 cm3/g and a gerameter (GM) ranging from 9 to 21.

In other embodiments, the disclosure provides a polymer gel having a particle size distribution such that Dv,50 is less than about 1 mm and (Dv,90–Dv,10)/Dv,50 is less than 3, wherein Dv,10, Dv,50 and Dv,90 are the particle size at 10%, 50% and 90%, respectively of the particle size distribution by volume.

In still more embodiments, the disclosure is directed to a polymer gel having a particle size distribution such that Dv,50 is less than about 0.5 mm and (Dv,90–Dv,10)/Dv,50 is less than 3, wherein Dv,10, Dv,50 and Dv,90 are the particle size at 10%, 50% and 90%, respectively of the particle size distribution by volume.

In even more embodiments, the disclosure provides a polymer gel having a particle size distribution such that Dv,50 is greater than about 0.1 mm and (Dv,90–Dv,10)/Dv,50 is less than 3, wherein Dv,10, Dv,50 and Dv,90 are the particle size at 10%, 50% and 90%, respectively of the particle size distribution by volume.

In some of the foregoing polymer gel embodiments, (Dv,90–Dv,10)/Dv,50 is less than 2. In other embodiments, (Dv,90–Dv,10)/Dv,50 is less than 1.

Other embodiments of the present disclosure are directed to a carbon material, wherein the maximum theoretical capacitance of the carbon material is greater than 25 F/cm3 as measured at a current density of 0.5 Amp/g employing an electrolyte comprising tetraethylammonium tetrafluoroborane in acetonitrile, and wherein the carbon material comprises less than 500 ppm of all atoms having a molecular weight between 11 and 92 as measured by photon induced x-ray emissions.

In another embodiment an electrode is provided, the electrode comprising a carbon material produced according to any one of the methods described herein or a carbon material described herein (e.g., the foregoing carbon material).

Other embodiments provide an electrical energy storage device comprising a carbon material produced according to any one of the methods described herein or a carbon material described herein (e.g., the foregoing carbon material). In some embodiments, the electrical energy storage device is a double layer ultracapacitor. In other embodiments, the electrical energy storage device is a lithium/carbon battery, zinc/carbon battery, lithium air battery or lead acid battery.

In other embodiments, an electrode comprising carbon is provided, wherein the carbon comprises a maximum theoretical capacitance of greater than 25 F/cm3 and wherein the electrode retains greater than 90% of its capacitance after incubation at 2.85 V and 85 C for 32 h, wherein the capacitance is measured at a current density of 0.5 Amp/g employing an electrolyte comprising tetraethylammonium tetrafluoroborane in acetonitrile.

In other embodiments, the present disclosure provides an electrode comprising carbon, wherein the carbon comprises a maximum theoretical capacitance of greater than 20 F/cm3, wherein the capacitance is measured after incubation at 2.85 V and 85 C for 32 h, and at a current density of 0.5 Amp/g employing an electrolyte comprising tetraethylammonium tetrafluoroborane in acetonitrile. For example, in some embodiments the carbon comprises a maximum theoretical capacitance of greater than 23 F/cm3 maximum theoretical capacitance, wherein the capacitance is measured after incubation at 2.85 V and 85 C for 32 h, and at a current density of 0.5 Amp/g employing an electrolyte comprising tetraethylammonium tetrafluoroborane in acetonitrile.

In other embodiments, the disclosure is directed to an electrical energy storage device comprising any one of the above described electrodes. In certain embodiments, the electrical energy storage device is a double layer ultracapacitor.

Polymer gels and carbon materials prepared according to the disclosed methods and electrodes and devices comprising the carbon materials, are also provided.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
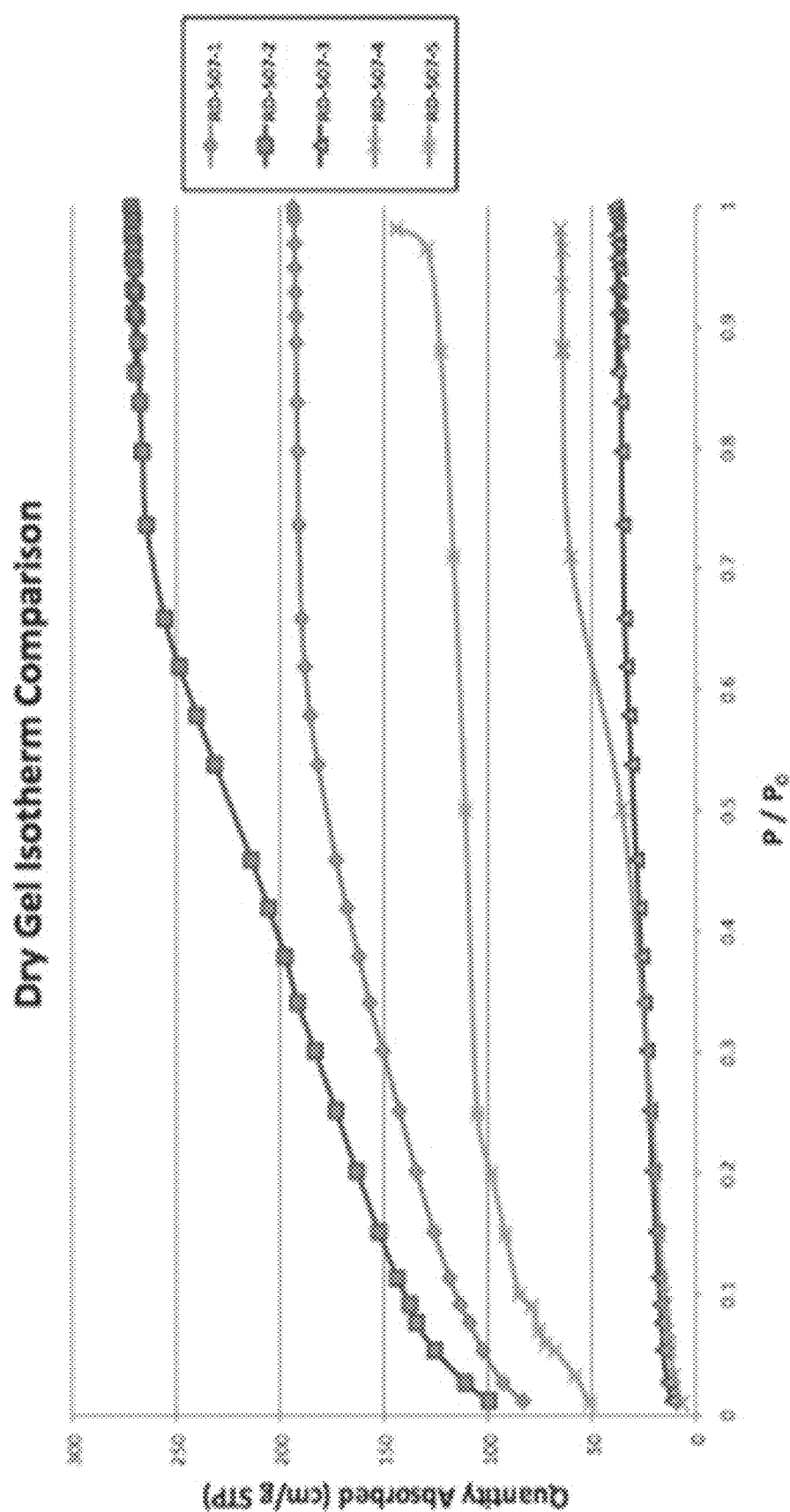
FIG. 1 shows $N_2$ absorption isotherms for freeze dried gels.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Carbon material" refers to a material or substance comprised substantially of carbon (e.g., >90%, >95%, greater than 99% or greater than 99.9% carbon on a weight basis). Carbon materials include ultrapure as well as amorphous and crystalline carbon materials. Some carbon materials may comprise electrochemical modifiers (e.g. Si or N) to modify (e.g., enhance) device performance as described in more detail below. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Electrochemical modifier" refers to any chemical element, compound comprising a chemical element or any combination of different chemical elements and compounds which modifies (e.g., enhances or decreases) the electrochemical performance of a carbon material. Electrochemical modifiers can change (increase or decrease) the resistance, capacity, power performance, stability and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure include, but are not limited to, elements, and compounds or oxides comprising elements, in groups 12-15 of the periodic table, other elements such as sulfur, tungsten and silver and combinations thereof. For example, electrochemical modifiers include, but are not limited to, lead, tin, antimony, bismuth, arsenic, tungsten, silver, zinc, cadmium, indium, silicon and combinations thereof as well as oxides of the same and compounds comprising the same.

"Group 12" elements include zinc (Zn), cadmium (Cd), mercury (Hg), and copernicium (Cn).

"Group 13" elements include boron (B), aluminum (Al), gallium (Ga), indium (In) and thallium (Tl).

"Group 14" elements include carbon (C), silicon (Si), germanium (Ge), tin (Sn) and lead (Pb).

"Group 15" elements include nitrogen (N), phosphorous (P), arsenic (As), antimony (Sb) and bismuth (Bi).

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of one or more structural repeating units.

"Synthetic polymer precursor material" or "polymer precursor" refers to compounds used in the preparation of a synthetic polymer. Polymer precursors are generally compounds which may combined (i.e., reacted) with other compounds to form a polymer, for example a condensation polymer. Polymer precursors include monomers, as well as monomers which have been partially polymerized (i.e., dimers, oligomers, etc.). Generally, the polymer precursors are selected from aromatic or aliphatic alcohols or amines and carbonyl containing compounds (e.g., carboxylic acids, ketones, aledehydes, isocyanates, ureas, amides, acid halides, esters, activated carbonyl-containing compounds and the like). Examples of polymer precursors that can be used in certain embodiments of the preparations disclosed herein include, but are not limited to, aldehydes (i.e., HC($=$O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Amines, such as melamine, and urea may also be used. Mixtures of two or more polyhydroxy benzenes are also contemplated within the meaning of polymer precursor.

"Condensation polymer" is a polymer that results from reaction of one or more polymer precursors with elimination of a small molecule (e.g. water). Exemplary condensation polymers include, but are not limited to, polymers formed from reaction of an alcohol or amine with a carbonyl containing compound.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Continuous Phase" refers to the liquid phase in which the polymerization components (i.e., polymer precursors, catalyst, acid, etc.) are dissolved, suspended and/or emulsified. Continuous phases may be either hydrophilic or hydrophobic and have varying viscosities. Mixtures of two or more different continuous phases are also contemplated. Any number of different liquids (e.g., solvents) may be employed within the context of the invention as described in more detail herein.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., a mixed solvent containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel (e.g., an ultrapure polymer gel) as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" generally refers to a pore having a diameter ranging from 2 nanometers to 50 nanometers while the term "micropore" refers to a pore having a diameter less than 2 nanometers.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. In certain embodiments, an electrode may comprise the disclosed carbon materials and a binder. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluorob orate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

"Amine" is a compound including a nitrogen atom, such as —NH2.

An "alcohol" is a compound including a —OH moiety.

A "carbonyl" is a compound including a carbon double bonded to oxygen (C═O).

A "phenol" refers to an aromatic ring (e.g., benzene) having one or more alcohol moieties attached thereto. Phenol and resorcinol are both "phenols."

"Polyalcohol" refers to any compound having more than one alcohol moiety.

"Sugar" is a polyalcohol such as glucose, fructose, lactose and the like.

"Alkylamine" refers to an alkyl group (i.e., a saturated or unsaturated optionally substituted hydrocarbon compound) comprising an amine moiety (e.g., methyl amine and the like).

"Aromatic amine" refers to an aromatic group (i.e., a cyclic, unsaturated hydrocarbon having a cyclic array of conjugated pi bonds, such as benzene) comprising an amine group (e.g. aniline and the like).

An "aldehyde" is a compound comprising a —C(═O)H moiety.

"Ketone" refers to a compound comprising a —C(═O)— moiety.

A "carboxylic acid" is a compound containing a —C(═O)OH moiety.

"Esters" include compounds having a —C(═O)O— moiety.

An "acid halide" is any compound comprising a —C(═O)X moiety, wherein X is fluorine, chlorine, bromine, iodide or astatine.

"Isocyanate" refers to compounds comprising a —N═C═O moiety.

"GM", otherwise referred to as gerameter, is a measurement of the relative micro-, meso- and macro-porosity of a carbon sample. It is calculated in the following fashion GM=[BET specific surface area (m2/g)]/[100*Pore Volume (cm3/g)] and units are generally not reported. Generally, microporous carbon exhibits a GM of greater than 21. In certain embodiments, the microporous carbon exhibits a GM greater than 22, greater than 23, greater than 24. Generally, carbons with micro- and mesoporous structure exhibits a GM between 9 and 21. In certain embodiments, carbons with micro- and mesoporous structure exhibits a GM between 9 and 15, between 11 and 15. Generally, carbons with micro- and meso- and macroporous structure exhibit a Gm between 5 and 9. In certain embodiments, carbons with micro- and meso- and macoporous structure exhibits a GM between 7 and 7. In certain various other embodiments, the carbon materials have a GM up to 25, up to 26, up to 28 up to 30 or even up to 35.

As used herein, "normalized F/cc" or "maximum theoretical F/cc" is defined as the capacitance expressed per envelope volume of carbon particles (the sum of carbon skeletal volume and carbon pore volume); note that this envelope volume does not include any inter-particle volume.

As used herein, "CMC" is the critical micelle concentration, defined as the concentration above which surfactants form micelles, and all additional surfactants added to the system go to micelles. In some embodiments, the surfactant level can be at a concentration above the CMC. In other embodiments, the surfactant level can be at a concentration below the CMC. For example, the surfactant level can be present at a concentration less than 50% of the CMC, or less than 10% of the CMC, or less than 1% of the CMC, or less than 0.1% of the CMC, or less than 0.01% of the CMC.

"Carrier fluid" or "carrier phase" can refer to a suspension fluid, solvent, diluent, dispersion fluid, emulsion fluid, and/or the continuous phase of the suspension and/or emulsion. In one or more embodiments, the term "continuous phase" has the same definition as "carrier fluid." In one or more embodiments, the term carrier fluid has the same definition as "continuous phase." In one or more embodiments, the term "carrier fluid" has the same definition as "solvent." In one or more embodiments, the term "solvent" has the same definition as "carrier fluid".

As used herein, "particle size" refers to the volume average particle size (Dv,50) as measured either by visual counting and measurement of individual particles or by laser light scattering of particles in a suspension fluid. The volume average particle size is determined by image capture using a digital camera and ImageJ freeware, for particles above 0.1 mm in diameter. Particles sizes below 0.1 mm are determined by dilute dispersions in water by light scattering using a Malvern MASTERSIZER 3000. Samples below 0.1 mm are added to the Malvern analyzer until the recommended obscuration level is obtained.

"Suspension process," "suspension polymerization process," "dispersion process," and "dispersion polymerization process" are used interchangeably and refer to a heterogeneous polymerization process that mixes the reactant mixture in the "carrier phase" or "continuous phase" fluid such as a hydrocarbon and/or water, where the reactant mixture phase and the carrier or continuous phase fluid are not miscible. In some embodiments, the reactant mixture can be suspended or dispersed in the carrier fluid or continuous phase as droplets, where the monomer component undergoes polymerization to form particles of polymer and/or curing to form cured particles of polymer. In some embodiments, the reaction mixture can be agitated. In some embodiments, the reaction mixture is not agitated.

"Emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (very small size droplets). When the carrier or continuous phase fluid is a hydrophilic fluid such as water and the reactant mixture phase is a hydrophobic compound(s), normal emulsions (e.g., oil-in-water) form, where droplets of monomers are emulsified with the aid of a surfactant in the carrier or continuous phase fluid. Monomers react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reactant mixture phase is hydrophilic compounds, inverse-emulsions (e.g., water-in-oil) form.

As used herein, the terms "suspension and/or emulsion process" and "suspension and/or emulsion polymerization" are not limited to or necessarily refer to traditional polymerization. Instead, the terms "suspension and/or emulsion process" and "suspension and/or emulsion polymerization" may, but not necessarily, refer to a curing process or a combination of traditional polymerization and a curing process. As discussed and described herein, in one or more embodiments, the monomer component can be or include a pre-polymer and/or a polymer in addition to or in lieu of the monomer mixture alone. The curing process refers to the further cross-linking or hardening of the polymer as compared to the polymerization of a monomer mixture. As such, if a pre-polymer is present, the suspension/emulsion process can, in addition to or in lieu of polymerization, also include the curing process. As used herein, the term "curing" refers to the toughening or hardening of polymers via an increased degree of cross-linking of polymer chains. Cross-linking refers to the structural and/or morphological change that occurs in the pre-polymer and/or polymer, such as by covalent chemical reaction, ionic interaction or clustering, phase transformation or inversion, and/or hydrogen bonding.

As used herein, the terms "polymer particulates in gel form" and "polymer particles in gel form" are used interchangeably and refer to a network of polymer chains that have one or more pores or voids therein, and a liquid at least partially occupies or fills the one or more pores or voids. As used herein, the terms "dried polymer particulates" and "dried polymer particles" are used interchangeably and refer to a network of polymer chains having one or more pores or voids therein, and a gas at least partially occupies or fills the one or more pores or voids. If the liquid that at least partially occupies or fills the voids is water, the polymer particles can be referred to as "hydrogel polymer particles."

"Monomer component" can include, but is not limited to, one or more phenolic compounds and/or one or more crosslinking compounds and/or a prepolymer formed by pre-polymerizing the one or more phenolic compounds and/or the one more crosslinking compounds. If the phenolic compound can polymerize and crosslink with itself, the use of the crosslinking compound can be optional. In another example, the phenolic compound and all or a portion of the crosslinking compound can polymerize with one another to form the polymer particles in gel form. In another example, the phenolic compound and the crosslinking compound can react or crosslink with one another to produce the polymer particles in gel form. In another example, the phenolic compound and the crosslinking compound can polymerize with one another and/or crosslink with one another to produce the polymer particles in gel form.

In one or more embodiments, the terms "monomer component" and "polymer phase" are equivalent. In one or more embodiments, the terms "monomer component" and "polymer precursor" are equivalent.

As used herein, the term "prepolymer" refers to the reacted monomer compounds of the one or more phenolic compounds and the one or more crosslinking compounds; and/or a polymer formed by polymerizing the one or more phenolic compounds and/or the one more crosslinking compounds so long as the polymer remains in liquid form.

A. Preparation of Polymer Gels and Carbon Materials

The disclosed preparation of carbon materials represents a number of advances over currently known methods for preparation of carbon materials. For example, similar carbon materials have traditionally been made by admixing polymer precursors and allowing them to polymerize into a polymer monolith. The monolith must then be isolated and ground or milled to small particles before it can be pyrolyzed and/or activated into carbon materials. Such procedures suffer from a number of drawbacks. For example, at large scales previously described monolith preparations present significant material handling problems and the possibility of heterogenous polymerizations and/or uncontrolled exothermic reactions. Furthermore, other considerations, such as the incompatibility of typical production equipment (e.g., ovens, etc.) with known monolith procedures, makes scale up of these procedures challenging and economically difficult.

The present methods overcome these limitations and represent a number of other improvements. For example, the described polymerizations provide the possibility to isolate the gel product by filtration or by decanting excess solvent, thus making the methods amendable to large scale production. Furthermore, heat transfer is more effective in the present methods compared to monolith procedures, thus the products are expected to be more homogeneous and the risk of uncontrolled exotherms is significantly reduced. Furthermore, by changing the gel formulation and/or processing parameters, carbon materials having certain desired characteristics (e.g., microporosity, mesoporosity, high density, low density, specific particle sizes, near monodisperse particle size distributions, etc.) can be obtained without additional processing steps (e.g., milling, etc.). Certain aspects of the disclosed methods are described in more detail in the following sections.

The various physical and chemical properties of the carbon materials and polymer gels are as described in the following section and as disclosed in co-pending U.S. application Ser. Nos. 12/748,219; 12/897,969; 12/829,282; 13/046,572; 12/965,709; 13/336,975; and 61/585,611, each of which are hereby incorporated by reference in their entireties for all purposes.

1. Preparation of Polymer Gels

As noted above, on embodiment of the present disclosure provides methods for preparation of polymer gels and carbon materials. For example, in one embodiment the present disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises a surfactant in a concentration equal to or greater than the critical micelle concentration and the volume average particle size (Dv,50) of the polymer particles is less than or equal to 1 mm.

In another embodiment, the disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is less than or equal to 1 mm.

In still other embodiments, the disclosure is directed to a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is greater than or equal to 1 mm.

In another embodiment the present application provides a method for preparing a condensation polymer gel via an emulsion or suspension process, the method comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In another embodiment, the disclosed methods include preparing a dried condensation polymer gel, the method comprises drying a condensation polymer gel, wherein the condensation polymer gel has been prepared by an emulsion or suspension process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the invention provides a method for preparing a carbon material, the method comprising heating condensation polymer gel particles to obtain a carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

The condensation polymer gel may be used without drying or the methods may further comprise drying the condensation polymer gel. In certain embodiments of the foregoing methods, the polymer gel is dried by freeze drying.

The inventive methods are useful for preparation of condensation polymer gels and/or carbon materials having any number of various pore structures. In this regard, Applications have discovered that the pore structure can be controlled by variation of any number of process parameters such as continuous phase type, stir rate, temperature, aging time, etc. In some embodiments, the condensation polymer gel is microporous, and in other embodiments the condensation polymer gel is mesoporous. In certain other embodiments, the condensation polymer gel comprises a pore structure having a mixture of microporous and mesoporous pores.

In related embodiments, the carbon material is microporous or the carbon material is mesoporous. In other embodiments, the carbon material comprises a pore structure having mixture of microporous and mesoporous pores.

The polymer phase may be prepared by admixing the one or more polymer precursors and the optional solvent, and in some examples the mixture is prepared by admixing the continuous phase and the polymer phase. The method includes embodiments wherein the mixture is an emulsion, while in other embodiments the mixture is a suspension.

For example, in some embodiments the continuous phase and the polymer phase are not miscible with each other, and the mixture is an emulsion. While in other exemplary methods the continuous phase and the polymer phase are not soluble in each other, and the mixture is a suspension. In other examples, the polymer phase is aged prior to preparation of the mixture, and the mixture is an emulsion and/or a suspension upon combination of the continuous phase and the polymer phase.

In other different aspects, both the continuous phase and the polymer phase are soluble in each other (i.e., miscible). In some variations of this embodiment, the continuous phase and polymer phase are miscible initially but the polymer phase is aged such that it becomes immiscible with the continuous phase and the mixture becomes a suspension upon aging.

The polymer phase may be prepared by admixing the one or more polymer precursors and the optional solvent. In some embodiments, the polymer phase is "pre-reacted" prior to mixing with the continuous phase such the polymer precursors are at least partially polymerized. In other embodiments, the polymer precursors are not pre-reacted. In certain other embodiments, the method is a continuous process. For example, the polymer precursors may be continuously mixed with a continuous phase and the final condensation polymer gel may be continuously isolated from the mixture.

A single polymer precursor may be used or the methods may comprise use of two or more different polymer precursors. The structure of the polymer precursors is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment, the method comprises use of a first and second polymer precursor, and in some embodiments the first or second polymer precursor is a carbonyl containing compound and the other of the first or second polymer precursor is an alcohol containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, sucrose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species, for example an aldehyde and a phenol. The relative amounts of alcohol-containing species (e.g., alcohols, phenolic compounds and mono- or polyhydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In certain embodiments, the polymer precursors comprise formaldehyde and resorcinol or formaldehyde and phenol. In other embodiments, the polymer precursors comprise formaldehyde and urea.

In other embodiments, the polymer precursor is a urea or an amine containing compound. For example, in some embodiments the polymer precursor is urea or melamine. Other embodiments include polymer precursors selected from isocyanates or other activated carbonyl compounds such as acid halides and the like.

Some embodiments of the disclosed methods include preparation of polymer gels (and carbon materials) comprising electrochemical modifiers. Electrochemical modifiers include those known in the art and described in co-pending U.S. application Ser. No. 12/965,709, previously incorporated by reference in its entirety. Such electrochemical modifiers are generally selected from elements useful for modifying the electrochemical properties of the resulting carbon materials or polymer gels, and in some embodiments include nitrogen or silicon. In other embodiments, the electrochemical modifier comprises nitrogen, iron, tin, silicon, nickel, aluminum or manganese. The electrochemical modifier can be included in the preparation procedure at any step. For example, in some the electrochemical modifier is admixed with the mixture, the polymer phase or the continuous phase.

The total solids content in the gel formulation prior to polymer formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.6 to 1.

In some embodiments, the gel polymerization process is performed under catalytic conditions. Accordingly, in some embodiments, the method comprises admixing a catalyst with the mixture, the polymer phase and/or the continuous phase. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to polymer precursor (e.g., phenolic compound) may have an effect on the final properties of the polymer gel as well as the final properties of the carbon materials. Thus, in some embodiments such catalysts are used in the range of molar ratios of 5:1 to 2000:1 polymer precursor:catalyst. In some embodiments, such catalysts can be used in the range of molar ratios of 10:1 to 400:1 polymer precursor:catalyst. For example in other embodiments, such catalysts can be used in the range of molar ratios of 5:1 to 100:1 polymer precursor:catalyst. For example, in some embodiments the molar ratio of catalyst to polymer precursor is about 400:1. In other embodiments the molar ratio of catalyst to polymer precursor is about 100:1. In other embodiments the molar ratio of catalyst to polymer precursor is about 50:1. In other embodiments the molar ratio of catalyst to polymer precursor is about 10:1. In certain of the foregoing embodiments, the polymer precursor is a phenolic compound such as resorcinol or phenol.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 5:1 to about 2000:1 or the molar ratio of resorcinol to catalyst is from about 10:1 to about 400:1. In further embodiments, the molar ratio of resorcinol to catalyst is from about 5:1 to about 100:1. In further embodiments, the molar ratio of resorcinol to catalyst is from about 25:1 to about 50:1. In further embodiments, the molar ratio of resorcinol to catalyst is from about 100:1 to about 5:1.

In still other embodiments, the method comprises admixing an acid with the mixture, the polymer phase and/or the continuous phase. The acid may be selected from any number of acids suitable for the polymerization process. For example, in some embodiments the acid is acetic acid and in other embodiments the acid is oxalic acid. In further embodiments, the acid is mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid to the emulsion, suspension or gel formulation.

The total content of acid in the mixture can be varied to alter the properties of the final product. In some embodiments, the acid is present from about 1% to about 50% by weight of polymer solution. In other embodiments, the acid is present from about 5% to about 25%. In other embodiments, the acid is present from about 10% to about 20%, for example about 10%, about 15% or about 20%.

Although a surfactant is not required (and is not present in certain embodiments), some embodiments include use of a surfactant. The surfactant may be admixed with the mixture, the polymer phase and/or the continuous phase or included in the process in any other appropriate manner. In some embodiments which include a surfactant, the polymer phase is pre-reacted prior to mixing with the continuous phase such the polymer precursors are at least partially polymerized.

The surfactant may be selected from any number of surfactants which are useful for emulsifying two immiscible solutions. For example, in some embodiments the surfactant comprises a sorbitan surfactant such as SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, TritonX® 100 or combinations thereof. In certain embodiments, the surfactant comprises SPAN™ 80. In other embodiments, the surfactant comprises SPAN™ 20.

Such surfactants are well known in the art and are available commercially from a number of sources, including Sigma-Aldrich, St. Louis Mo. While not wishing to be bound by theory, it is believed that the amount of surfactant present in the mixture may be a parameter that can be modified to control the physical properties of the resulting gel and/or carbon materials. For example, surfactant concentrations less than or equal to about 2% may be associated with mesoporous carbons, while higher surfactant concentrations may be associated with microporous carbons. However, high concentrations of surfactant (e.g., greater than about 30%) are not as effective. While surfactant may be desirable in some embodiments, it is not required in all embodiments of the disclosed methods.

In some embodiments when surfactant is present, the mixture comprises from about 0.01% to about 20% surfactant (w/w), for example about 0.1% to about 20% surfactant (w/w), for example about 10% surfactant. In other embodiments, the mixture comprises from about 0.1% to about 10% surfactant, for example about 5% surfactant. In other embodiments, the mixture comprises from about 0.1% to about 2% surfactant, for example about 0.5% or about 1% surfactant. In other embodiments, the mixture comprises from about 0.01% to about 1.0% surfactant, for example about 0.1% to about 1.0% surfactant. In other embodiments, the mixture comprises from about 1.0% to about 2.0% surfactant. In other embodiments, the mixture comprises from about 2.0% to about 5.0% surfactant. In other embodiments, the mixture comprises from about 5.0% to about 10% surfactant. In some certain embodiments, the mixture comprises about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9% or about 2.0% surfactant. In other embodiments, the emulsions, suspension or combination thereof comprise from about 9.0% to about 11.0%, from about 0.05% to about 1.1% surfactant or from about 0.9% to about 1.1% surfactant.

The continuous phase is another process parameter that may be varied to obtain the desired properties (e.g., surface area, porosity, purity, etc.) of the polymer gels and carbon materials. For example, the present inventors have surprisingly discovered that by careful selection of the continuous phase, the porosity of the final polymer gel and carbon materials can be controlled (see data provided in Examples). Thus, the present methods provide the ability to prepare carbon materials (and the precursor gels) having any desired porosity. A further advantage of careful selection of the continuous phase is in the scaleability of the process. For example, when continuous phases are selected which have low toxicity, flammability, etc., the process is more amenable to scale up than other known polymer processes.

In some embodiments of the method, the polymer phase and the continuous phase are not miscible with each other and an emulsion or suspension is formed. In other embodiments the polymer phase and continuous phase are miscible or partially miscible with each other. In these cases the polymer phase may become less miscible with the continuous phase over the course of the reaction. In this respect, certain embodiments are directed to methods wherein the optional solvent is an aqueous and/or polar solvent and the continuous phase is an organic and/or nonpolar solvent. Suitable aqueous and/or polar solvents include, but are not limited to, water, water/acetic acid, alcohols (e.g., ethanol, methanol, etc.), polar ethers (e.g., PEG, etc.), organic acids (e.g., acetic) and mixtures thereof. In certain embodiments, the optional solvent is present. In certain embodiments, the optional solvent is present and comprises water. For example, in some embodiments, the polymer phase comprises water or an acetic acid/water mix.

Suitable organic and/or nonpolar solvents for use as a continuous phase include hydrocarbon solvents, aromatic solvents, oils, nonpolar ethers, ketones and the like. For example, suitable organic and/or nonpolar solvents include, but are not limited to hexane, cyclohexane, pentane, cyclopentane, benzene, toluene, xylenes, diethyl ether, ethylmethylketone, dichloromethane, tetrahydorfuran, mineral oils, paraffin oils, isopariffic fluids and the like. In some embodiments, the continuous phase is an organic solvent, for example a hydrocarbon solvent. In more specific embodiments, the continuous phase is cyclohexane, mineral oil, paraffinic oil, xylene, isoparaffinic oils or combinations thereof. In other embodiments, the continuous phase is cyclohexane, paraffinic oil, xylene, isoparaffinic oil or combinations thereof. In some specific embodiments, the continuous phase comprises paraffinic oil. In other specific embodiments, the optional solvent is present and comprises water and the continuous phase comprises cyclohexane, mineral oil, xylene or combinations thereof. In certain embodiments, the viscosity of the continuous phase is selected such that certain properties (e.g., particle size) of the polymer gel are controlled.

The wt % of organic and/or nonpolar solvent present in the continuous phase (carrier phase) can be varied depending on the particular application. For example, in certain embodiments the wt % of organic and/or nonpolar solvent in the carrier phase (based on total weight of carrier phase) is greater than 90%, greater than 80%, greater than 70%, greater than 60%, greater than 50%, greater than 40%, greater than 30%, greater than 20%, greater than 10%, greater than 5% or greater than 1%. In certain of the foregoing embodiments the organic and/or non polar solvent is cyclohexane.

In some embodiments the continuous phase is selected to be amenable for large scale production. In this regard, continuous phase properties important for large scale production include low toxicity, low flammability, price and/or ease of removal from final product and the like. The continuous phase may also be selected to have high purity, which in turn may contribute to high purity of the final polymer gel and/or carbon material. In this regard, continuous phases having purities greater than 99%, greater than 99.5%, greater than 99.9%, greater than 99.99% or even greater than 99.999% may be used.

In certain embodiments, the polymer precursor components are mixed together in a single aqueous phase and subsequently emulsified or suspended with an outer non-aqueous phase using techniques known in the art, and subsequently held for a time and at a temperature sufficient to at a temperature sufficient to achieve complete polymerization of precursors within the aqueous phase. In other embodiments, the precursor components are mixed together in a single aqueous phase, held for a time and at a temperature sufficient to achieve partial polymerization, and subsequently suspended in an outer non-aqueous phase using techniques known in the art, and subsequently held for a time and achieve complete polymerization of precursors within the aqueous phase. In this embodiment, the partial polymerization step may result in increased viscosity, allowing for control of polymer resin particle size depending on the emulsification energy conditions and viscosities of the partially polymerized aqueous phase and the non-aqueous phase. In other embodiments, the precursor components are mixed together in a single aqueous phase, held for a time and at a temperature sufficient to achieve partial polymerization, and subsequently suspended in an outer aqueous phase using techniques known in the art, and subsequently held for a time and achieve complete polymerization of precursors within the aqueous phase. In this embodiment, the partial polymerization step may result in increased viscosity, allowing for control of polymer resin particle size depending on the emulsification energy conditions, viscosities and immiscibility of the partially polymerized aqueous phase and the continuous aqueous phase.

Reaction parameters include aging the mixture at a temperature and for a time sufficient for the one or more polymer precursors to react with each other and form a polymer. In this respect, suitable aging temperature ranges from about room temperature to temperatures at or near the boiling point of the continuous phase. For example, in some embodiments the emulsion, suspension or combination thereof is aged at temperatures from about 20° C. to about 120° C., for example about 20° C. to about 100° C. Other embodiments include temperature ranging from about 30° C. to about 90° C., for example about 45° C. or about 85° C. In other embodiments, the temperature ranges from about 65° C. to about 80° C., while other embodiments include aging at two or more temperatures, for example about 45° C. and about 70-85° C. or about 80-85° C. Aging may include stirring in certain embodiments.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours). Aging conditions may optionally include stirring, shaking or other means of agitating the mixture. While not wishing to be bound by theory, it is thought that stirring is a parameter that may be controlled to produce gels and/or carbon materials having a desired particle size distribution (e.g., near mondisperse, etc.). For example, the stirring RPMs may be adjusted to obtain the desired result. Such methods have the added advantage that an additional step of milling or grinding to obtain the desired particle size may not be needed.

Generally, the methods further comprise isolating the polymer gel particles and/or carbon materials. Suitable means for isolating include filtering, decanting a solvent or continuous phase or combinations thereof. The isolated product may be further processed by methods including drying the isolated polymer gel particles to remove volatile content, for example, freeze drying.

In some embodiments, the particle size distribution of the polymer particles exhibit a polydispersity index (Dv,90−Dv,10)/Dv,50, wherein Dv,10, Dv,50 and Dv,90 are the particle size at 10%, 50% and 90%, respectively of the particle size distribution by volume) less than 1,000, for example less than 100, for example less than 10, for example less than 5, for example less than 3, for example less than 2, for example less than 1.5, for example less than 1. In some embodiments, introduction of aqueous phase to organic phase can be staged such that two or more populations of polymer particle size distribution may be achieved. For example, the final polymer particle distribution achieved may consist of two or more modes, where the ratio between the highest and lowest node is about 1000 or lower, for example about 100 or lower, for example about 50 or lower, for example about 10 or lower, for example about 5 or lower, for example about 2 or lower.

Furthermore, the methods may comprise freeze drying the polymer gel particles prior to pyrolyzing and/or activating, however such drying is not required and the polymer gel can be pyrolyzed without drying. In some embodiments, the polymer gel particles are frozen via immersion in a medium having a temperature of below about −10° C., for example, below about −20° C., or alternatively below about −30° C. For example, the medium may be liquid nitrogen or ethanol (or other organic solvent) in dry ice or ethanol cooled by another means. In some embodiments, freeze drying comprises subjecting the frozen particles to a vacuum pressure of below about 3000 mTorr. Alternatively, drying under vacuum comprises subjecting the frozen particles to a vacuum pressure of below about 1000 mTorr. Alternatively, drying under vacuum comprises subjecting the frozen particles to a vacuum pressure of below about 300 mTorr. Alternatively, drying under vacuum comprises subjecting the frozen particles to a vacuum pressure of below about 100 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at −60° C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

The disclosed methods are useful for preparation of a wide variety of carbon materials. In one example, carbon materials having high density and microporosity are prepared. Gel formulations useful in this regard include formulations comprising from 30-60% solids, 5%-30% acetic acid, 5-50 R:C, 0.5-15% surfactant, and ≥20% RF solution, for example about 46-50% solids, about 10% acetic acid, about 10 R:C, about 10% surfactant, and about ≥30% RF solution.

Mesoporous carbon materials can also be prepared by the disclosed methods. Formulations useful in this regard include, but are not limited to, from 25%-50% solids, 10-25% acetic acid, 50 to 400 R:C, 0.1-15% surfactant, and 15-35% RF solution, for example about 33% solids, about 20% acetic acid, either 100 or 400 R:C, about 10% surfactant, and about 20% RF solution. Other formulations useful for preparation of mesoporous carbons include, but are not limited to, a formulation comprised of from 25%-40% solids, 5%-15%% acid, 25-75 R:C, 0.5%-1.5% surfactant, and 15%-25% RF, for example about 33% solids, about 10% acid, about 50 R:C, about 1% surfactant and about 20% RF solution.

As used herein, % solids is calculated as the mass of polymer precursors (excluding water) divided by the total mass of polymer precursors (including water), additional water and acid. Catalyst is not included in the calculation of % solids. Surfactant loading is based on the mass of the continuous phase. % RF solution is the mass of (Resorcinol, Formaldehyde (including water), additional water and acid.) over the total mass of Resorcinol, Formaldehyde (including water), additional water, acid and continuous phase Other more specific methods according to the instant disclosure include a method for preparing a condensation polymer, the method comprising:

a) preparing an emulsion, suspension or combination thereof by admixing a surfactant, one or more polymer precursors and a first and second solvent, wherein the first and second solvents are not miscible with each other; and b) aging the emulsion at a temperature and for a time sufficient for the one or more polymer precursors to react with each other and form a condensation polymer.

In certain embodiments of the foregoing, the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In some embodiments, at least one polymer precursor is a phenolic compound. For example, in some embodiments at least one polymer precursor is resorcinol. In still other embodiments at least one polymer precursor is phenol. In other examples, at least one polymer precursor is an aldehyde compound, for example, at least one polymer precursor may be formaldehyde.

In some more specific embodiments, at least one polymer precursor is formaldehyde, at least one polymer precursor is resorcinol and the condensation polymer is a resorcinol-formaldehyde polymer.

In some embodiments at least one polymer precursor is urea, and in other embodiments at least one polymer precursor is melamine.

The foregoing method may further comprise including an electrochemical modifier, such as silicon or nitrogen, in the emulsion.

The various reaction parameters, including choice of polymer precursor, solvent, etc., of the method for preparing a condensation polymer can be modified as described in the above section to obtain condensation polymers having various properties.

2. Creation of Polymer Gel Particles

In contrast to prior monolith techniques, the presently disclosed methods generally do not require milling or grinding prior to further processing. Instead, the polymer gel particles are generally filtered and/or the solvent removed by decanting and the gel particles are optionally dried (e.g., freeze drying) prior to further processing.

3. Rapid Freezing of Polymer Gels

As noted above, certain embodiments of the method include freeze drying prior to pyrolysis and/or activation; however such drying is optional and is not included in some of the disclosed embodiments. Freezing of the polymer gel particles may be accomplished rapidly and in a multi-directional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration or product cooling until complete freezing is achieved. In the specific case of water and acetic acid (which as pure substances exhibit freezing points of 0° C. and 17° C., respectively), the eutectic composition is comprised of approximately 59% acetic acid and 41% water and freezes at about −27° C. Accordingly, in one embodiment, the mixed solvent system is the eutectic composition, for example, in one embodiment the mixed solvent system comprises 59% acetic acid and 41% water.

4. Drying of Polymer Gels

Some embodiments include an optional drying step. In one embodiment, the frozen polymer gel particles containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain the desired surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel is in the range of about 50% to about 99%. In certain embodiments upon drying, the aqueous content of the polymer cryogel is about 10%, alternately less than about 5% or less than about 2.5%.

A lyophilizer chamber pressure of about 2250 microns results in a primary drying temperature in the drying product of about −10° C. Drying at about 2250 micron chamber pressure or lower case provides a product temperature during primary drying that is no greater than about −10° C. As a further illustration, a chamber pressure of about 1500 microns results in a primary drying temperature in the drying product of about −15° C. Drying at about 1500 micron chamber pressure or lower provides a product temperature during primary drying that is no greater than about −15° C. As yet a further illustration, a chamber pressure of about 750 microns results in a primary drying temperature in the drying product of about −20° C. Drying at 750 micron chamber pressure or lower provides a product temperature during primary drying that is no greater than about −20° C. As yet a further illustration, a chamber pressure of about 300 microns results in a primary drying temperature in the drying product of about −30° C. Drying at 300 micron chamber pressure or lower provides a product temperature during primary drying that is no greater than about −30° C.

5. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes, from about 20 minutes to about 150 minutes, from about 30 minutes to about 100 minutes, from about 50 minutes to about 60 minutes or from about 55 minutes to about 60 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, the pyrolysis dwell temperature ranges from about 500° C. to 2400° C. In some embodiments, the pyrolysis dwell temperature ranges from about 600° C. to 1800° C. In other embodiments the pyrolysis dwell temperature ranges from about 700° C. to about 1200° C. In other embodiments the pyrolysis dwell temperature ranges from about 850° C. to about 1050° C. In other embodiments the pyrolysis dwell temperature ranges from about 800° C. to about 900° C. In some embodiments, the pyrolysis dwell temperature is about 600° C. or 900° C. In some other specific embodiments, the pyrolysis dwell temperature ranges from about 550° C. to about 900° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 10 minute and 24 hours. In other embodiments, the activation time is between 60 minutes and 24 hours. In other embodiments, the activation time is between 2 hour and 24 hours. In further embodiments, the activation time is between 12 hours and 24 hours. In certain other embodiments, the activation time is between 30 min and 8 hours. In some further embodiments, the activation time is between 3 hour and 6 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. In another embodiment, the activation temperature is about 900° C. In some embodiments, the carbon materials are activated to achieve a specific surface area ranging from 1700 to 1900 m$^2$/g. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

B. Properties of Polymer Gels

One embodiment of the present disclosure provides a polymer gel prepared by any of the methods disclosure herein. The polymer gels produced by the disclosed methods are unique in many respects. In some embodiments, the method produces polymer gels having monodisperse or near monodisperse particle size distributions. As discussed above, the particle size of the polymer gels (and carbon materials) can be controlled by a number of process parameters, including the stirring rate. For example, in some embodiments the present disclosure provides a polymer gel having a particle size distribution such that (Dv,90−Dv,10)/Dv,50 is less than 3, wherein Dv,10, Dv,50 and Dv,90 are the particle size at 10%, 50% and 90%, respectively of the particle size distribution by volume. In some embodiments, (Dv,90−Dv,10)/Dv,50 is less than 2 and in other embodiments (Dv90−Dv10)/Dv50 is less than 1.

Figure 14:
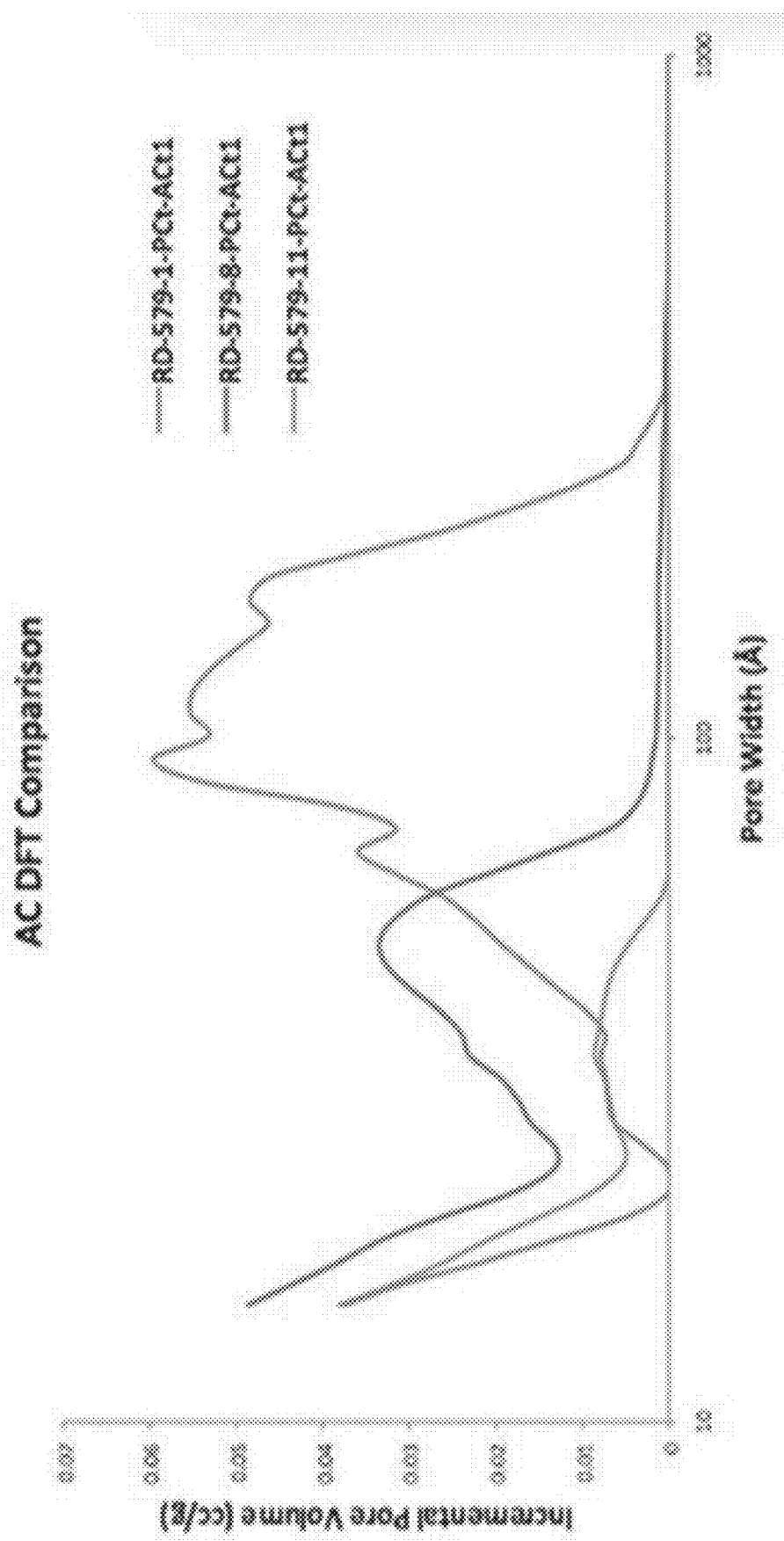
FIG. 14 is pore size data for activated carbon samples.
Figure 15:
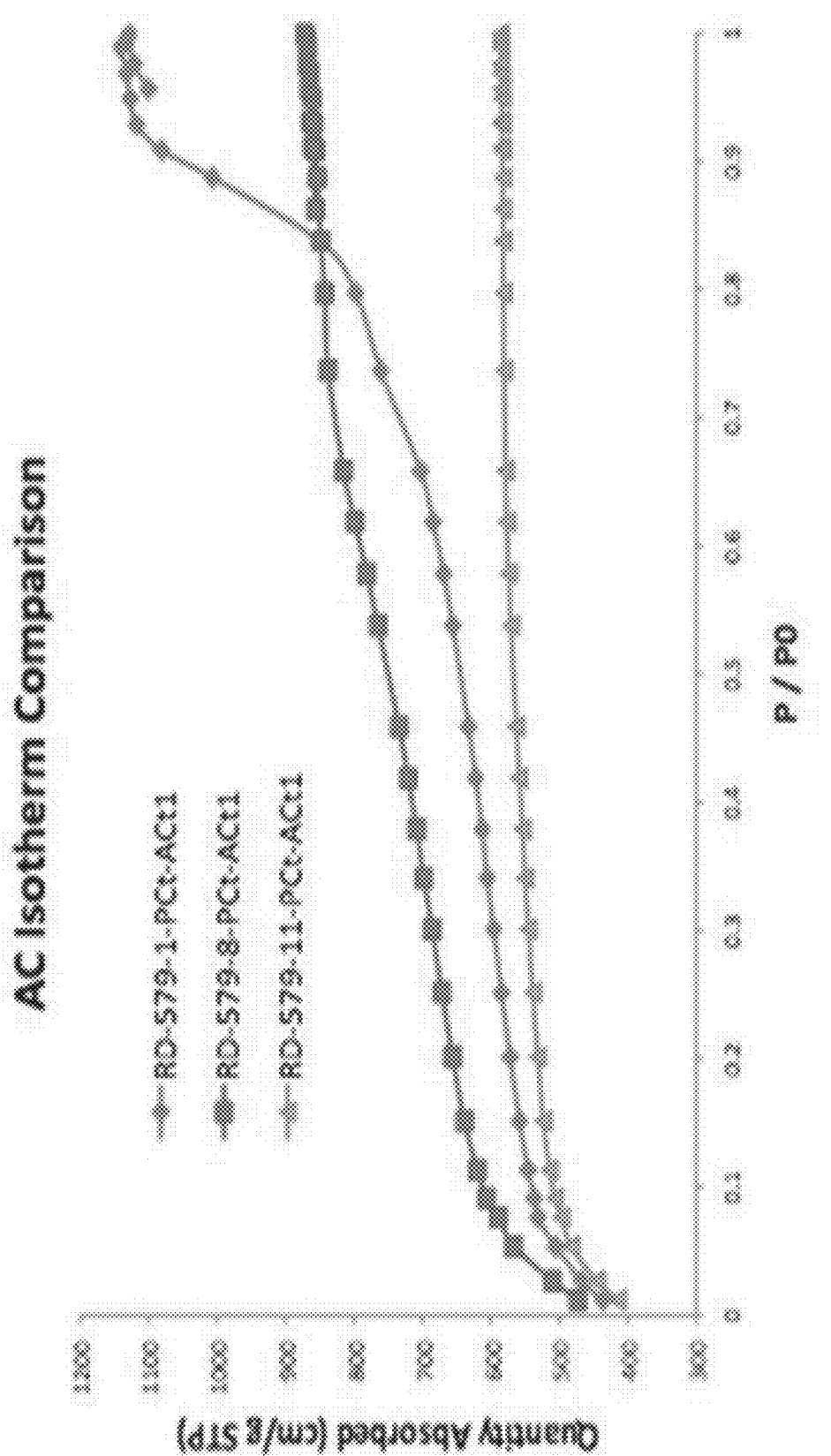
FIG. 15 presents nitrogen absorption isotherms for activated carbon samples.

The polymer gel particles are also substantially spherical in shape (see e.g., FIG. 14A). The spherical nature of the gels results in spherical carbon materials which in turn may contribute to desirable electrochemical properties. In some embodiments, the polymer gels comprise a plurality of polymer gel particles, wherein greater than 90% of the polymer gel particles have a spherical geometry. In other embodiments, greater than 95% of the polymer gel particles have a spherical geometry. The particle size of the polymer particles in gel form can be expressed alternatively as the average cross-sectional length. For the embodiment of spherical particles, the range of average cross-sectional lengths for polymer particles in gel form in various embodiments can mirror the embodiments described herein for the volume average particle size (Dv,50). For other embodiments of non-spherical particles, the important dimension with regards to heat transfer and polymerication within the particle is the minimum characteristic cross sectional length (for example, for rod-link particles the minimum characteristic cross sectional length is the rod diameter).

The specific surface area of the polymer gels as determined by BET analysis ranges from about 50 m$^2$/g to about 1000 m$^2$/g. In some embodiments, the specific surface area ranges from about 50 m$^2$/g to about 100 m$^2$/g. In other embodiments, the specific surface area ranges from about 300 m$^2$/g to about 700 m$^2$/g. In some other embodiments, the specific surface area ranges from about 300 m$^2$/g to about 400 m$^2$/g. In some other embodiments, the specific surface area ranges from about 400 m$^2$/g to about 500 m$^2$/g. In some other embodiments, the specific surface area ranges from about 500 m$^2$/g to about 600 m$^2$/g. In some other embodiments, the specific surface area ranges from about 600 m$^2$/g to about 700 m$^2$/g.

The total pore volume of the polymer gels ranges from about 0.01 cc/g to about 1.5 cc/g. For example, in some embodiments the total pore volume ranges from about 0.1 cc/g to about 0.9 cc/g. In other embodiments the total pore volume ranges from about 0.2 cc/g to about 0.8 cc/g. In other embodiments the total pore volume ranges from about 0.3 cc/g to about 0.6 cc/g. In other embodiments the total pore volume ranges from about 0.6 cc/g to about 0.9 cc/g.

In other embodiments, the polymer gel comprises a total of less than 500 ppm of all other elements having atomic numbers ranging from 11 to 92. For example, in some other embodiments the polymer gel comprises less than 200 ppm, less than 100 ppm, less than 50 ppm, less than 25 ppm, less than 10 ppm, less than 5 ppm or less than 1 ppm of all other elements having atomic numbers ranging from 11 to 92. In some embodiments, the electrochemical modifier content and impurity content of the polymer gels can be determined by proton induced x-ray emission (PUCE) analysis.

In some embodiments, the polymer gel is a dried polymer gel, for example, a polymer cryogel. In other embodiments, the dried polymer gel is a polymer xerogel or a polymer aerogel. In some embodiments, the polymer precursors are selected from aliphatic and aromatic alcohols, aliphatic and aromatic amines and carbonyl-containing compounds. For example, the polymer precursors may be selected from an alcohol, a phenol, a polyalcohol, a sugar, an alkyl amine, an aromatic amine, an aldehyde, a ketone, a carboxylic acid, an ester, a urea, an acid halide and an isocyanate. In some specific embodiments, the polymer gels are prepared from phenolic compounds and aldehyde compounds, for example, in one embodiment, the polymer gels can be produced from resorcinol and formaldehyde. In some embodiments, acidity can be provided by dissolution of a solid acid compound, by employing an acid as the reaction solvent or by employing a mixed solvent system where one of the solvents is an acid.

Some embodiments of the disclosed process comprise polymerization to form a polymer gel in the presence of a basic volatile catalyst. Accordingly, in some embodiments, the polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides a polymer gel comprising ammonium carbonate, ammonium bicarbonate, ammonium acetate, ammonium hydroxide, or combinations thereof. In further embodiments, the polymer gel comprises ammonium carbonate. In other further embodiments, the polymer gel comprises ammonium acetate.

The disclosed methods are useful for preparation polymer gels having high purity as determined by PIXE analysis and/or ash content. As described herein, any intentionally added electrochemical modifier is not considered an impurity and thus excluded from the specifically described PIXE and ash content values. In some embodiments, the polymer gels comprise low ash content which may contribute to the low ash content of a carbon material prepared therefrom. Thus, in some embodiments, the ash content of the polymer gel ranges from 0.1% to 0.001%. In other embodiments, the ash content of the polymer gel is less than 0.1%, less than 0.08%, less than 0.05%, less than 0.03%, less than 0.025%, less than 0.01%, less than 0.0075%, less than 0.005% or less than 0.001%.

In other embodiments, the polymer gel has a total PIXE impurity content of less than 500 ppm and an ash content of less than 0.08%. In a further embodiment, the polymer gel has a total PIXE impurity content of less than 300 ppm and an ash content of less than 0.05%. In another further embodiment, the polymer gel has a total PIXE impurity content of less than 200 ppm and an ash content of less than 0.02%. In another further embodiment, the polymer gel has a total PIXE impurity content of less than 200 ppm and an ash content of less than 0.01%.

Polymer gels comprising impurities generally yield carbon materials which also comprise impurities, and thus potentially undesired electrochemical properties. Accordingly, one aspect of the present disclosure is a polymer gel prepared via the disclosed methods and having low levels of residual undesired impurities. The amount of individual PIXE impurities present in the polymer gel can be determined by proton induced x-ray emission. In some embodiments, the level of sodium present in the polymer gel is less than 1000 ppm, less than 500 ppm, less than 100 ppm, less than 50 ppm, less than 10 ppm, or less than 1 ppm. In some embodiments, the level of magnesium present in the polymer gel is less than 1000 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some specific embodiments, the polymer gel comprises less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the polymer gel comprises less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the polymer gel comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the polymer gel comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields a polymer gel comprising various specific surface areas depending on the exact reaction parameters. Without being bound by theory, it is believed that the surface area of the polymer gel contributes, at least in part, to the surface area properties of the carbon materials. The surface area can be measured using the BET technique well-known to those of skill in the art. In one embodiment of any of the aspects disclosed herein the polymer gel comprises a BET specific surface area of at least 150 $m^2/g$, at least 250 $m^2/g$, at least 400 $m^2/g$, at least 500 $m^2/g$, at least 600 $m^2/g$, at least 700 $m^2/g$, at least 800 $m^2/g$, or at least 900 $m^2/g$, or at least 1000 $m^2/g$, or at least 1100 $m^2/g$.

In one embodiment, the polymer gel comprises a BET specific surface area of 100 $m^2/g$ to 1000 $m^2/g$. Alternatively, the polymer gel comprises a BET specific surface area of between 150 $m^2/g$ and 900 $m^2/g$. Alternatively, the polymer gel comprises a BET specific surface area of between 400 $m^2/g$ and 800 $m^2/g$.

In one embodiment, the polymer gel comprises a tap density of from 0.10 g/cc to 0.60 g/cc. In one embodiment, the polymer gel comprises a tap density of from 0.15 g/cc to 0.25 g/cc. In one embodiment of the present disclosure, the polymer gel comprises a BET specific surface area of at least 150 $m^2/g$ and a tap density of less than 0.60 g/cc. Alternately, the polymer gel comprises a BET specific surface area of at least 250 $m^2/g$ and a tap density of less than 0.4 g/cc. In another embodiment, the polymer gel comprises a BET specific surface area of at least 500 $m^2/g$ and a tap density of less than 0.30 g/cc.

In another embodiment of any of the aspects or variations disclosed herein the polymer gel comprises a residual water content of less than 15%, less than 13%, less than 10%, less than 5% or less than 1%.

In one embodiment, the polymer gel comprises a fractional pore volume of pores at or below 500 angstroms that comprises at least 25% of the total pore volume, 50% of the total pore volume, at least 75% of the total pore volume, at least 90% of the total pore volume or at least 99% of the total pore volume. In another embodiment, the polymer gel comprises a fractional pore volume of pores at or below 20 nm that comprises at least 50% of the total pore volume, at least 75% of the total pore volume, at least 90% of the total pore volume or at least 99% of the total pore volume.

In some embodiments, the amount of nitrogen adsorbed per mass of polymer gel at 0.05 relative pressure is at least 10% of the total nitrogen adsorbed up to 0.99 relative pressure or at least 20% of the total nitrogen adsorbed up to 0.99 relative pressure. In another embodiment, the amount of nitrogen adsorbed per mass of polymer gel at 0.05 relative pressure is between 10% and 50% of the total nitrogen adsorbed up to 0.99 relative pressure, is between 20% and 60% of the total nitrogen adsorbed up to 0.99 relative pressure or is between 20% and 30% of the total nitrogen adsorbed up to 0.99 relative pressure.

In one embodiment, the polymer gel comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the polymer gel comprises a fractional pore surface area of pores at or below 20 nm that comprises at least 50% of the total pore surface area, at least 75% of the total pore surface area, at least 90% of the total pore surface or at least 99% of the total pore surface area.

As described in more detail above, methods for preparing the disclosed carbon materials may include pyrolysis of a polymer gel. In some embodiments, the pyrolyzed polymer gels have a surface area from about 100 to about 1200 m$^2$/g. In other embodiments, the pyrolyzed polymer gels have a surface area from about 500 to about 800 m$^2$/g. In other embodiments, the pyrolyzed polymer gels have a surface area from about 500 to about 700 m$^2$/g.

In other embodiments, the pyrolyzed polymer gels have a tap density from about 0.1 to about 1.0 g/cc. In other embodiments, the pyrolyzed polymer gels have a tap density from about 0.3 to about 0.6 g/cc. In other embodiments, the pyrolyzed polymer gels have a tap density from about 0.3 to about 0.5 g/cc.

In some embodiments, the polymer gels exhibit a mean particle diameter ranging from about 4 μm to about 4 mm. In other embodiments, the mean particle diameter ranges from about 1 μm to about 1 mm. In other embodiments, the mean particle diameter ranges from about 10 μm to about 1 mm. Yet in other embodiments, the mean particle diameter ranges from about 20 μm to about 500 μm. Still in other embodiments, the mean particle diameter ranges from about 500 μm to about 4 mm. Yet still in other embodiments, the mean particle diameter ranges from about 2 μm to about 300 μm. In other embodiments, the mean particle diameter ranges from about 100 μm to about 10 μm. In some embodiments, the mean particle diameter is about 0.9 mm, about 0.8 mm or about 0.5 mm. In other embodiments, the mean particle diameter is about 100 μm, about 50 μm or about 10 μm.

In still other embodiments, the polymer gels comprise a monodisperse, or near monodisperse particle size distribution. For example, in some embodiments the polymer gels have a particle size distribution such that (Dv,90−Dv,10)/Dv,50 is less than 3, wherein Dv,10, Dv,50 and Dv,90 are the particle size at 10%, 50% and 90%, respectively of the particle size distribution by volume. In further embodiments, (Dv,90−Dv,10)/Dv,50 is less than 2 or even less than 1. In still other embodiments, (Dv,90−Dv,10)/Dv,50 is less than 1,000, less than 100, less than 10, less than 5, less than 3, less than 2, less than 1.5 or even less than 1.

Figure 23A:
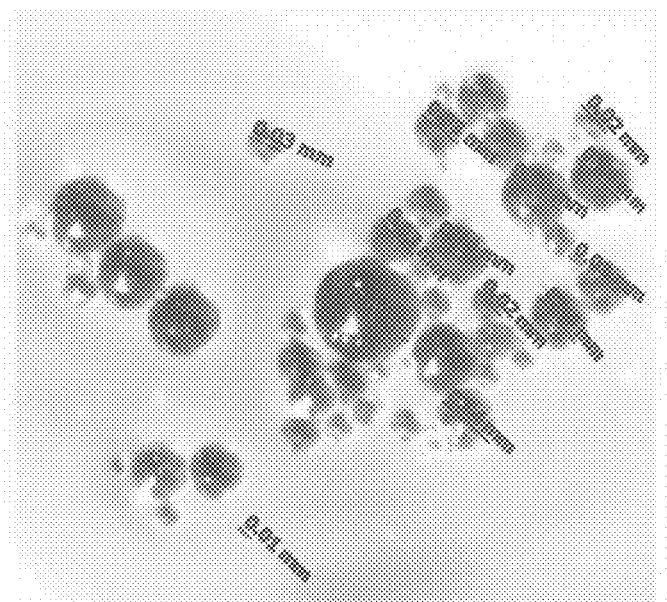
FIGS. 23A and 23B are pictures showing spherical gel particles and spherical carbon material particles, respectively.

In yet other embodiments, the polymer gel particles have a substantially spherical geometry (see e.g., FIG. 23A). Such geometry contributes to a spherical geometry in some embodiments of the resulting carbon particles as discussed in more detail below. In some embodiments, the polymer gels comprise a plurality of polymer gel particles, wherein greater than 90% of the polymer gel particles have a spherical geometry. For example, in some embodiments, greater than 95% of the polymer gel particles have a spherical geometry.

Since the polymer gels may comprise electrochemical modifiers, the elemental content of the gels may vary. In some embodiments, the polymer gels comprise greater than about 100 ppm of an electrochemical modifier. In certain embodiments, the electrochemical modifier is selected from nitrogen, iron, tin, silicon, nickel, aluminum and manganese. In some embodiments, the electrochemical modifier is silicon and in other embodiments the electrochemical modifier is nitrogen.

The amount of electrochemical modifier in the polymer gels is controlled to a level desirable for the final carbon material. Accordingly, in some embodiments, the polymer gel comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the polymer gels comprise between 0.5% and 99.5% carbon and between 0.5% and 99.5% electrochemical modifier. The percent of the electrochemical modifier is calculated on weight percent basis (wt %).

C. Properties of Carbon Materials

One embodiment of the present disclosure provides a carbon material prepared by any of the methods disclosed herein. The pore size distribution of the carbon materials may contribute to the superior performance of electrical devices comprising the carbon materials relative to devices comprising other known carbon materials. For example, in some embodiments, the carbon material comprises an optimized blend of both micropores and mesopores and may also comprise low surface functionality upon pryolysis and/or activation. In other embodiments, the carbon material comprises a total of less than 500 ppm of all elements having atomic numbers ranging from 11 to 92, as measured by proton induced x-ray emission. The high purity and optimized micropore and/or mesopore distribution make the carbon materials ideal for use in electrical storage and distribution devices, for example ultracapacitors.

While not wishing to be bound by theory, Applicants believe the optimized pore size distributions, as well as the high purity, of the disclosed carbon materials can be attributed, at least in part, to the disclosed emulsion/suspension polymerization methods. The properties of the disclosed carbon materials, as well as methods for their preparation are discussed in more detail below.

While not wishing to be bound by theory, it is believed that, in addition to the pore structure, the purity profile, surface area and other properties of the carbon materials are a function of its preparation method, and variation of the preparation parameters may yield carbon materials having different properties. Accordingly, in some embodiments, the carbon material is a pyrolyzed dried polymer gel, for example, a pyrolyzed polymer cryogel, a pyrolyzed polymer xerogel or a pyrolyzed polymer aerogel. In other embodiments, the carbon material is pyrolyzed and activated (e.g., a synthetic activated carbon material). For example, in further embodiments the carbon material is an activated dried polymer gel, an activated polymer cryogel, an activated polymer xerogel or an activated polymer aerogel.

As noted above, activated carbon particles are widely employed as an energy storage material. In this regard, a critically important characteristic is high power density, which is possible with electrodes that have low ionic resistance that yield high frequency response. It is important to achieve a low ionic resistance, for instance in situations with device ability to respond to cyclic performance is a constraint. The disclosed methods are useful for preparing carbon material that solves the problem of how to optimize an electrode formulation and maximize the power performance of electrical energy storage and distribution devices. Devices comprising the carbon materials exhibit long-term stability, fast response time and high pulse power performance.

In some embodiments, the disclosed methods produce carbon materials comprising micropore and/or mesopore structure, which is typically described in terms of fraction (percent) of total pore volume residing in either micropores or mesopores or both. Accordingly, in some embodiments the pore structure of the carbon materials comprises from 20% to 90% micropores. In other embodiments, the pore structure of the carbon materials comprises from 30% to 70% micropores. In other embodiments, the pore structure of the carbon materials comprises from 40% to 60% micropores. In other embodiments, the pore structure of the carbon materials comprises from 40% to 50% micropores. In other embodiments, the pore structure of the carbon materials comprises from 43% to 47% micropores. In certain embodiments, the pore structure of the carbon materials comprises about 45% micropores.

The mesoporosity of the carbon materials may contribute to high ion mobility and low resistance. In some embodiments, the pore structure of the carbon materials comprises from 20% to 80% mesopores. In other embodiments, the pore structure of the carbon materials comprises from 30% to 70% mesopores. In other embodiments, the pore structure of the carbon materials comprises from 40% to 60% mesopores. In other embodiments, the pore structure of the carbon materials comprises from 50% to 60% mesopores. In other embodiments, the pore structure of the carbon materials comprises from 53% to 57% mesopores. In other embodiments, the pore structure of the carbon materials comprises about 55% mesopores.

An optimized blend of micropores and mesopores within the carbon materials may contribute to the enhanced electrochemical performance of the same. Thus, in some embodiments the pore structure of the carbon materials comprises from 20% to 80% micropores and from 20% to 80% mesopores. In other embodiments, the pore structure of the carbon materials comprises from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials comprises from 40% to 50% micropores and from 50% to 60% mesopores. In other embodiments, the pore structure of the carbon materials comprises from 43% to 47% micropores and from 53% to 57% mesopores. In other embodiments, the pore structure of the carbon materials comprises about 45% micropores and about 55% mesopores.

In other variations, the carbon materials do not have a substantial volume of pores greater than 20 nm. For example, in certain embodiments the carbon materials comprise less than 25%, less than 20%, less than 15%, less than 10%, less than 5%, less than 2.5% or even less than 1% of the total pore volume in pores greater than 20 nm.

The porosity of the carbon materials contributes to their enhanced electrochemical performance. Accordingly, in one embodiment the carbon material comprises a pore volume residing in pores less than 20 angstroms of at least 1.8 cc/g, at least 1.2, at least 0.6, at least 0.30 cc/g, at least 0.25 cc/g, at least 0.20 cc/g or at least 0.15 cc/g. In other embodiments, the carbon material comprises a pore volume residing in pores greater than 20 angstroms of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 0.4 cc/g, at least 0.2 cc/g or at least 0.1 cc/g.

In other embodiments, the carbon material comprises a pore volume of at least 7.00 cc/g, at least 5.00 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 500 angstroms.

In other embodiments, the carbon material comprises a pore volume of at least at least 7.00 cc/g, at least 5.00 cc/g, 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 300 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1 micron.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 3 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 4 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5 microns.

In yet other embodiments, the carbon materials comprise a total pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g or at least 0.10 cc/g.

In yet other embodiments, the carbon materials comprise a pore volume residing in pores of less than 20 angstroms of at least 0.2 cc/g and a pore volume residing in pores of between 20 and 300 angstroms of at least 0.8 cc/g. In yet other embodiments, the carbon materials comprise a pore volume residing in pores of less than 20 angstroms of at least 0.5 cc/g and a pore volume residing in pores of between 20 and 300 angstroms of at least 0.5 cc/g. In yet other embodiments, the carbon materials comprise a pore volume residing in pores of less than 20 angstroms of at least 0.6 cc/g and a pore volume residing in pores of between 20 and 300 angstroms of at least 2.4 cc/g. In yet other embodiments, the carbon materials comprise a pore volume residing in pores of less than 20 angstroms of at least 1.5 cc/g and a pore volume residing in pores of between 20 and 300 angstroms of at least 1.5 cc/g.

In some embodiments, the pores of the carbon material comprise a peak pore volume ranging from 2 nm to 10 nm. In other embodiments, the peak pore volume ranges from 10 nm to 20 nm. Yet in other embodiments, the peak pore volume ranges from 20 nm to 30 nm. Still in other embodiments, the peak pore volume ranges from 30 nm to 40 nm. Yet still in other embodiments, the peak pore volume ranges from 40 nm to 50 nm. In other embodiments, the peak pore volume ranges from 50 nm to 100 nm.

In certain embodiments a mesoporous carbon material having low pore volume in the micropore region (e.g., less than 60%, less than 50%, less than 40%, less than 30%, less than 20% microporosity) is prepared by the disclosed methods. For example, the mesoporous carbon can be a polymer gel that has been pyrolyzed, but not activated. In some embodiments, the pyrolyzed mesoporous carbon comprises a specific surface area of at least 400 m$^2$/g, at least 500 m$^2$/g, at least 600 m$^2$/g, at least 675 m$^2$/g or at least 750 m$^2$/g. In other embodiments, the mesoporous carbon material comprises a total pore volume of at least 0.50 cc/g, at least 0.60 cc/g, at least 0.70 cc/g, at least 0.80 cc/g or at least 0.90 cc/g. In yet other embodiments, the mesoporous carbon material comprises a tap density of at least 0.30 g/cc, at least 0.35 g/cc, at least 0.40 g/cc, at least 0.45 g/cc, at least 0.50 g/cc or at least 0.55 g/cc.

In other embodiments, the carbon materials comprise a total pore volume ranging greater than or equal to 0.1 cc/g, and in other embodiments the carbon materials comprise a total pore volume less than or equal to 0.6 cc/g. In other embodiments, the carbon materials comprise a total pore volume ranging from about 0.1 cc/g to about 0.6 cc/g. In some other embodiments, the total pore volume of the carbon materials ranges from about 0.1 cc/g to about 0.2 cc/g. In some other embodiments, the total pore volume of the carbon materials ranges from about 0.2 cc/g to about 0.3 cc/g. In some other embodiments, the total pore volume of the carbon materials ranges from about 0.3 cc/g to about 0.4 cc/g. In some other embodiments, the total pore volume of the carbon materials ranges from about 0.4 cc/g to about 0.5 cc/g. In some other embodiments, the total pore volume of the carbon materials ranges from about 0.5 cc/g to about 0.6 cc/g.

The carbon material comprises low total PIXE impurities. Thus, in some embodiments the total PIXE impurity content of all other PIXE elements in the carbon material (as measured by proton induced x-ray emission) is less than 1000 ppm. In other embodiments, the total PIXE impurity content of all other PIXE elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low content of undesired PIXE impurities, the disclosed carbon materials may comprise high total carbon content. In addition to carbon, the carbon material may also comprise oxygen, hydrogen, nitrogen and the electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

In other embodiments, the carbon content is greater than 98 wt. % as measured by CHNO analysis. In another embodiment, the carbon content ranges from 50 to 98 wt. % of the total mass. In yet other embodiments, the carbon content ranges 90 to 98 wt. % of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass.

In another embodiment, the nitrogen content ranges from 0 to 30 wt. % as measured by CHNO analysis. In another embodiment, the nitrogen content ranges from 1 to 10 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %.

The carbon and nitrogen content may also be measured as a ratio of C:N. In one embodiment, the C:N ratio ranges from 1:0.001 to 1:1. In another embodiment, the C:N ratio ranges from 1:0.001 to 0.01. In yet another embodiment, the C:N ratio ranges from 1:0.01 to 1:1. In yet another embodiment, the content of nitrogen exceeds the content of carbon.

The carbon materials may also comprise an electrochemical modifier (i.e., a dopant) selected to optimize the electrochemical performance of the carbon materials. The electrochemical modifier may be added during the polymerization step as described above. For example, the electrochemical modifier may added to the above described mixture, continuous phase or polymer phase, or included within the polymerization process in any other manner.

The electrochemical modifier may be incorporated within the pore structure and/or on the surface of the carbon material or incorporated in any number of other ways. For example, in some embodiments, the carbon materials comprise a coating of the electrochemical modifier (e.g., $Al_2O_3$) on the surface of the carbon materials. In some embodiments, the carbon materials comprise greater than about 100 ppm of an electrochemical modifier. In certain embodiments, the electrochemical modifier is selected from iron, tin, silicon, nickel, aluminum and manganese. In some embodiments, the electrochemical modifier is silicon and in other embodiments the electrochemical modifier is nitrogen.

In certain embodiments the electrochemical modifier comprises an element with the ability to lithiate from 3 to 0 V versus lithium metal (e.g. silicon, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$.

The electrochemical properties of the carbon materials can be modified, at least in part, by the amount of the electrochemical modifier in the carbon material. Accordingly, in some embodiments, the carbon material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the carbon materials comprise between 0.5% and 99.5% carbon and between 0.5% and 99.5% electrochemical modifier. The percent of the electrochemical modifier is calculated on weight percent basis (wt %). In some other more specific embodiments, the electrochemical modifier is selected from iron, tin, silicon, nickel and manganese.

The total ash content of the carbon material may, in some instances, have an effect on the electrochemical performance of the carbon material. Accordingly, in some embodiments, the ash content of the carbon material ranges from 0.1% to 0.001% weight percent ash, for example in some specific embodiments the ash content of the carbon material is less than 0.1%, less than 0.08%, less than 0.05%, less than 0.03%, than 0.025%, less than 0.01%, less than 0.0075%, less than 0.005% or less than 0.001%.

In other embodiments, the carbon material comprises a total PIXE impurity content of less than 500 ppm and an ash content of less than 0.08%. In further embodiments, the carbon material comprises a total PIXE impurity content of less than 300 ppm and an ash content of less than 0.05%. In other further embodiments, the carbon material comprises a total PIXE impurity content of less than 200 ppm and an ash content of less than 0.05%. In other further embodiments, the carbon material comprises a total PIXE impurity content of less than 200 ppm and an ash content of less than 0.025%. In other further embodiments, the carbon material comprises a total PIXE impurity content of less than 100 ppm and an ash content of less than 0.02%. In other further embodiments, the carbon material comprises a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the carbon material is less than 1000 ppm, less than 500 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some embodiments, the carbon material comprises undesired PIXE impurities near or below the detection limit of the proton induced x-ray emission analysis. For example, in some embodiments the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials may also comprise a high surface area. While not wishing to be bound by theory, it is thought that the high surface area may contribute, at least in part, to their superior electrochemical performance. Accordingly, in some embodiments, the carbon material comprises a BET specific surface area of at least 100 m$^2$/g, at least 300 m$^2$/g, at least 500 m$^2$/g, at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. In other embodiments, the BET specific surface area ranges from about 100 m$^2$/g to about 3000 m$^2$/g, for example from about 500 m$^2$/g to about 1000 m$^2$/g, from about 1000 m$^2$/g to about 1500 m$^2$/g, from about 1500 m$^2$/g to about 2000 m$^2$/g, from about 2000 m$^2$/g to about 2500 m$^2$/g or from about 2500 m$^2$/g to about 3000 m$^2$/g. For example, in some embodiments of the foregoing, the carbon material is activated.

In some specific embodiments the surface area ranges from about 50 m$^2$/g to about 1200 m$^2$/g for example from about 50 m$^2$/g to about 400 m$^2$/g. In other particular embodiments, the surface area ranges from about 200 m$^2$/g to about 300 m$^2$/g for example the surface area may be about 250 m$^2$/g.

In another embodiment, the carbon material comprises a tap density between 0.1 and 1.0 g/cc, between 0.2 and 0.8 g/cc, between 0.3 and 0.5 g/cc or between 0.4 and 0.5 g/cc. In another embodiment, the carbon material has a total pore volume of at least 0.1 cm$^3$/g, at least 0.2 cm$^3$/g, at least 0.3 cm$^3$/g, at least 0.4 cm3/g, at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g or at least 1.6 cm$^3$/g.

The pore size distribution of the disclosed carbon materials is one parameter that may have an effect on the electrochemical performance of the carbon materials. For example, the carbon materials may comprise mesopores with a short effective length (i.e., less than 10 nm, less than 5, nm or less than 3 nm as measured by TEM) which decreases ion diffusion distance and may be useful to enhance ion transport and maximize power. Accordingly, in one embodiment, the carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the carbon material comprises a fractional pore volume of pores at or below 20 nm that comprises at least 50% of the total pore volume, at least 75% of the total pore volume, at least 90% of the total pore volume or at least 99% of the total pore volume.

In another embodiment, the carbon material comprises a fractional pore surface area of pores between 20 and 300 angstroms that comprises at least 40% of the total pore surface area, at least 50% of the total pore surface area, at least 70% of the total pore surface area or at least 80% of the total pore surface area. In another embodiment, the carbon material comprises a fractional pore surface area of pores at or below 20 nm that comprises at least 20% of the total pore surface area, at least 30% of the total pore surface area, at least 40% of the total pore surface area or at least 50% of the total pore surface area.

In another embodiment, the carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or below 20 nm that comprises at least 50% of the total pore surface area, at least 75% of the total pore surface area, at least 90% of the total pore surface area or at least 99% of the total pore surface area.

In another embodiment, the carbon material comprises pores predominantly in the range of 1000 angstroms or lower, for example 100 angstroms or lower, for example 50 angstroms or lower. Alternatively, the carbon material comprises micropores in the range of 0-20 angstroms and mesopores in the range of 20-300 angstroms. The ratio of pore volume or pore surface in the micropore range compared to the mesopore range can be in the range of 95:5 to 5:95. Alternatively, the ratio of pore volume or pore surface in the micropore range compared to the mesopore range can be in the range of 20:80 to 60:40.

In other embodiments, the carbon materials are mesoporous and comprise monodisperse mesopores. As used herein, the term "monodisperse" when used in reference to a pore size refers generally to a span (further defined as (Dv,90−Dv,10)/Dv,50 where Dv,10, Dv,50 and Dv,90 refer to the pore size at 10%, 50% and 90% of the distribution by volume of about 3 or less, typically about 2 or less, often about 1.5 or less.

Yet in other embodiments, the carbons materials comprise a pore volume of at least 1 cc/g, at least 2 cc/g, at least 3 cc/g, at least 4 cc/g or at least 7 cc/g. In one particular embodiment, the carbon materials comprise a pore volume of from 1 cc/g to 7 cc/g.

In other embodiments, the carbon materials comprise at least 50% of the total pore volume residing in pores with a diameter ranging from 50 Å to 5000 Å. In some instances, the carbon materials comprise at least 50% of the total pore volume residing in pores with a diameter ranging from 50 Å to 500 Å. Still in other instances, the carbon materials comprise at least 50% of the total pore volume residing in pores with a diameter ranging from 500 Å to 1000 Å. Yet in other instances, the carbon materials comprise at least 50% of the total pore volume residing in pores with a diameter ranging from 1000 Å to 5000 Å.

In some embodiments, the mean particle diameter for the carbon materials ranges from 1 to 1000 microns. In other embodiments the mean particle diameter for the carbon materials ranges from 1 to 100 microns. Still in other embodiments the mean particle diameter for the carbon materials ranges from 1 to 50 microns. Yet in other embodiments, the mean particle diameter for the carbon materials ranges from 5 to 15 microns or from 1 to 5 microns. Still in other embodiments, the mean particle diameter for the carbon materials is about 10 microns. Still in other embodiments, the mean particle diameter for the carbon materials is less than 4, is less than 3, is less than 2, is less than 1 microns.

In some embodiments, the carbon materials exhibit a mean particle diameter ranging from 1 nm to 10 nm. In other embodiments, the mean particle diameter ranges from 10 nm to 20 nm. Yet in other embodiments, the mean particle diameter ranges from 20 nm to 30 nm. Still in other embodiments, the mean particle diameter ranges from 30 nm to 40 nm. Yet still in other embodiments, the mean particle diameter ranges from 40 nm to 50 nm. In other embodiments, the mean particle diameter ranges from 50 nm to 100 nm. In other embodiments, the mean particle diameter ranges from about 1 μm to about 1 mm. In other embodiments, the mean particle diameter ranges from about 100 μm to about 10 μm. In other embodiments, the mean particle diameter is about 100 μm, about 50 μm or about 10 μm.

In some embodiments, the mean particle diameter for the carbons ranges from 1 to 1000 microns. In other embodiments the mean particle diameter for the carbon ranges from 1 to 100 microns. Still in other embodiments the mean particle diameter for the carbon ranges from 5 to 50 microns. Yet in other embodiments, the mean particle diameter for the carbon ranges from 5 to 15 microns. Still in other embodiments, the mean particle diameter for the carbon is about 10 microns.

In some embodiments, the carbon materials exhibit a mean particle diameter ranging from 1 micron to 5 microns. In other embodiments, the mean particle diameter ranges from 5 microns to 10 microns. In yet other embodiments, the mean particle diameter ranges from 10 nm to 20 microns. Still in other embodiments, the mean particle diameter ranges from 20 nm to 30 microns. Yet still in other embodiments, the mean particle diameter ranges from 30 microns to 40 microns. Yet still in other embodiments, the mean particle diameter ranges from 40 microns to 50 microns. In other embodiments, the mean particle diameter ranges from 50 microns to 100 microns. In other embodiments, the mean particle diameter ranges in the submicron range <1 micron.

In related embodiments, the carbon materials exhibit a mean particle diameter ranging from 0.1 mm micron to 4 mm. In other embodiments, the mean particle diameter ranges from 0.5 mm to 4 mm. In yet other embodiments, the mean particle diameter ranges from 0.5 mm to 3 mm. Still in other embodiments, the mean particle diameter ranges from 0.5 mm to 2 mm. In other embodiments, the mean particle diameter ranges from 0.5 mm to 1 mm. In certain embodiments, the mean particle diameter is about 0.9 mm, about 0.8 mm or about 0.5 mm.

In still other embodiments, the carbon materials comprise a monodisperse, or near monodisperse particle size distribution. For example, in some embodiments the carbon material has a particle size distribution such that (Dv,90−Dv,10)/Dv,50 is less than 3, wherein Dv,10, Dv,50 and Dv,90 are the particle size at 10%, 50% and 90%, respectively of the particle size distribution by volume. In further embodiments, (Dv,90−Dv,10)/Dv,50 is less than 2 or even less than 1. In still other embodiments, (Dv,90−Dv,10)/Dv,50 is less than 1,000, less than 100, less than 10, less than 5, less than 3, less than 2, less than 1.5 or even less than 1.

Figure 23B:
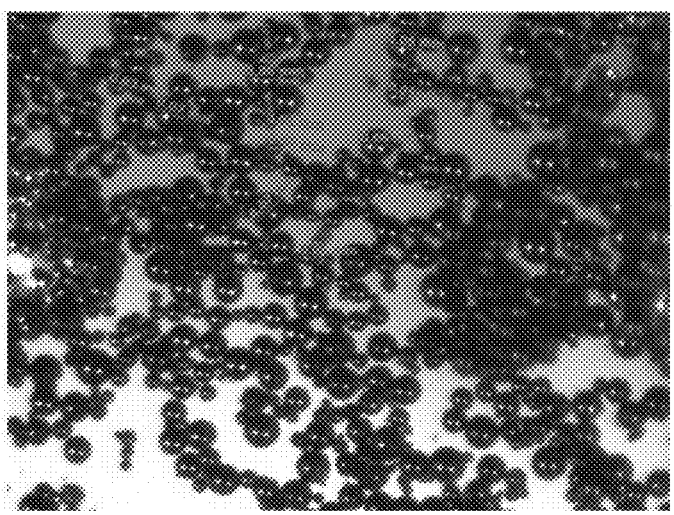

In yet other embodiments, the carbon materials comprise carbon particles having a substantially spherical geometry as determined by optical microscopy and image analysis (see e.g., FIG. 23B). For example, greater than 90%, greater than 95% or even greater than 99% of the carbon particles may have a spherical geometry. Such geometry may improve the performance of any number of electrical devices comprising the carbon materials since the geometry is known to affect particle packing (and thus energy density). In some embodiments, carbon material comprises a plurality of carbon particles, wherein greater than 90% of the carbon particles have a spherical geometry. For example, in some embodiments, greater than 95% of the carbon particles have a spherical geometry.

As noted above, the presently disclosed methods advantageously provide polymer gels and/or carbon materials having optimized particle size distributions. In some embodiments, the particle size distribution contributes to enhanced packing of the individual polymer or carbon particles. Enhanced packing of energy storage particles, for example carbon particles, can be beneficial for a variety of applications. For example, activated carbon materials comprising high surface areas are routinely used in energy storage devices such as capacitors, particularly supercapacitors. Typically such high-surface area carbon materials tend to have low densities, and thus their capacitance on a volume basis (i.e., volumetric capacitance) is relatively low. For practical applications, capacitors require both high gravimetric and high volumetric capacitance. For devices that are constrained with respect to size, volumetric capacitance can be increased by more densely packing the activated carbon particles. Traditional milling of activated carbon materials yields powders having a distribution of particle sizes and a wide and random range of structures (i.e., non-spherical particle shapes). These characteristics limit the ability of activated carbon powders to be densely packed, thus limiting the volumetric capacitance that can be achieved by the same. Carbon materials having enhanced packing properties are described herein and in co-pending U.S. application Ser. No. 13/250,430, which is incorporated herein by reference in its entirety for all purposes.

The present inventors have discovered that the density (i.e., particle packing) of carbon materials can be optimized by preparation according to the presently disclosed methods. By controlling the particle size distribution of the carbon particles, enhanced packing of the particles can be achieved. To this end, a number of different models have been proposed for the optimum packing of multisized particles. Two equations in this regard are the formulas provided by Furnas (C. C. Furnas, "Grading Aggregates: I", Ind. Eng. Chem. 23:1052-58, 1931; F. O. Anderegg, "Grading Aggregates: II", Ind. Eng. Chem. 23:1058-64), and Andreassen (A. H. M. Andreassen and J. Andersen, Kolloid Z. 50:217-228, 1931). Furnas' equation assumes the addition of particles of smaller and smaller size, while Andreassen's equation assumes the addition of particles of larger and larger size. Further, since the Furnas equation provides a theoretical distribution, while that of Andreassen is semi-empirical, the Andreassen equation has been critized for implying an infinite distribution with no minimum particle size.

To address this shortcoming, a modified equation has been developed that links the Furnas and Andreassen equations, referred to as the "modified Andreassen equation" or the "Dinger-Funk equation" (D. R. Dinger and J. E. Funk, Interceram 41(5):332-334, 1992). While the Andreassen equation gives a straight line on a logarithmic plot, the modified Andreasssen equation gives a downward curvature since it takes into account a minimum particle size ($d_m$) of the distribution. The Andreassen equation (1) and the modified Andreassen equation (2) are presented below:

$$CPFT = \left(\frac{d}{D}\right)^q * 100 \quad \text{(Eq. 1)}$$

$$CPFT = \frac{(d^q - d_m^q)}{(Dq - d_m^q)} * 100 \quad \text{(Eq. 2)}$$

wherein
CPFT=Cumulative Percent Finer Than (Cumulative Finer Volume distribution);
d=Particle size;
$d_m$=Minimum particle size of the distribution;
D=Maximum particle size; and
q=Distribution coefficient ("q-value").

It should be noted that the above minimum particle size distributions are based on volumes. This requires that mixtures of powders with different densities be converted to volumes in order to give volume percent. An important feature of the modified Andreassen equation is influence of the q-value on packing. By computer simulations, the modified Andreassen equation describes 100% packing density for infinite distributions when the q-value is 0.37 or lower (D. R. Dinger and J. E. Funk, Interceram 42(3):150-152, 1993). Of course, as has also been described in the art, real-world systems are finite, and thus 100% packing density is only achievable in theory. For q-values about 0.37, some degree of porosity will be present. Thus, for optimum packing the q-value should not exceed 0.37 and typically ranges from 0.30 to 0.37 for densely packed materials.

One method for accessing the particle packing properties of a carbon material, or other energy storage material, is to compare a plot of the cumulative finer volume distribution vs. particle size for the carbon material to the modified Andreassen equation curve. The correlation coefficient (i.e., R value) of the carbon material curve relative to the modified Andreassen equation curve is an indicator of the extent of packing optimization within the carbon material. A correlation coefficient of 1.0 relative to the modified Andreassen equation curve would indicate that optimum packing of the carbon particles within the carbon material has been achieved. Accordingly, in one embodiment the present methods are useful for preparation of a carbon material (or polymer gel) comprising a plurality of carbon particles, wherein the plurality of carbon particles comprises a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3. In other embodiments, the correlation coefficient of a plot of the cumulative finer volume distribution vs. particle size of carbon materials prepared according to the disclosed methods comprises a correlation coefficient of 0.90 or greater, 0.95 or greater, 0.96 or greater, 0.97 or greater, 0.98 or greater, 0.99 or greater or even 0.995 or greater relative to the modified Andreassen equation for the given particle size distribution.

Another measure of the particle packing properties of an energy storage material is the packing ratio when incorporated into an electrode. While this metric may not correlate directly with the data obtained by comparing the particle size distribution to the modified Andreassen equation, it serves as another means to assess the packing efficiency of energy storage particles. The packing ratio is a measure of the density of the finished electrode compared to the expected density based on the mass and volume of the electrode components. A packing ratio of 1.0 would indicate that optimized packing has been achieved. A packing ratio of less than one indicates that less than optimum packing has been achieved, and a packing ratio of greater than one indicates that packing is optimized beyond that expected based on the mass and volume of the combined electrode components.

In some embodiments, the packing ratio of the disclosed carbon materials even exceeds 1.0. Such increased packing ratios provide for improved volumetric performance relative to carbon materials comprising a lower packing ratio. Accordingly, in some embodiments the disclosed carbon materials comprise packing ratios of 0.95 or greater, 0.97 or greater, 1.0 or greater, 1.05 or greater, 1.10 or greater, 1.15 or greater or 1.20 or greater.

In addition to an increased packing ratio, carbon materials prepared according to the disclosed methods have advantageously high calendar ratios. The calendar ratio is determined as a ratio of the thickness of an electrode after it is calendared (i.e., rolled flat) compared to the thickness prior to calendaring (after coating and drying). For example, a calendar ratio of 50% indicates the thickness of the electrode has decreased by one-half upon calendaring. A higher calendaring ratio allows preparation of electrodes comprising more carbon per unit volume, and hence a higher energy density (i.e., volumetric capacity). Other known carbon electrodes materials cannot be calendared to such high calendar ratios and instead become brittle and delaminate from the electrode substrate. Accordingly, in some embodiments the presently disclosed carbon materials have a calendar ratio of at least 10%, at least 20%, at least 30%, at least 35%, at least 40%, at least 45%, at least 50%, at least 55% or at least 60%.

The particle size distribution of the carbon materials is an important factor in their electrochemical performance. In some embodiments, carbon materials prepared according to the disclosed methods comprise a plurality of carbon particles having particle sizes ranging from about 0.01 μm to about 50 μm. In other embodiments, the particle size distribution comprises particle sizes ranging from about 0.01 μm to about 20 μm. For example, in some embodiments the particle size distribution comprises particle sizes ranging from about 0.03 μm to about 17 μm or from about 0.04 μm to about 12 μm. In certain embodiments of the foregoing, at least 90%, at least 95% or at least 99% of the carbon particles having particles sizes in the range of about 0.01 μm to about 50 μm, about 0.01 μm to about 20 μm, about 0.03 μm to about 17 μm or about 0.04 μm to about 12 μm.

In some embodiments, the disclosed methods result in a carbon material having a trimodal particle size distribution. Such trimodal particle size distributions may contribute to optimal particle packing, and thus energy density, of the carbon materials. Accordingly, one embodiment provides a carbon material, and methods for preparation of the same, having a particle size distribution. For example, in some embodiments the carbon materials comprise a trimodal particle size distribution having first, second and third particle size maxima. The first particle size maximum may range from about 0.08 μm to about 0.2 μm, for example from about 0.09 μm to about 0.2 μm, from about 0.1 μm to about 0.2 μm or from about 0.1 μm to about 0.15 μm. The second particle size maximum may range from about 0.8 μm to about 2.0 μm, from about 0.8 μm to about 1.5 μm or from about 0.9 μm to about 1.0 μm. The third particle size maximum may range from about 7.0 μm to about 15.0 μm, from about 8.0 μm to about 12.0 μm or from about 9.0 μm to about 10.0 μm.

Alternatively, the particle size of the various carbons comprising the highly packed electrode can be described in terms of their size relative to the electrode thickness. For instance, a highly packed bimodal particle distribution comprised of particles with a first collection of particles of mean particle size A μm and a second collection of particles with mean size B μm and an electrode thickness C μm. In one embodiment, the particles are comprised such that A:B is between about 100:1 and 2:1, for example between about 50:1 and 5:1, for example about 10:1; and C:A is between about 2:1 and 100:1, for example between about 2:1 and 10:1, for example about 5:1.

In another embodiment, the carbon materials prepared according to the disclosed methods comprise a highly packed trimodal particle distribution comprised of particles with a first collection of particles of mean particle size A μm and a second collection of particles with mean size B μm and a third collection of particles with mean size C μm and an electrode thickness D μm. In one embodiment, the particles are comprised such that A:B and B:C are between about 100:1 and 2:1, for example between about 50:1 and 5:1, for example about 10:1; and D:A is between about 2:1 and 100:1, for example between about 2:1 and 10:1, for example about 5:1.

Applicants have also discovered the tap density of the carbon materials prepared according to the disclosed methods to be unexpectedly high. In this regard, the high tap densities are also believed to contribute, at least in part, to the unexpectedly high energy densities of the carbon materials. In some embodiments, the disclosed carbon material has a tap density between 0.2 and 0.6 g/cc, between 0.3 and 0.5 g/cc or between 0.4 and 0.5 g/cc. In another embodiment, the disclosed carbon material has a total pore volume of at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g, at least 1.6 cm$^3$/g, at least 1.7 cm$^3$/g, at least 1.8 cm$^3$/g, at least 1.9 cm$^3$/g or at least 2.0 cm$^3$/g.

Applicants have also discovered that the carbon materials described herein achieve unexpected increase to extremely high carbon surface area per unit volume. This surface area per unit volume is calculated as the product of the carbon specific surface area (for example, as determined from nitrogen sorption methodology) and the tap density. For example, applicants have found that the internal carbon surface area per unit volume can be increased from about 460 m$^2$/cc to about 840 m$^2$/cc, representing about an 83% increase over other known carbons.

D. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of impurities present in the carbon materials is determined by PIXE analysis.

E. Devices Comprising the Carbon Materials

One embodiment of the present invention is an electrode, or a device comprising the same, which comprises the disclosed carbon materials. Useful devices in this regard include, but are not limited to, the devices described below and in co-pending U.S. application Ser. Nos. 12/748,219; 12/897,969; 12/829,282; 13/046,572; 12/965,709; 13/336,975; and 61/585,611, each of which are hereby incorporated by reference in their entireties.

1. EDLCs

The disclosed carbon materials can be used as electrode material in any number of electrical energy storage and distribution devices. One such device is an ultracapacitor. Ultracapacitors comprising carbon materials are described in detail in co-owned U.S. Pat. No. 7,835,136 which is hereby incorporated in its entirety.

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material can be employed in various electronic devices where high power is desired. Accordingly, in one embodiment an electrode comprising the carbon materials is provided. In another embodiment, the electrode comprises activated carbon material. In a further embodiment, an ultracapacitor comprising an electrode comprising the carbon materials is provided. In a further embodiment of the foregoing, the ultrapure synthetic carbon material comprises an optimized balance of micropores and mesopores and described above.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

In one embodiment, the present disclosure is directed to a device comprising the carbon materials described herein, wherein the device is an electric double layer capacitor (EDLC) device comprising:

a) a positive electrode and a negative electrode wherein each of the positive and the negative electrodes comprise the carbon material;

b) an inert porous separator; and c) an electrolyte;

wherein the positive electrode and the negative electrode are separated by the inert porous separator.

In one embodiment, an ultracapacitor device comprising the carbon material comprises a gravimetric power of at least 5 W/g, at least 10 W/g, at least 15 W/g, at least 20 W/g, at least 25 W/g, at least 30 W/g, at least 35 W/g, at least 50 W/g. In another embodiment, an ultracapacitor device comprising the carbon material comprises a volumetric power of at least 2 W/g, at least 4 W/cc, at least 5 W/cc, at least 10 W/cc, at least 15 W/cc or at least 20 W/cc. In another embodiment, an ultracapacitor device comprising the carbon material carbon material comprises a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 Wh/kg or at least 25.0 Wh/kg. In another embodiment, an ultracapacitor device comprising the carbon material comprises a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device comprising the carbon material are measured by constant current discharge from 2.7 V to 1.89 V employing a 1.0 M solution of tetraethyl-ammonium-tetrafluroroborate in acetonitrile (1.0 M TEATFB in AN) electrolyte and a 0.5 second time constant.

In one embodiment, an ultracapacitor device comprising the carbon material comprises a gravimetric power of at least 10 W/g, a volumetric power of at least 5 W/cc, a gravimetric capacitance of at least 100 F/g (@0.5 A/g) and a volumetric capacitance of at least 10 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluroborate or triethylmethyl aminotetrafluroborate or other electrolyte salt known in the art, or liquid electrolyte known in the art.

In one embodiment, an ultracapacitor device comprising the carbon material comprises a gravimetric power of at least 15 W/g, a volumetric power of at least 10 W/cc, a gravimetric capacitance of at least 110 F/g (@0.5 A/g) and a volumetric capacitance of at least 15 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluroborate or triethylmethyl aminotetrafluroborate or other electrolyte salt known in the art, or liquid electrolyte known in the art.

In one embodiment, an ultracapacitor device comprising the carbon material comprises a gravimetric capacitance of at least 90 F/g, at least 95 F/g, at least 100 F/g, at least 105 F/g, at least 110 F/g, at least 115 F/g, at least 120 F/g, at least 125 F/g, or at least 130 F/g. In another embodiment, an ultracapacitor device comprising the carbon material comprises a volumetric capacitance of at least 5 F/cc, at least 10 F/cc, at least 15 F/cc, at least 20 F/cc, at least 25 F/cc, or at least 30 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluroroborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors comprising a carbon material as disclosed herein, wherein the percent decrease in original capacitance (i.e., capacitance before being subjected to voltage hold) of the ultracapacitor comprising the carbon material after a voltage hold period is less than the percent decrease in original capacitance of an ultracapacitor comprising known carbon materials. In one embodiment, the percent of original capacitance remaining for an ultracapacitor comprising the carbon material after a voltage hold at 2.7 V for 24 hours at 65° C. is at least 90%, at least 80%, at least 70%, at least 60%, at least 50%, at least 40%, at least 30% at least 20% or at least 10%. In further embodiments of the foregoing, the percent of original capacitance remaining after the voltage hold period is measured at a current density of 0.5 A/g, 1 A/g, 4 A/g or 8 A/g.

In another embodiment, the present disclosure provides ultracapacitors comprising a carbon material as disclosed herein, wherein the percent decrease in original capacitance of the ultracapacitor comprising the carbon material after repeated voltage cycling is less than the percent decrease in original capacitance of an ultracapacitor comprising known carbon materials subjected to the same conditions. For example, in one embodiment, the percent of original capacitance remaining for an ultracapacitor comprising the carbon material is more than the percent of original capacitance remaining for an ultracapacitor comprising known carbon materials after 1000, 2000, 4000, 6000, 8000, or 1000 voltage cycling events comprising cycling between 2 V and 1V at a current density of 4 A/g. In another embodiment, the percent of original capacitance remaining for an ultracapacitor comprising the carbon material after 1000, 2000, 4000, 6000, 8000, or 1000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

As noted above, the carbon material can be incorporated into ultracapacitor devices. In some embodiments, the carbon material is milled to an average particle size of about 10 microns using a jetmill according to the art. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling the carbon is blended with a fibrous Teflon binder (3% by weight) to hold the particles together in a sheet. The carbon Teflon mixture is kneaded until a uniform consistency is reached. Then the mixture is rolled into sheets using a high-pressure rollerformer that results in a final thickness of 50 microns. These electrodes are punched into discs and heated to 195° C. under a dry argon atmosphere to remove water and/or other airborne contaminants. The electrodes are weighed and their dimensions measured using calipers.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl,methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide.

In some embodiments, the electrodes are wetted with a 1.0 M solution of tetraethylammonium-tetrafluroroborate in acetonitrile (1.0 M TEATFB in AN) electrolyte. In other embodiments, the electrodes are wetted with a 1.0 M solution of tetraethylammonium-tetrafluroroborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for about 20 minutes or more depending on the porosity of the sample.

In some embodiments, the capacitance and power output are measured using cyclic voltametry (CV), chronopotentiometry (CP) and impedance spectroscopy at various voltages (ranging from 1.0-2.5 V maximum voltage) and current levels (from 1-10 mA) on a Biologic VMP3 electrochemical workstation. In this embodiment, the capacitance may be calculated from the discharge curve of the potentiogram using the formula:

$$C = \frac{I \times \Delta t}{\Delta V} \qquad \text{Equation 1}$$

where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_s = 2C/m_e \qquad \text{Equation 2}$$

where $m_e$ is the mass of a single electrode. The specific energy and power may be determined using:

$$E_s = \frac{1}{4} \frac{CV_{max}^2}{m_e} \qquad \text{Equation 3}$$

$$P_s = E_s/4ESR \qquad \text{Equation 4}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in any number of types of batteries. For example, one embodiment is directed to an electrical energy storage device comprising:

a) at least one anode comprising a carbon material;
b) at least cathode comprising a metal oxide; and
c) an electrolyte comprising lithium ions;

wherein the carbon material is any of the carbon materials described herein.

Another embodiment is directed to a metal air battery, for example lithium air batteries. Lithium air batteries generally comprise an electrolyte interposed between positive electrode and negative electrodes. The positive electrode generally comprises a lithium compound such as lithium oxide or lithium peroxide and serves to oxidize or reduce oxygen. The negative electrode generally comprises a carbonaceous substance which absorbs and releases lithium ions. As with supercapacitors, batteries such as lithium air batteries which comprise the disclosed carbon materials are expected to be superior to batteries comprising known carbon materials. Accordingly, in one embodiment the present invention provides a metal air battery, for example a lithium air battery, comprising a carbon material as disclosed herein.

Any number of other batteries, for example, zinc-carbon batteries, lithium/carbon batteries, lead acid batteries and the like are also expected to perform better with the carbon materials described herein. One skilled in the art will recognize other specific types of carbon containing batteries which will benefit from the disclosed carbon materials. Accordingly, in another embodiment the present invention provides a battery, in particular a zinc/carbon, a lithium/carbon batteries or a lead acid battery comprising a carbon material as disclosed herein.

EXAMPLES

The carbon materials disclosed in the following Examples were prepared according to the methods disclosed herein. Chemicals were obtained from commercial sources at reagent grade purity or better and were used as received from the supplier without further purification.

In some examples, the polymer gel particles are freeze dried prior to pyrolysis and/or activation. In these examples, the lyophilizer shelf was generally pre-cooled to −30° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +100° C. Chamber pressure can be held in the range of 50 to 3000 mTorr. For instance, the chamber pressure can be controlled in the range of 150 to 300 mTorr.

Unless noted otherwise, the polymer was pyrolyzed by heating in a nitrogen atmosphere at temperatures ranging from 700-1200° C. for a period of time as specified in the examples, for example 850° C. with a nitrogen gas flow of 200 L/h. Activation conditions generally comprised heating a pyrolyzed polymer hydrogel in a $CO_2$ atmosphere at temperatures ranging from 800-1000° C. for a period of time as specified in the examples, for example 900° C. under a $CO_2$ for 660 min. Specific pyrolysis and activation conditions were as described in the following examples.

TGA studies were performed using a Mettler Toledo TGA/DSC1 707 $N_2/CO_2$ MX5 system. Pyrolysis and activation was performed using a Thermo Scientific, Economy Solid Tube furnace. Surface area and pore volume measurements were obtained using a Micromeritics Tristar II BET system.

Example 1

Emulsion Preparation of Dried Polymer Gel

For each sample, two separate solutions were prepared. Five different gel solutions were made by admixing a resorcinol and formaldehyde (molar ratio of resorcinol:formaldehyde=0.5:1) solution with a water/acetic acid solvent (75:25) and adding an ammonium acetate catalyst. The ratios of the various gel reagents are indicated in Table 1 for the five samples. A cyclohexane/SPAN 80 solution was also prepared.

The gel solution was allowed to mix for 10 minutes before it was poured into the cyclohexane/SPAN80 solution and the temperature was set to 45° C. After 4 hours at 45° C., the temperature was increased to 65-70° C. and held for 24 hours before the excess cyclohexane was decanted and the resin was placed in a 45° C. oven for 10-20 minutes to dry. Sample conditions are summarized in Table 1.

TABLE 1

| | | Polymerization Conditions | | | | |
|---|---|---|---|---|---|---|
| Sample | Gel Formulation (Solids/Acid/R:C)* | RF Solution (mL) | Cyclohexane (mL) | SPAN80 (mL) | % SPAN80 | % Gel** |
| RD-507-1 | 41/20/25 | 10 | 100 | 0.5 | 0.5% | 10% |
| RD-507-2 | 33/20/10 | 10 | 100 | 0.5 | 0.5% | 10% |
| RD-507-3 | 33/20/25 | 20 | 150 | 1.0 | 0.7% | 13% |
| RD-507-4 | 41/20/10 | 50 | 400 | 20.0 | 5.0% | 13% |
| RD-507-5 | 33/20/25 | 30 | 150 | 2.0 | 1.3% | 20% |

*(Solids/Acid/R:C) refers to the solids content in percent (e.g. mass resorcinol and formaldehyde to total mass), percent acid of total liquid (e.g. acid plus water) and R:C is mass ratio of resorcinol to catalyst, respectively.

**% Gel = Percent loading of RF (i.e., resorcinol/formaldehyde) solution in total emulsions/suspension polymerization solution (e.g. RF solution and continuous phase)

Example 2

Dried Polymer Gel Data

Nitrogen isotherm, surface area and pore volume data for the dried gel samples from Example 1 are presented in FIG. 1 and in Table 2. For comparative purposes, two carbon samples were prepare as controls via the general "monolith" approach described in Example 15. Comparative Sample 1 was prepared from a gel formulation having a Solids/Acid/R:C ratio of 40/20/10 and Comparative Sample 2 was prepared from a gel formulation having a Solids/Acid/R:C ratio of 33/20/20. All samples showed a lower surface area and pore volume compared to the comparative samples. While not wishing to be bound by theory, it is thought that this decrease is likely due to surfactant in the pores and on the surface of the gel material, and was expected to be burned off during pyrolysis. This theory was supported by the ability to activate the pyrolyzed material to a target surface area, pore volume, and P95/P5 (i.e., ratio of nitrogen sorbed at 95% partial pressure to that sorbed at 5% partial pressure) at a reasonable activation rate. Therefore certain properties of the dried gel may not be predictive of the properties of the final carbon materials.

Example 3

Activated Carbon Data

Figure 2:
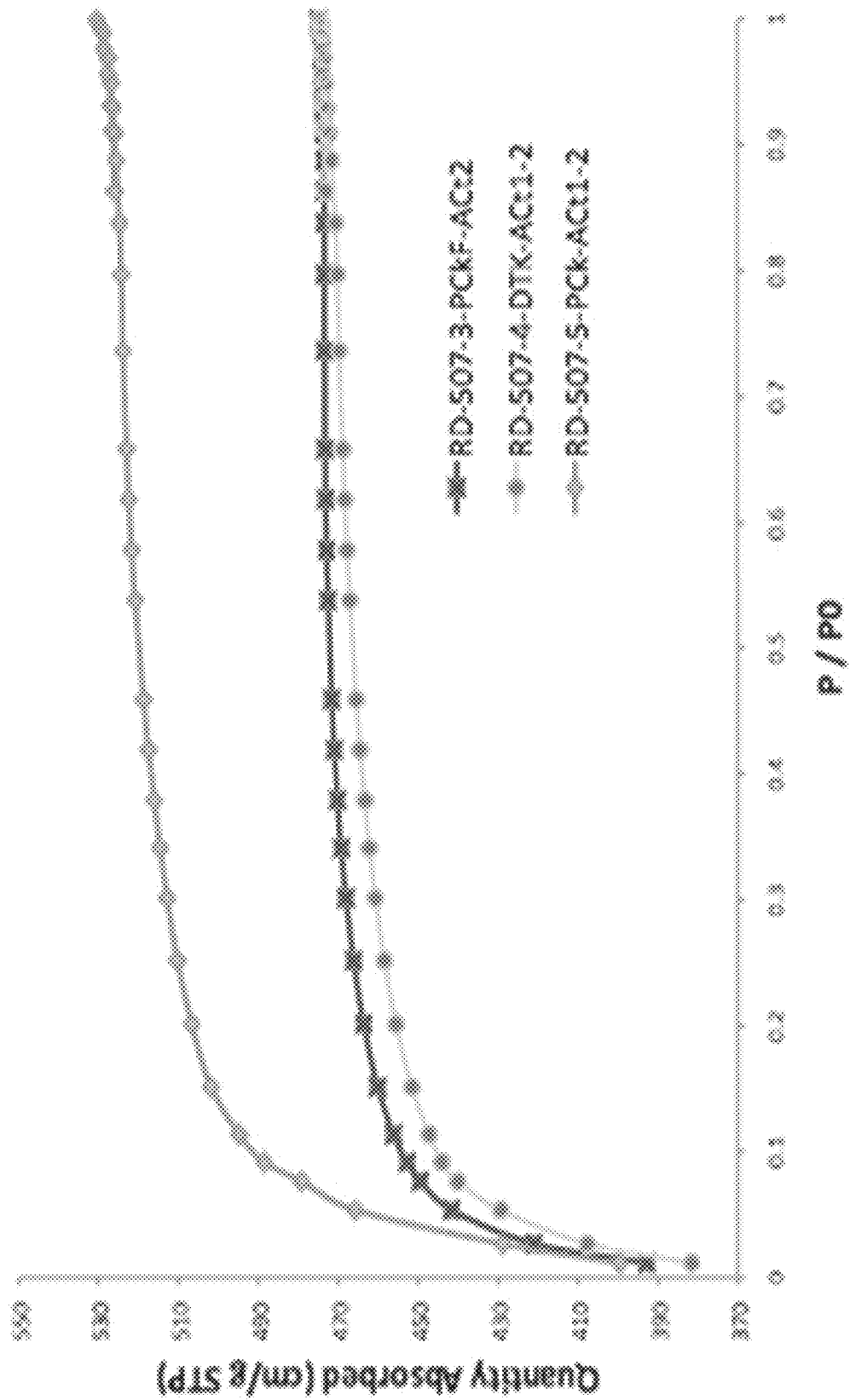
FIG. 2 presents $N_2$ absorption isotherms for activated carbon samples.

Nitrogen isotherm, surface area, pore volume, and electrochemical testing (ECT) data for activated carbon samples (RD-507-3, -4, -5) are presented in FIG. 2 and in Tables 3 & 4. Samples 3 and 5 were pyrolyzed at 900° C. in a kiln and held for 60 minutes at this temperature and sample 4 was pyrolyzed without any drying step prior to pyrolysis (Wet Gel—60 minutes at 625° C., unless stated otherwise all other gels were freeze dried prior to pyrolysis). All three samples were activated at 900° C. in a tube furnace ($CO_2$ atmosphere) to achieve a surface area of 1700-1900 $m^2/g$. The isotherm data (FIG. 2) shows that all three samples were very microporous carbon and had a surface area to pore volume development comparable to a control carbon material prepared via monolith techniques. All samples also demonstrate ECT performance comparable to a comparative carbon prepared via monolith techniques (Comparative Sample 3) (24 F/cc at the time). Although the gel formulations employed (sample RD-507-3, -5) were expected to produce mesoporous carbons based on known monolith preparations, all carbon samples surprisingly showed no mesoporosity in the dried gel or activated carbon.

TABLE 2

Properties of Dried Polymer Gel Samples

| Sample | SSA ($m^2/g$) | PV (cc/g) | P95/P5 | Max Pore Width (Å) |
|---|---|---|---|---|
| RD-507-1 | 481 | 0.299 | 1.77 | 63 |
| RD-507-2 | 583 | 0.419 | 2.15 | 172 |
| RD-507-3 | 75 | 0.059 | 2.40 | 100 |
| RD-507-4 | 72 | 0.101 | 5.29 | 86 |
| RD-507-5 | 325 | 0.297 | 2.75 | 108 |
| Comparative Sample 1 | 545 | 0.327 | 1.80 | 59 |
| Comparative Sample 2 | 625-725 | 0.98-1.20 | 4.4-5.5 | 250 |

TABLE 3

Activated Carbon Surface Area and Pore Volume

| Sample | Gel (Solid/Acid/RC) | SSA ($m^2/g$) | PV (cc/g) | P95/P5 |
|---|---|---|---|---|
| Comparative Sample 3 | 41/20/25 | 1847 | 0.809 | 1.20 |
| RD-507-3-PCKf-ACt2 | 33/20/10 | 1760 | 0.734 | 1.08 |
| RD-507-4-DTK-ACt1-2 | 41/20/10 | 1731 | 0.733 | 1.10 |
| RD-507-5-PCK-ACt1-2 | 33/20/25 | 1928 | 0.818 | 1.14 |

TABLE 4

Activated Carbon Electrochemical Testing Performance

| Sample | Gel (Solid/Acid/RC) | Electrode Wt | F/cc | F/g | −45* (Hz) | Normalized F/cc |
|---|---|---|---|---|---|---|
| RD-507-3 | 33/20/10 | 22.09 | 22.0 | 120.0 | 0.09 | 24.0 |
| RD-507-4 | 41/20/10 | 15.69 | 23.5 | 120.0 | 0.14 | 25.6 |
| RD-507-5 | 33/20/25 | 16.17 | 23.8 | 118.2 | 0.16 | 23.5 |

*Frequency response = Frequency as calculated from the Bode plot at a 45° phase angle

Example 4

Preparation of Dried Polymer Gel

To explore the ability of the present method for preparing carbon materials having different pore structure (e.g., mesoporosity), five polymerizations were carried out using the general procedures described in Example 1, except the formulations were as set forth in Table 5. As a control, the gel formulation for each for each polymerization was also allowed to polymerize under monolith conditions (i.e., as described in Example 15). The control sample for each gel formulation is designated with a "C" in Table 6.

TABLE 5

Polymerization Conditions

| Sample | Gel Formulation | Gel Solution (mL) | Cyclohexane (mL) | SPAN80 (mL) | % SPAN80 | % RF Gel |
|---|---|---|---|---|---|---|
| RD-562-1 | 33/20/100 | 40 | 200 | 20 | 10% | 20% |
| RD-562-2 | 33/10/100 | 40 | 200 | 20 | 10% | 20% |
| RD-562-3 | 33/20/400 | 40 | 200 | 20 | 10% | 20% |
| RD-562-4 | 33/10/400 | 40 | 200 | 20 | 10% | 20% |
| RD-562-5 | 33/10/50 | 40 | 200 | 2 | 1% | 20% |

Example 5

Dried Polymer Gel Data

Figure 3:
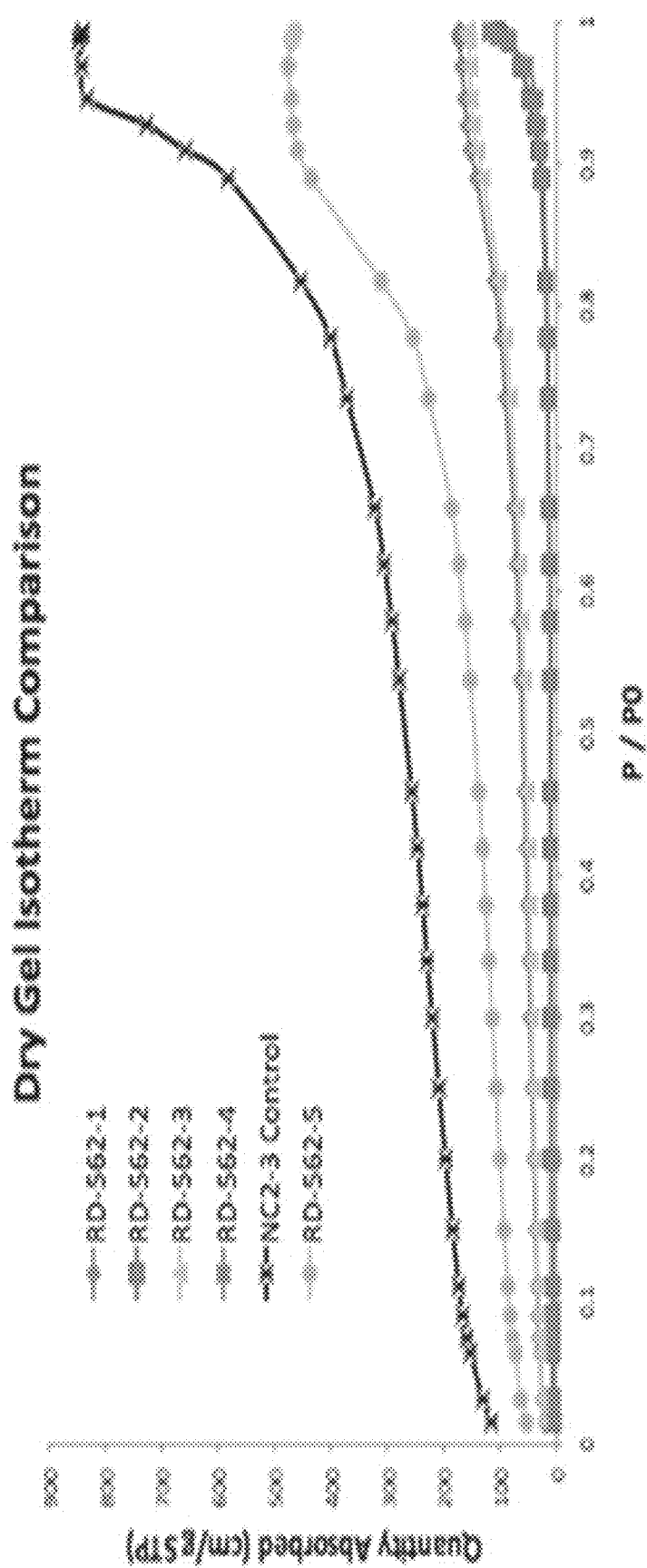
FIG. 3 is a graph showing $N_2$ absorption isotherms for freeze dried gels.

Nitrogen isotherm, surface area and pore volume data for dried gel samples prepared according to Example 4 are presented in FIG. 3 and in Table 6. All polymer gels were freeze dried prior to analysis. All samples showed a collapsed pore structure and lower SSA compared to a monolith prepared control of a mesoporous carbon (Solid/Acid/R:C=33/20/25, designated "NC2-3" herein) and compared to the individual control (monolith) gels. As discussed above, the low SSA and PV may be an artifact created by surfactant clogging the pores, which may or may not be linked to surfactant loading. Samples 1 and 3 both used 20% acid content and show a small pore volume contribution from the mesopore range. Samples 2 and 4 used 10% acid content and both show most of their pore volume being attributed to macropores.

Figure 4:
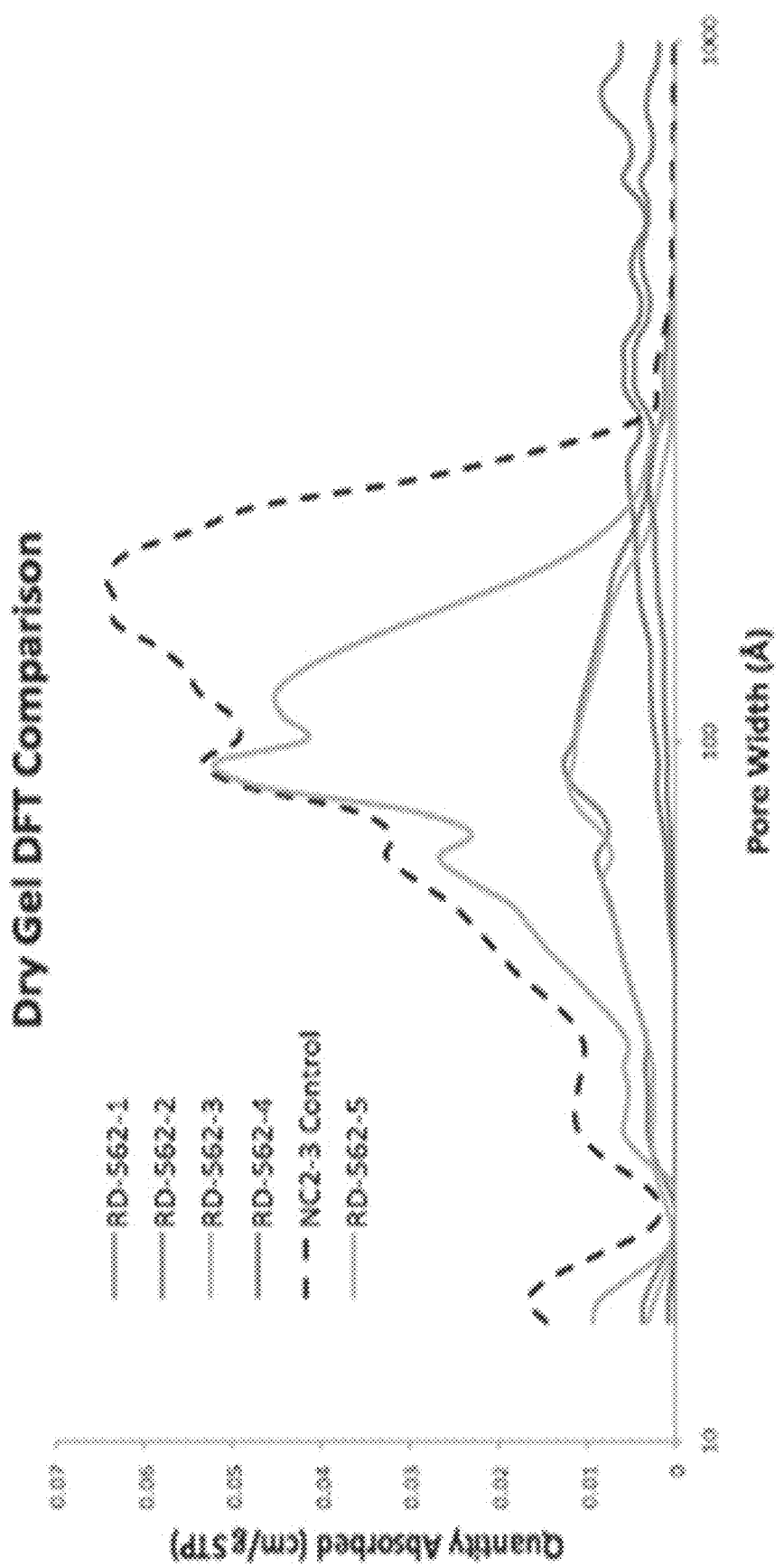
FIG. 4 demonstrates Pore size distributions for dry gels.

Taking into account the contraction of the mesopores in samples 1-4, it was decided to use less surfactant for sample 5. Low acid (10%) with low R:C (50:1) was used to achieve mesoporosity with no macro-porosity. Sample 5 shows (FIG. 4) a much greater contribution of volume from mesopores and maps closely to the NC2-3 control dried gel. The surface area (Table 6) is still lower than the control, but based on activation data (see below) this may be due more to surfactant rather than the dried gel material.

TABLE 6

Dried Gel Surface Area and Pore Volume

| Sample | Gel (Solid/Acid/R:C) | SSA ($m^2/g$) | PV (cc/g) | P95/P5 |
|---|---|---|---|---|
| RD-562-1 | 33/20/100 | 143 | 0.278 | 5.77 |
| RD-562-1C | 33/20/100 | 633 | 0.882 | 4.22 |
| RD-562-2 | 33/10/100 | 33 | 0.153 | 7.80 |
| RD-562-2C | 33/10/100 | 396 | 1.203 | 4.95 |
| RD-562-3 | 33/20/400 | 137 | 0.249 | 5.58 |
| RD-562-3C | 33/20/400 | 632 | 1.198 | 5.44 |
| RD-562-4 | 33/10/400 | 25 | 0.176 | 8.83 |
| RD-562-4C | 33/10/400 | 469 | 1.169 | 3.31 |
| RD-562-5 | 33/10/50 | 358 | 0.755 | 6.70 |
| RD-562-5C | 33/10/50 | 687 | 1.919 | 7.06 |
| NC2-3 Control | 33/20/25 | 625-725 | 0.98-1.20 | 4.4-5.5 |

Example 6

Activated Carbon Data

Figure 5:
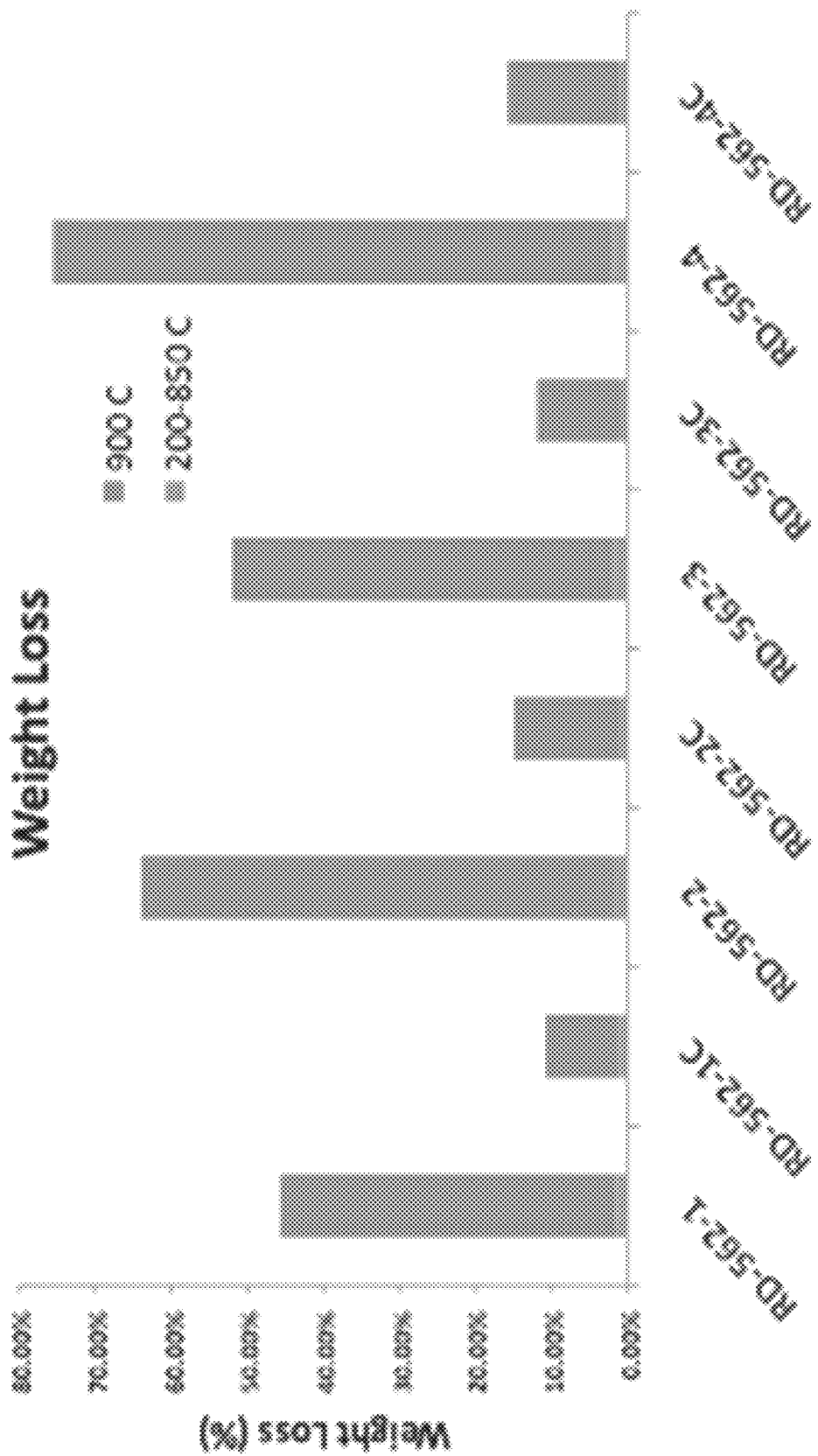
FIG. 5 is a bar graph showing weight loss upon activation.

The gels dried gels from Example 5 were pyrolyzed and activated. Weight loss upon activation, nitrogen isotherm, surface area, pore volume, and ECT data for these activated carbon samples are presented in FIGS. 5 & 6 and in Table 7. All samples and their controls were pyrolyzed at 900° C. in a tube furnace using a 5° C./min ramp rate and then held for 60 minutes. All Pyrolyzed Carbon (PC) samples were put on for TGA analysis of activation rates at 900° C. Each emulsion PC sample was activated at 950° C. in the tube furnace.

Figure 6:
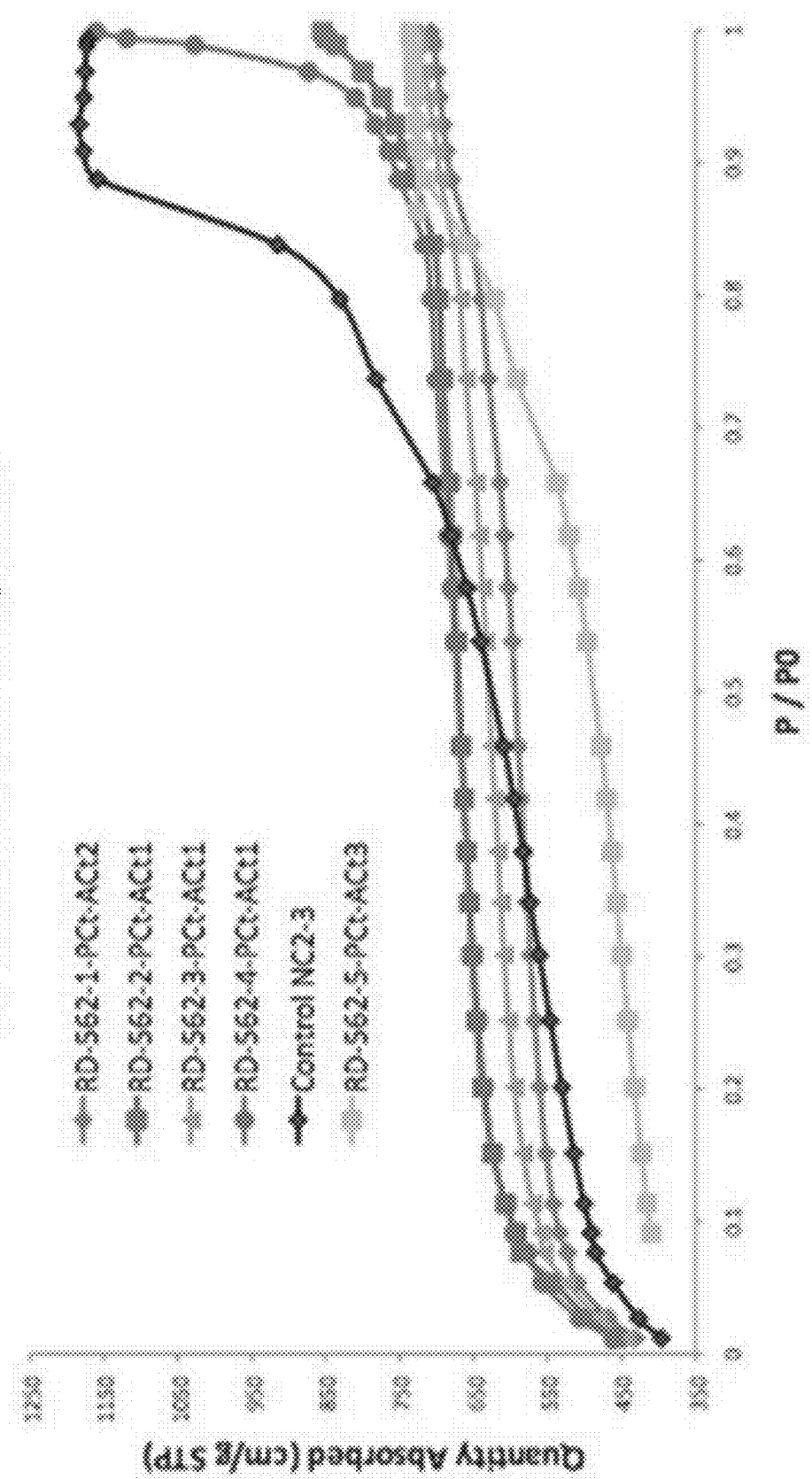
FIG. 6 shows $N_2$ absorption isotherms for activated carbon samples.

TGA data (FIG. 5) shows a significant increase in activation rate for the emulsion samples compared to their control samples. This may be due more to particle size being very small and not solely due to the amount of porosity. Samples 2 and 4 show an increased activation rate compared to samples 1 and 3, as indicated by higher $N_2$ adsorption from the same activation conditions, and are more macroporous. Samples 1 and 3 used a higher acid content and contain more mesopore volume, than other protocols and were more collapsed compared to the NC2-3 control (FIG. 6). Although samples 1~4 were over-activated, their pore development is not similar to NC2-3 carbon. Samples 1 and 3, that used 20% acid, give a more mesoporous carbon development than the samples that used 10% Acid.

Figure 7:
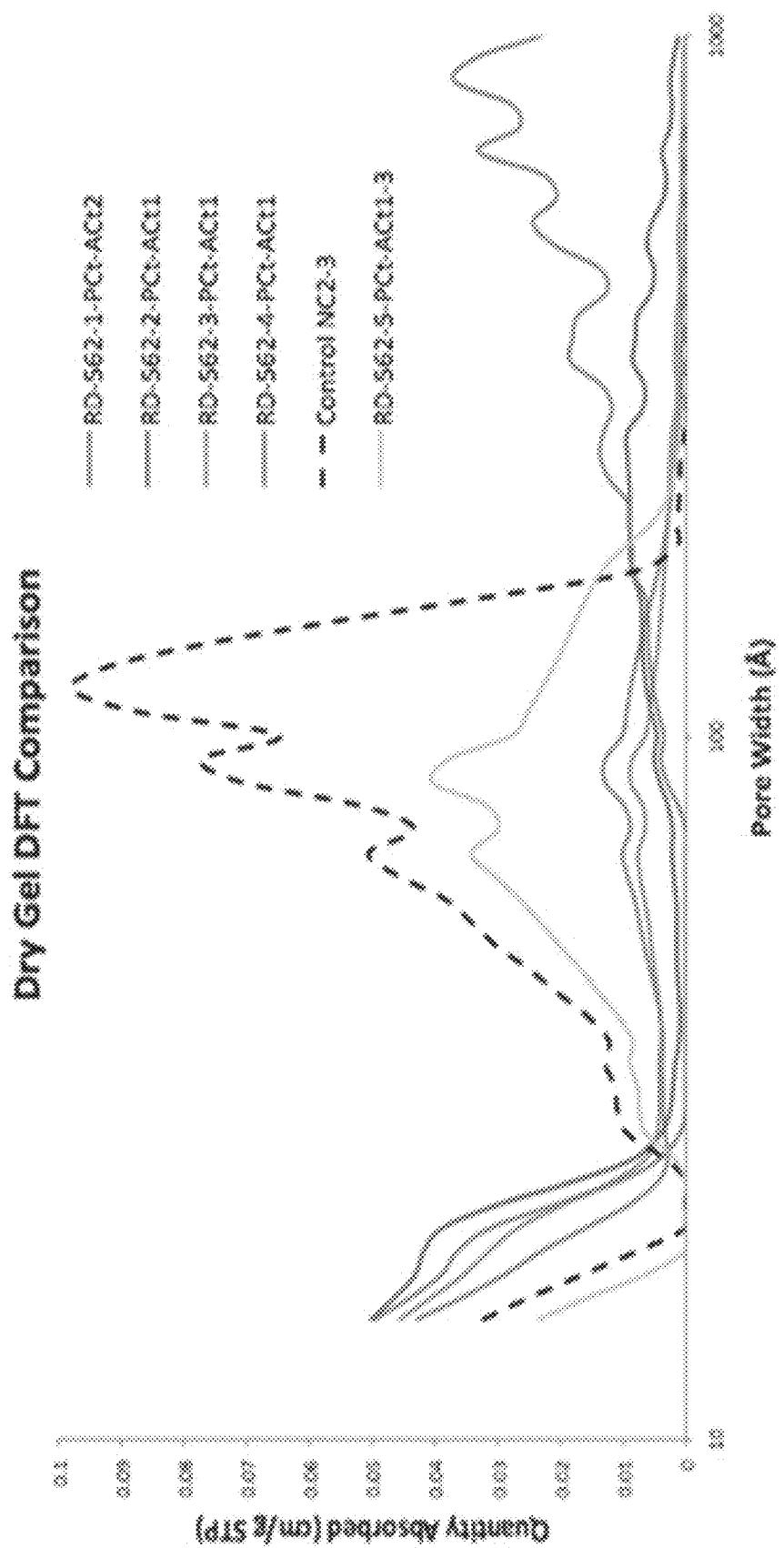
FIG. 7 illustrates pore size distribution DFT for activated carbons.

Sample 5 used less surfactant with the intention of creating more mesoporosity and the data for sample 5 shows successful creation of mesoporosity (see FIG. 7). This carbon material shows less of a pore contribution from 100-200 A than the NC2-3 control, but this may not be an issue for electrochemical performance. Thus the described method is suitable for preparation of a mesoporous carbon material.

TABLE 7

Activated Carbon Surface Area and Pore Volume

| Sample | Gel (Solid/Acid/R:C) | SSA (m²/g) | PV (cc/g) | P95/P5 |
|---|---|---|---|---|
| RD-562-1-PCt-ACt2 | 33/20/100 | 2122 | 1.090 | 1.37 |
| RD-562-2-PCt-ACt1 | 33/10/100 | 2423 | 1.312 | 1.42 |
| RD-562-3-PCt-ACt1 | 33/20/400 | 2258 | 1.125 | 1.36 |
| RD-562-4-PCt-ACt1 | 33/10/400 | 2411 | 1.777 | 1.48 |
| RD-562-5-PCt-ACt3 | 33/10/50 | 1704 | 1.217 | 1.88 |
| NC2-3 Control | 33/20/25 | 1800 | 1.420 | 2.04 |

Example 7

Preparation of Dried Polymer Gel

Ten emulsion polymerizations were performed according to the general procedures of Example 1 to explore parameters for preparation of a microporous carbon material. Control samples (designated with "C" in Table 9) were also prepared using the same gel formulations and allowing the gel to polymerize in a monolith fashion. Polymerization conditions are set forth in Table 8.

TABLE 8

Polymerization Conditions

| Sample | % Solids | % Acid | R:C | SPAN 80% | % RF Gel |
|---|---|---|---|---|---|
| RD-538-1 | 50 | 10 | 10 | 1 | 20 |
| RD-538-2 | 41 | 10 | 25 | 1 | 20 |
| RD-538-3 | 41 | 20 | 10 | 30 | 20 |
| RD-538-4 | 41 | 20 | 25 | 1 | 40 |
| RD-538-5 | 41 | 20 | 10 | 10 | 20 |
| RD-538-6 | 41 | 10 | 10 | 10 | 30 |
| RD-538-7 | 46 | 15 | 15 | 5 | 25 |
| RD-538-8 | 50 | 10 | 25 | 10 | 30 |
| RD-538-9 | 50 | 20 | 25 | 10 | 20 |
| RD-538-10 | 50 | 20 | 10 | 1 | 30 |

Example 8

Dried Polymer Gel Data

Figure 8:
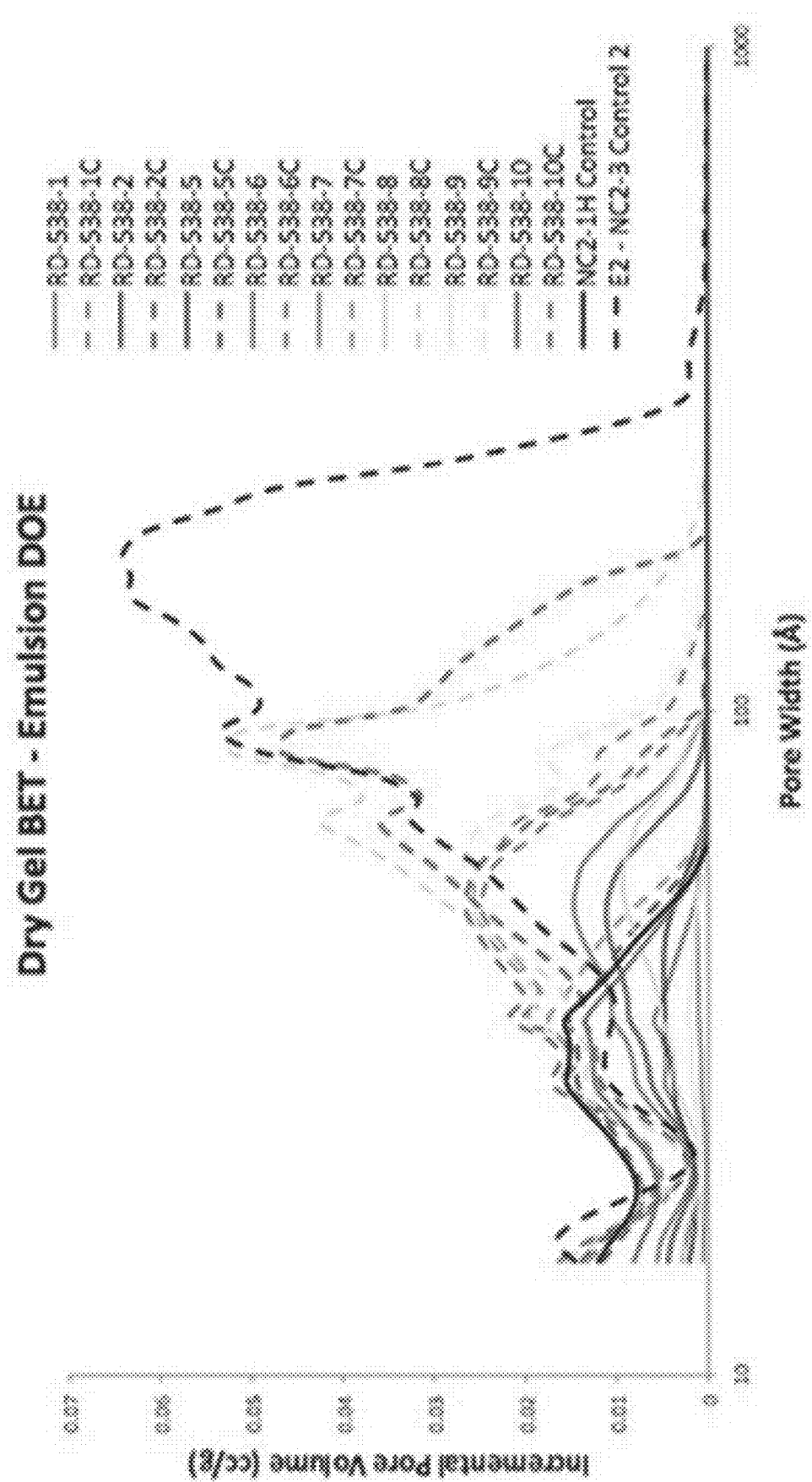
FIG. 8 is a graph of pore volume distributions for RD-538 freeze dried gels.

Nitrogen isotherm, surface area and pore volume data for dried gel samples of Example 7 are presented in FIG. 8 and in Table 8. Samples 3 and 4 did not make processable wet gel so no data was collected for those samples. All other samples were freeze-dried. DFT pore size distributions (FIG. 8) show a contraction in pore structure in emulsion samples vs. their oven-cured control as noted with the other examples. Following from this, the emulsion samples show a lower specific surface area and pore volume (Table 9) as compared to their corresponding monolith control samples.

TABLE 9

Dried Gel Surface Area and Pore Volume

| Sample | Gel (Solid/Acid/R:C/Surfactant/RF) | SSA (m²/g) | PV (cc/g) | P95/P5 |
|---|---|---|---|---|
| RD-538-1 | 50/10/10/1/20 | 108 | 0.086 | 2.36 |
| RD-538-1C | | 615 | 0.543 | 2.70 |
| RD-538-2 | 41/10/25/1/20 | 185 | 0.195 | 3.08 |
| RD-538-2C | | 618 | 0.785 | 3.80 |
| RD-538-5 | 41/20/10/10/20 | 94 | 0.094 | 2.84 |
| RD-538-5C | | 509 | 0.315 | 1.86 |
| RD-538-6 | 41/10/10/10/30 | 233 | 0.264 | 3.26 |
| RD-538-6C | | 555 | 0.479 | 2.62 |
| RD-538-7 | 46/15/15/5/25 | 23 | 0.026 | 3.19 |
| RD-538-7C | | 580 | 0.363 | 1.86 |
| RD-538-8 | 50/10/25/10/30 | 110 | 0.151 | 4.01 |
| RD-538-8C | | 679 | 0.814 | 3.65 |
| RD-538-9 | 50/20/25/10/20 | 54 | 0.039 | 2.20 |
| RD-538-9C | | 660 | 0.587 | 2.69 |
| RD-538-10 | 50/20/10/1/30 | 355 | 0.234 | 2.03 |
| RD-538-10C | | 646 | 0.542 | 2.56 |

Example 9

Activated Carbon Data and Electrochemical Testing

Figure 9:
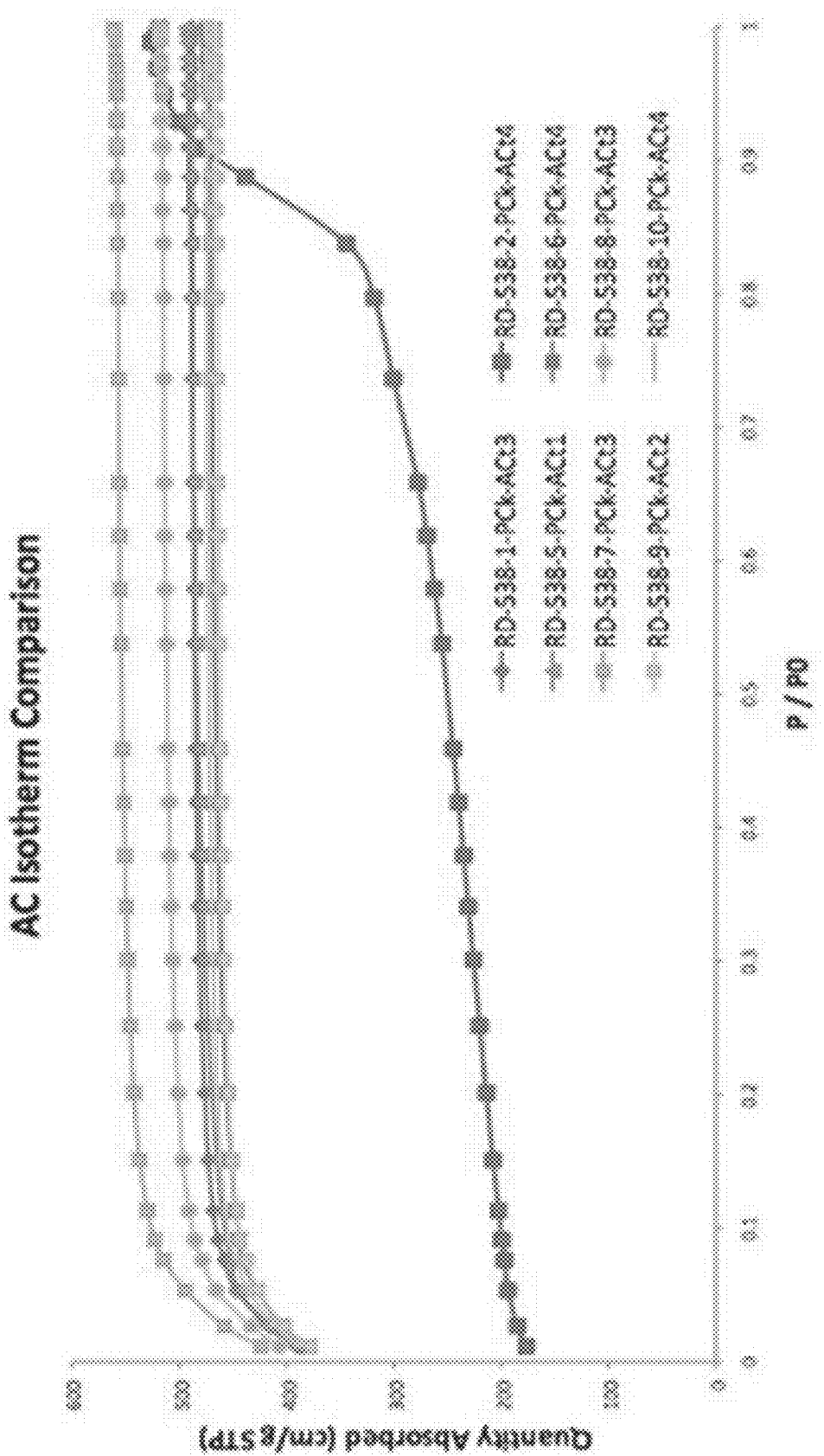
FIG. 9 presents $N_2$ absorption isotherms for activated carbon samples.
Figure 10:
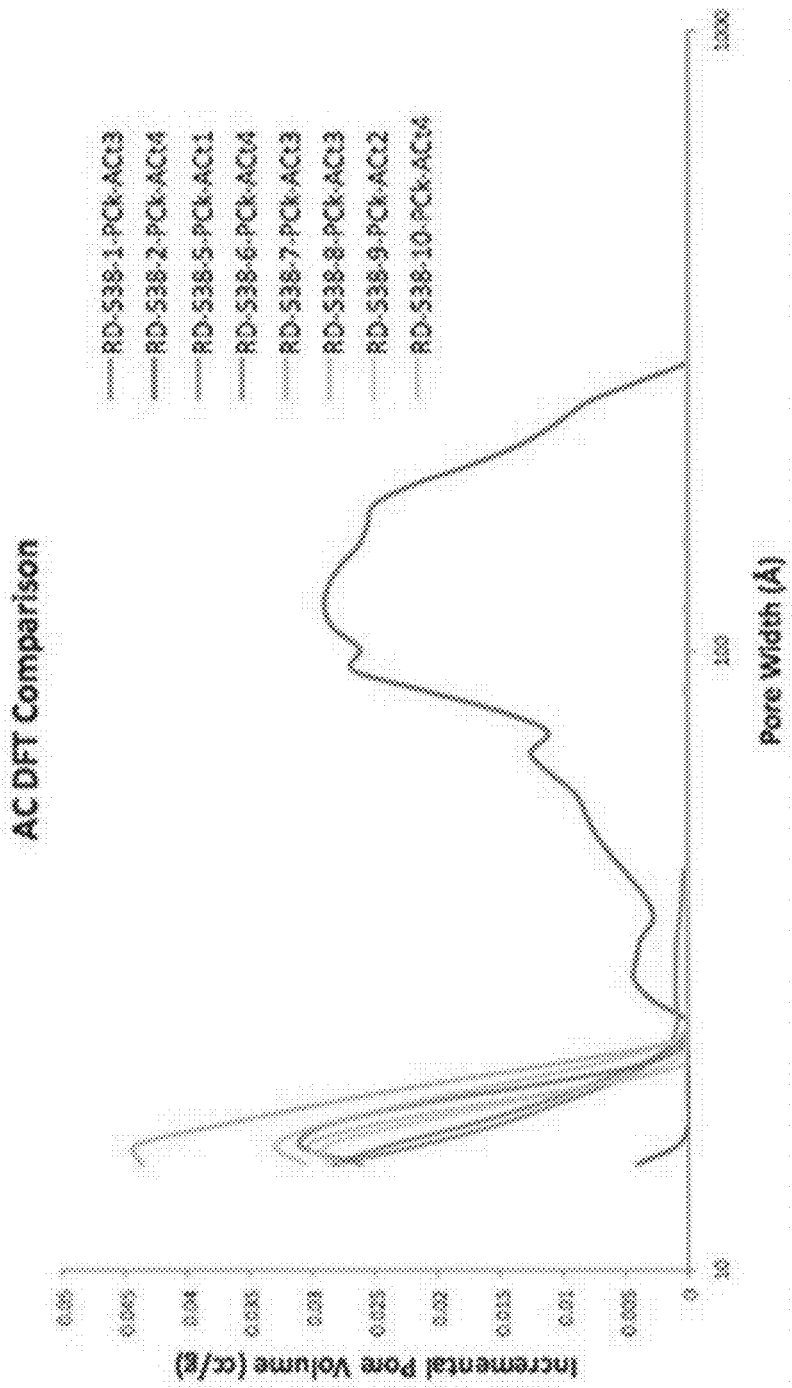
FIG. 10 shows pore size distributions for activated carbons.

Nitrogen isotherm, surface area and pore volume data for activated carbon samples from Example 8 are presented in FIGS. 9 & 10 and in Table 10. Samples were pyrolyzed by rapid (<10 sec from 100° C.-625° C.) insertion at 625° C. in the kiln for 60 minutes. All samples were activated in a tube furnace at 900° C. with the goal of achieving 1700-1900 m²/g SSA. Isotherm data (FIG. 9) and DFT pore size distributions (FIG. 10) demonstrate the ability of the current emulsion formulations to create a microporous carbon, and in fact only one sample (RD-538-2) exhibited any mesoporosity. Mesopore development in RD-538-2 may be due to the low surfactant concentration along with low catalyst and low acid content. High surfactant loading, ≥5%, produced similar surface area, pore volume, and isotherm data for activated carbon, independent of gel formulation. With lower surfactant loading, 1%, the material shows more sensitivity to changes in gel formulation.

Electrochemical testing (ECT) data for the activated carbons is presented in Table 11. Samples were milled in a Fritsch mill and then rolled into dry electrodes for ECT. Sample 5 recorded adequate performance compared to current NC2-1Ω carbon at similar activation levels.

TABLE 10

Activated Carbon Surface Area and Pore Volume

| Sample | Gel (Solid/Acid/R:C/Surfactant/RF) | SSA (m²/g) | PV (cc/g) | P95/P5 | GM* |
|---|---|---|---|---|---|
| RD-538-1-PCk-ACt3 | 50/10/10/1/20 | 1813 | 0.756 | 1.09 | 24.0 |
| RD-538-2-PCk-ACt4 | 41/10/25/1/20 | 783 | 0.806 | 2.69 | 9.7 |
| RD-538-5-PCk-ACt1 | 41/20/10/10/25 | 1780 | 0.762 | 1.12 | 23.4 |
| RD-538-6-PCk-ACt4 | 41/10/10/10/30 | 1736 | 0.733 | 1.10 | 23.7 |
| RD-538-7-PCk-ACt3 | 46/15/15/5/25 | 2074 | 0.866 | 1.12 | 23.9 |
| RD-538-8-PCk-ACt3 | 50/10/25/10/30 | 1910 | 0.800 | 1.11 | 23.9 |
| RD-538-9-PCk-ACt | 50/20/25/10/20 | 1726 | 0.721 | 1.09 | 23.9 |
| RD-538-10-PCk-ACt4 | 50/20/10/1/30 | 1768 | 0.735 | 1.08 | 24.1 |

*GM = (specific surface area)/(100*PV)

TABLE 11

Activated Carbon Electrochemical Testing Performance

| Sample | Gel (Solid/Acid/R:C/ Surfactant/RF) | F/cc | F/g | R2 | −45 | Max |
|---|---|---|---|---|---|---|
| RD-538-5-PCk-ACt1 | 41/20/10/10/20 | 23.9 | 114.2 | 4.63 | 0.14 | 23.8 |
| RD-538-7-PCk-ACt3 | 46/15/15/5/25 | 21.5 | 121.6 | 5.54 | 0.16 | 23.3 |

Example 10

Preparation of Dried Polymer Gel

To better understand the relationship between emulsion formulations and processing parameters, twelve emulsion polymerization experiments were performed according to the general procedures described in Example 1. Certain processing parameters such as stir rate, reaction start temperature and cure time were varied as summarized in Table 12.

TABLE 12

Polymerization Conditions

| Sample | % Solids | % Acid | R:C | % SPAN80 | % RF Gel | Start Temp | Cure Time | RPM |
|---|---|---|---|---|---|---|---|---|
| RD-579-1 | 30 | 5 | 50 | 2 | 30 | 45 | 6 | 200 |
| RD-579-2 | 50 | 5 | 50 | 0.5 | 30 | 70 | 6 | 400 |
| RD-579-3 | 30 | 5 | 10 | 0.5 | 10 | 45 | 6 | 200 |
| RD-579-4 | 30 | 20 | 50 | 0.5 | 30 | 45 | 12 | 400 |
| RD-579-5 | 50 | 20 | 10 | 2 | 10 | 45 | 6 | 400 |
| RD-579-6 | 50 | 20 | 50 | 0.5 | 10 | 45 | 12 | 200 |
| RD-579-7 | 30 | 20 | 50 | 0.5 | 30 | 45 | 12 | 400 |
| RD-579-8 | 30 | 5 | 10 | 0.5 | 10 | 70 | 12 | 400 |
| RD-579-9 | 30 | 20 | 10 | 2 | 30 | 70 | 12 | 200 |
| RD-579-10 | 30 | 20 | 50 | 2 | 10 | 70 | 6 | 400 |
| RD-579-11 | 50 | 5 | 10 | 2 | 30 | 45 | 12 | 400 |
| RD-579-12 | 50 | 20 | 10 | 0.5 | 30 | 70 | 6 | 200 |

Example 11

Dried Polymer Gel Data

Figure 11:
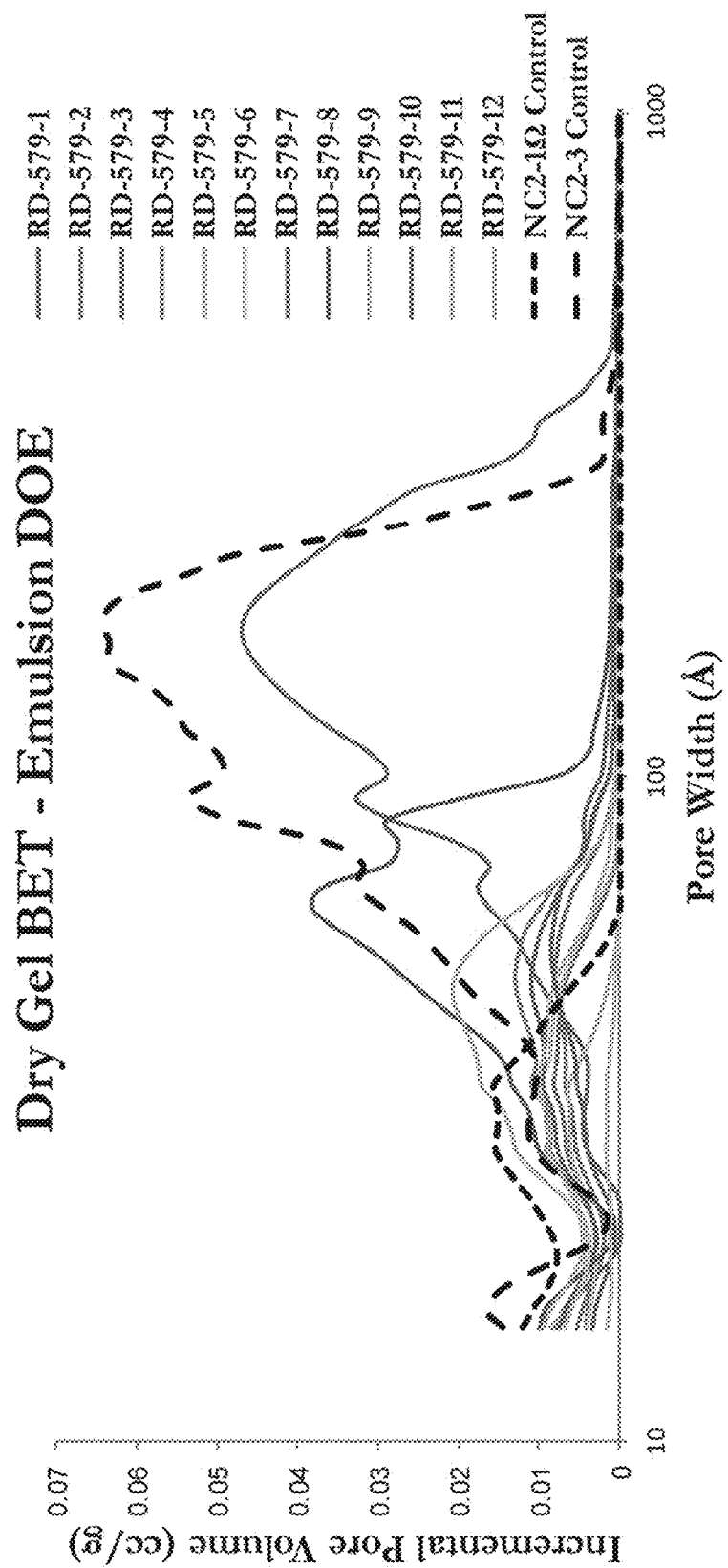
FIG. 11 presents pore volume distributions for freeze dried gels.
Figure 12:
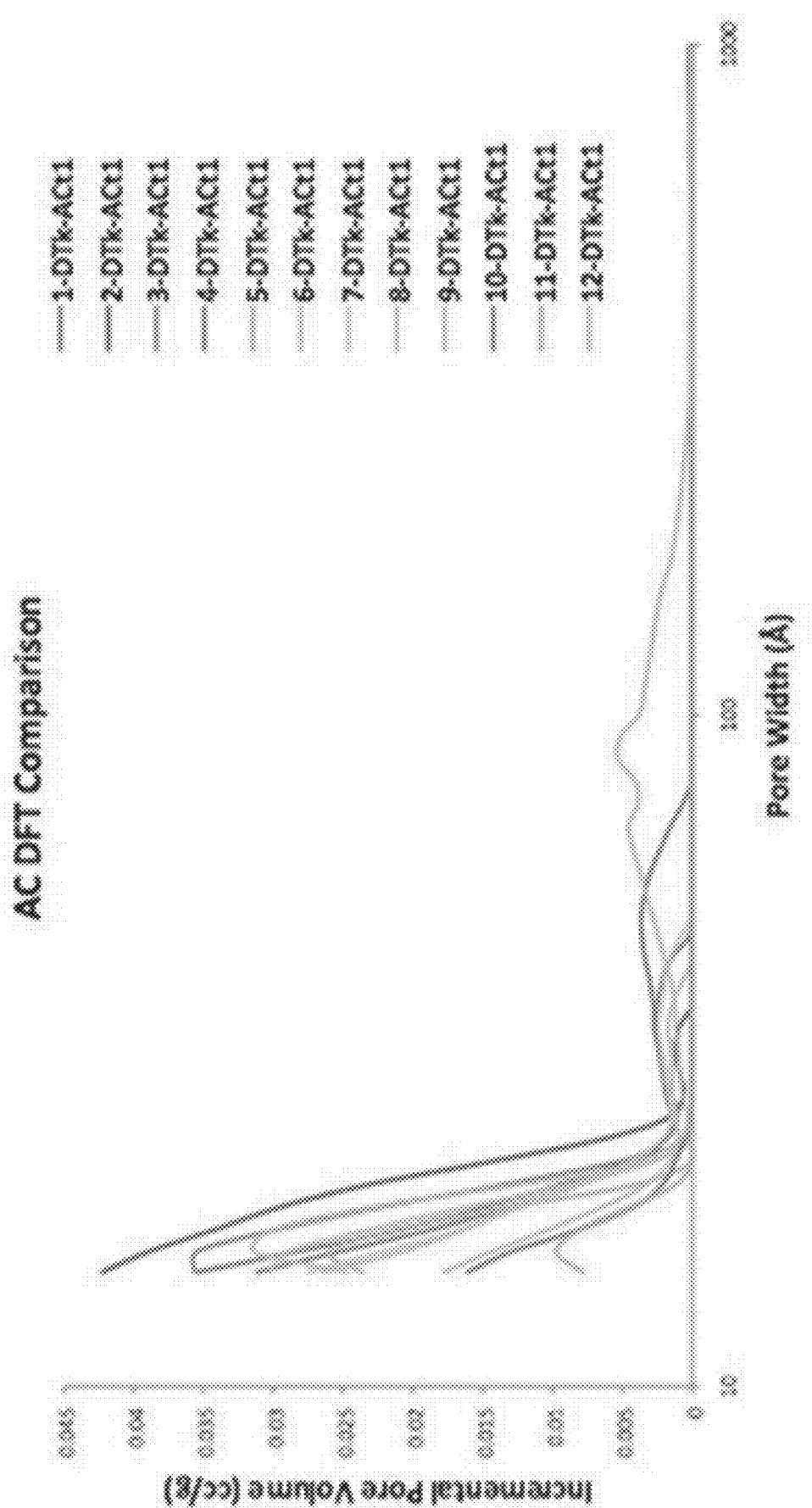
FIG. 12 is a graph of pore size distributions for activated carbons.
Figure 13:
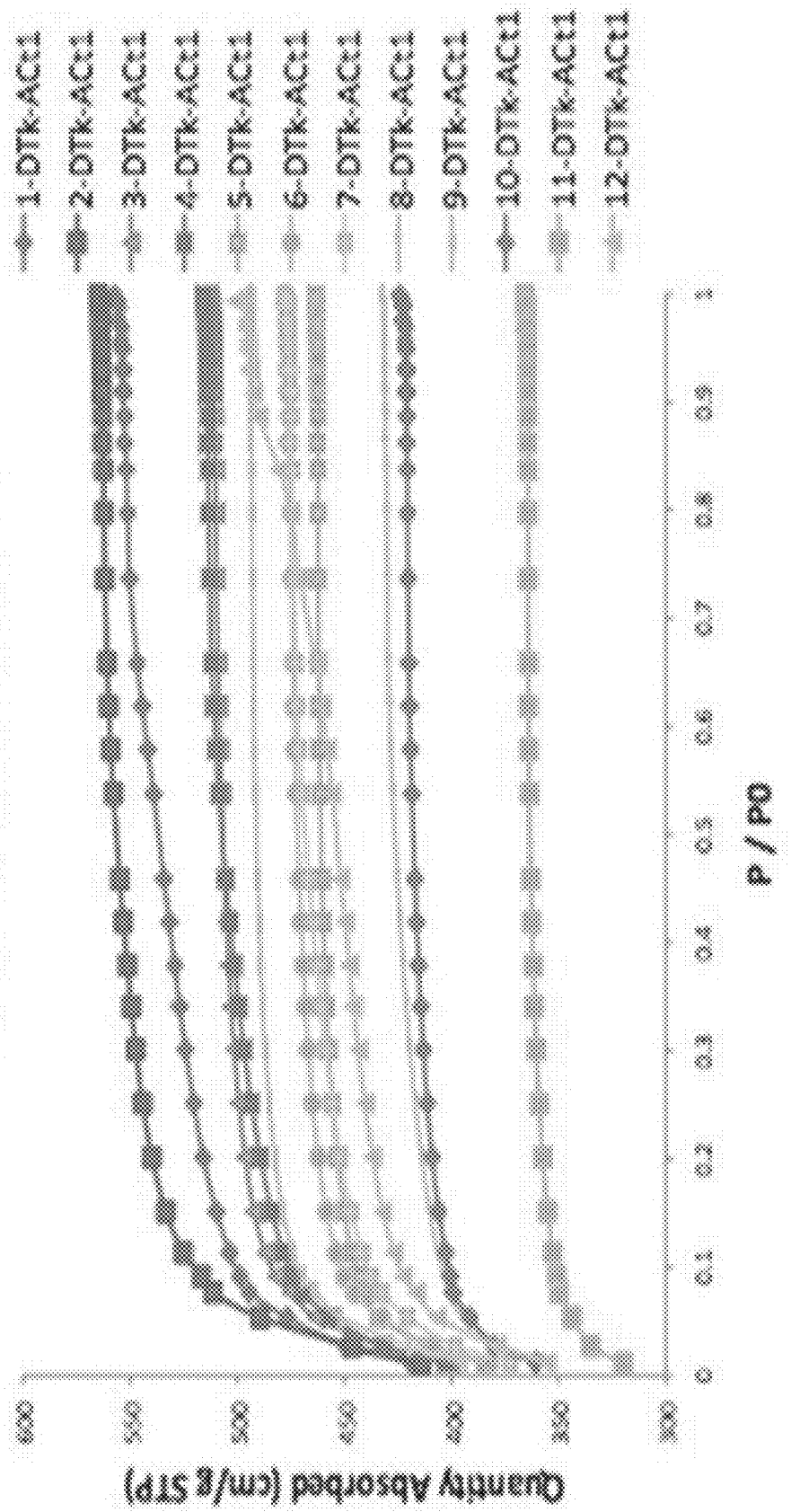
FIG. 13 shows nitrogen absorption isotherms for activated carbon samples.

Nitrogen isotherm, surface area and pore volume data for dried gel samples of Example 10 are presented in FIG. 11 and in Table 13. For comparative purposes, data for representative microporous and micro/mesoporous gels (NC2-1Ω) and NC2-3, respectively) prepared via monolith procedures are also presented in FIG. 11. It can be seen that there is a correlation between surface area and cure time. It is also clear that one can obtain a spectrum of dry gels ranging from solely microporous to micro/mesoporous, and their resulting carbons are readily available through emulsion polymerization.

TABLE 13

Dry Gel Data

| Sample | Gel (Solid/Acid/R:C/ Surfactant/C:RF) | SSA | PV | P95/P5 | GM | Fines* |
|---|---|---|---|---|---|---|
| RD-579-1 | 30/5/50/2/30 | 310 | 0.893 | 8.46 | 3.2 | 1 |
| RD-579-2 | 50/5/50/0.5/30 | 235 | 0.166 | 2.12 | 12.9 | 0 |
| RD-579-3 | 30/5/10/0.5/10 | 156 | 0.159 | 3.03 | 8.9 | 0 |
| RD-579-4 | 30/20/50/0.5/30 | 329 | 0.276 | 2.57 | 10.8 | 2 |
| RD-579-5 | 50/20/10/2/10 | 174 | 0.113 | 2.00 | 14.0 | 3 |
| RD-579-6 | 50/20/50/0.5/10 | 333 | 0.224 | 2.03 | 13.5 | 2 |
| RD-579-7 | 30/20/50/0.5/30 | 322 | 0.268 | 2.48 | 10.9 | 3 |
| RD-579-8 | 30/5/10/0.5/10 | 414 | 0.583 | 4.17 | 6.5 | 3 |
| RD-579-9 | 30/20/10/2/30 | 286 | 0.206 | 2.20 | 12.6 | 1 |
| RD-579-10 | 30/20/50/2/10 | 146 | 0.187 | 3.53 | 7.1 | 2 |
| RD-579-11 | 50/5/10/2/30 | 417 | 0.381 | 2.72 | 9.9 | 1 |
| RD-579-12 | 50/20/10/0.5/30 | 58 | 0.035 | 1.83 | 15.1 | 0 |
| NC2-1Ω | 40/20/10 | 545 | 0.327 | 1.80 | — | NA |
| NC2-3 | 33/20/25 | 625-725 | 0.98-1.20 | 4.4-5.5 | — | NA |

*Scale of 0-3, 0 = no fine material, 3 = most fine material

Example 12

Activated Carbon Data

As a means to determine appropriate conditions for preparation of a microporous carbon material via an emulsion polymerization, the gels from example 10 were pyrolyzed at 625° C. in the kiln for 60 minutes without previously drying the material gel. Only select samples were dried and then pyrolyzed. All samples were activated in the tube furnace at 900° C. with the goal of achieving 1700-1900 m²/g SSA.

TGA data was collected to determine activation rates. Pore volume and pore size data is presented in FIGS. 12-15. Tables 14-16 present various physical and electrochemical properties of the carbon materials. As can be seen the full spectrum of microporous to mesoporous carbon materials having various physical and electrochemical properties can be prepared via the described methods. Samples denoted with "PCt" have been freeze dried prior to pyrolysis, while samples identified as "DTk" have been pyrolyzed directly from wet gel (i.e., not freeze dried).

TABLE 14

Activated Carbon Data

| Sample | Gel (Solid/Acid/R:C/ Surfactant/C:RF) | SSA | PV | P95/P5 | GM |
|---|---|---|---|---|---|
| RD-579-1-DTk-ACt1 | 30/5/50/2/30 | 1963 | 0.860 | 1.16 | 22.8 |
| RD-579-2-DTk-ACt1 | 50/5/50/0.5/30 | 2062 | 0.873 | 1.16 | 23.6 |
| RD-579-3-DTk-ACt1 | 30/5/10/0.5/10 | 1889 | 0.792 | 1.11 | 23.9 |
| RD-579-4-DTk-ACt1 | 30/20/50/0.5/30 | 1857 | 0.797 | 1.13 | 23.3 |
| RD-579-5-DTk-ACt1 | 50/20/10/2/10 | 1722 | 0.716 | 1.07 | 24.1 |
| RD-579-6-DTk-ACt1 | 50/20/50/0.5/10 | 1762 | 0.738 | 1.10 | 23.9 |
| RD-579-7-DTk-ACt1 | 30/20/50/0.5/30 | 1713 | 0.738 | 1.13 | 23.2 |
| RD-579-8-DTk-ACt1 | 30/5/10/0.5/10 | 1566 | 0.668 | 1.09 | 23.4 |
| RD-579-9-DTk-ACt1 | 30/20/10/2/30 | 1836 | 0.764 | 1.09 | 24.0 |
| RD-579-10-DTk-ACt1 | 30/20/50/2/10 | 1557 | 0.654 | 1.08 | 23.8 |
| RD-579-11-DTk-ACt1 | 50/5/10/2/30 | 1362 | 0.565 | 1.06 | 24.1 |
| RD-579-12-DTk-ACt1 | 50/20/10/0.5/30 | 1654 | 0.767 | 1.22 | 21.6 |

TABLE 15

RD-579-DG-PC Activated Carbon Surface Area and Pore Volume

| Sample | Gel (Solid/Acid/R:C/ Surfactant/RF) | SSA (m²/g) | PV (cc/g) | JRI | GM |
|---|---|---|---|---|---|
| RD-579-1-PCt-ACt1 | 30/5/50/2/30 | 2146 | 1.752 | 2.23 | 12.2 |
| RD-579-8-PCt-ACt1 | 30/5/10/0.5/10 | 2458 | 1.343 | 1.52 | 18.3 |
| RD-579-11-PCt-ACt1 | 50/5/10/2/30 | 2008 | 0.905 | 1.21 | 22.2 |

TABLE 16

RD-579 Activated Carbon Electrochemical Testing Performance

| Sample | Gel (Solid/Acid/R:C/ Surfactant/RF) | F/cc | F/g | R2 | −45* (Hz) | Normalized F/cc |
|---|---|---|---|---|---|---|
| RD-579-1-PCt-ACt1 | 30/5/50/2/30 | 14.6 | 127.5 | 4.80 | 0.26 | 14.5 |
| RD-579-5-DTk-ACt1 | 50/20/10/2/10 | 23.7 | 119.8 | 4.82 | 0.07 | 25.9 |

*Frequency response = Frequency as calculated from the Bode plot at a 45° phase angle

Example 13

Variable Process Parameters

In addition to the above process parameters, polymerizations were performed with various surfactants and solvents. For each sample, two separate solutions were prepared. A gel solution was made as described herein, and a continuous phase/surfactant solution was also prepared and the temperature was increased to 85° C. Once the gel solution was done mixing for 10 minutes, it was poured into the continuous phase/surfactant solution and held for 6 hours at 85° C. The sample was then removed and placed in a large beaker to let settle. The excess continuous phase was decanted off and then the remaining material was rinsed with iso-propanol and filtered through a Buchner funnel. Samples conditions are summarized in Table 17. KSP-1 was created to test the emulsion process with mineral oil as the continuous phase.

TABLE 17

Polymerization Conditions for Example 13

| Sample | Gel Formulation (Solids/Acid/R:C) | RF Solution (mL) | Continuous Phase (mL) | Surfactant (type/mL) |
|---|---|---|---|---|
| RD-592-1 | 40/10/10 | 60 | Mineral Oil (200) | SPAN80/1 |
| RD-592-2 | 30/5/50 | 60 | Mineral Oil (200) | SPAN80/4 |
| RD-592-3 | 40/10/10 | 60 | Mineral Oil (200) | SPAN20/1 |
| RD-592-4 | 40/10/10 | 60 | Xylene (200) | SPAN80/1 |
| RD-592-5 | 40/20/10 | 60 | Paraffin Oil (200) | SPAN80/1 |
| KSP-1 | 50/5/10 | 60 | Mineral Oil (200) | SPAN80/4 |

Figure 16:
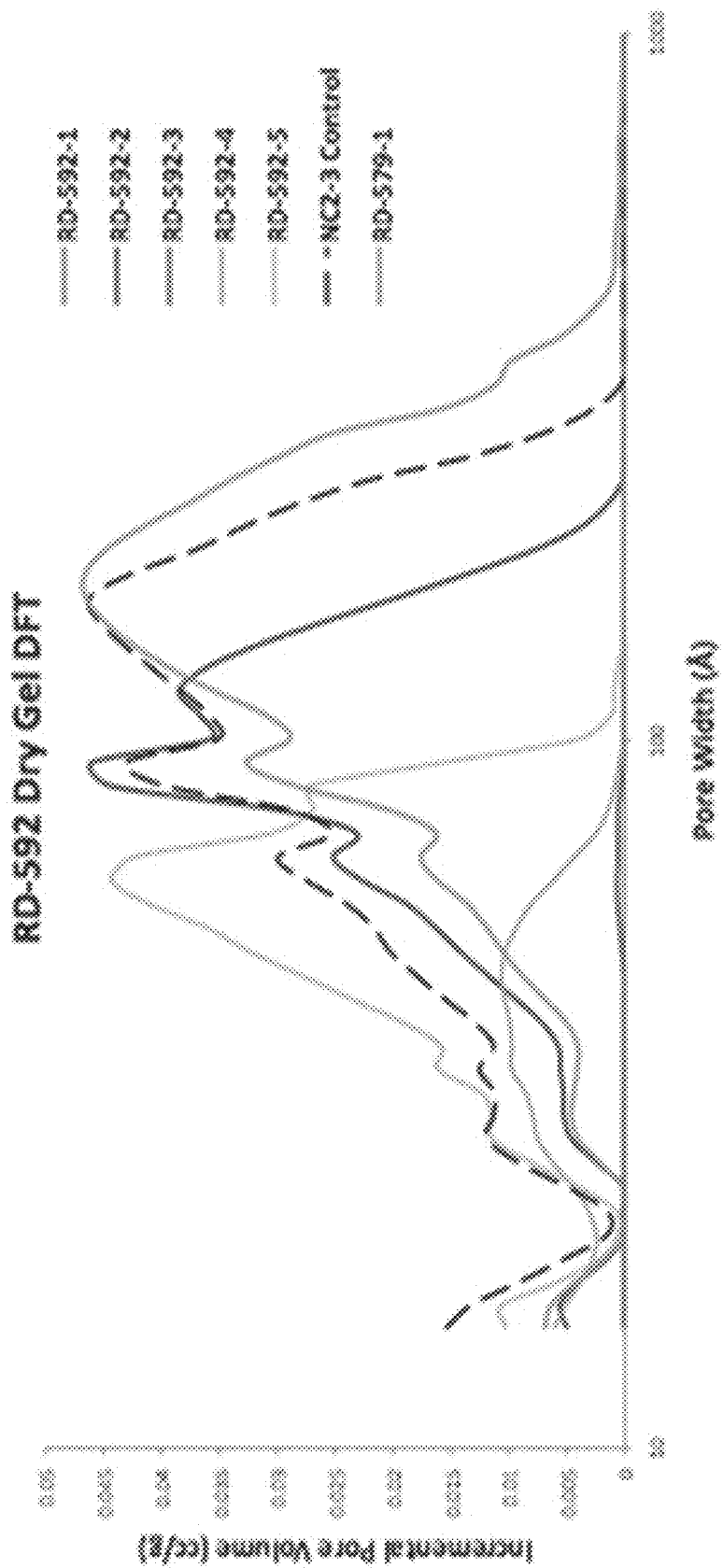
FIG. 16 is a graph of nitrogen absorption isotherms for freeze dried gels.

Nitrogen isotherm, surface area and pore volume data for the dried gel samples from Example 13 are presented in FIG. 16 and in Table 18. Samples RD-592-1 and RD-592-3 were not filtered, but rinsed with IPA and let dry in the hood. While not wishing to be bound by theory, it is thought that this decrease in pore volume is likely due to surfactant in the pores and on the surface of the gel material, and was expected to be burned off during pyrolysis. This theory was supported by the ability to activate the pyrolyzed material to a target surface area, pore volume, and P95/P5 (i.e., ratio of nitrogen sorbed at 95% partial pressure to that sorbed at 5% partial pressure) at a reasonable activation rate. Therefore certain properties of the dried gel may not be predictive of the properties of the final carbon materials.

It is important to note the ability of higher solids (>30%) formulations to produce mesoporous resin in an oil emulsion, which was not seen with the cyclohexane system. Sample RD-592-5 used the microporous monolith formulation, but in the paraffin oil inverse emulsion a mesoporous resin was produced. This may be due to controlled temperature profile of the resin as it cures in the oil. Different continuous phases may allow more or less movement of reagents from one phase to the other, which would contribute to a change in porosity as seen here.

TABLE 19

RD-592 Activated Carbon Surface Area and Pore Volume

| Sample | Gel (Solid/Acid/R:C/Surfactant/RF) | SSA ($m^2/g$) | PV (cc/g) | JRI |
|---|---|---|---|---|
| RD-592-1-PCk-ACt2 | 40/10/10/0.5/30 | 1628 | 0.714 | 1.13 |
| RD-592-2-PCk-ACt2 | 30/5/50/0.5/30 | 1699 | 1.066 | 1.64 |
| RD-592-3-PCk-ACt1 | 40/10/10/0.5/30 | 1686 | 0.758 | 1.19 |
| RD-592-5-PCk-ACt1 | 40/20/10/0.5/30 | 1683 | 0.752 | 1.18 |
| KSP-1-DTk-ACt2 | 50/5/10/3/30 | 2086 | 0.877 | 1.15 |

TABLE 20

RD-592 Activated Carbon Electrochemical Testing Performance

| Sample | Gel (Solid/Acid/R:C/Surfactant/RF) | F/cc | F/g | R2 | −45* (Hz) | Normalized F/cc |
|---|---|---|---|---|---|---|
| RD-592-1-PCk-ACt2 | 40/10/10/0.5/30 | 24.8 | 114.5 | 5.95 | 0.11 | 25.1 |
| RD-592-2-PCk-ACt2 | 30/5/0/0.5/30 | 14.1 | 115.4 | 7.26 | 0.26 | 19.2 |
| KSP-1-DTk-ACt2 | 50/5/10/2/30 | 21.3 | 122.8 | 5.93 | 0.14 | 23.3 |

*Frequency response = Frequency as calculated from the Bode plot at a 45° phase angle

TABLE 18

Dry Gel Surface Area and Pore Volume

| Sample | Gel (Solid/Acid/R:C/Surfactant/RF) | SSA ($m^2/g$) | PV (cc/g) | JRI | Fines (0 = coarse 3 = fine) |
|---|---|---|---|---|---|
| RD-592-1 | 40/10/10/0.5/30 | 0.073 | 0 | 0 | 2 |
| RD-592-2 | 30/5/50/0.5/30 | 260 | 0.642 | 7.39 | 3 |
| RD-592-3 | 40/10/10/0.5/30 | 2.5 | 0.004 | 5.32 | 1 |
| RD-592-4 | 40/10/10/0.5/30 | 241 | 0.211 | 2.58 | 1 |
| RD-592-5 | 40/20/10/0.5/30 | 371 | 0.593 | 4.85 | 1 |

Figure 17:
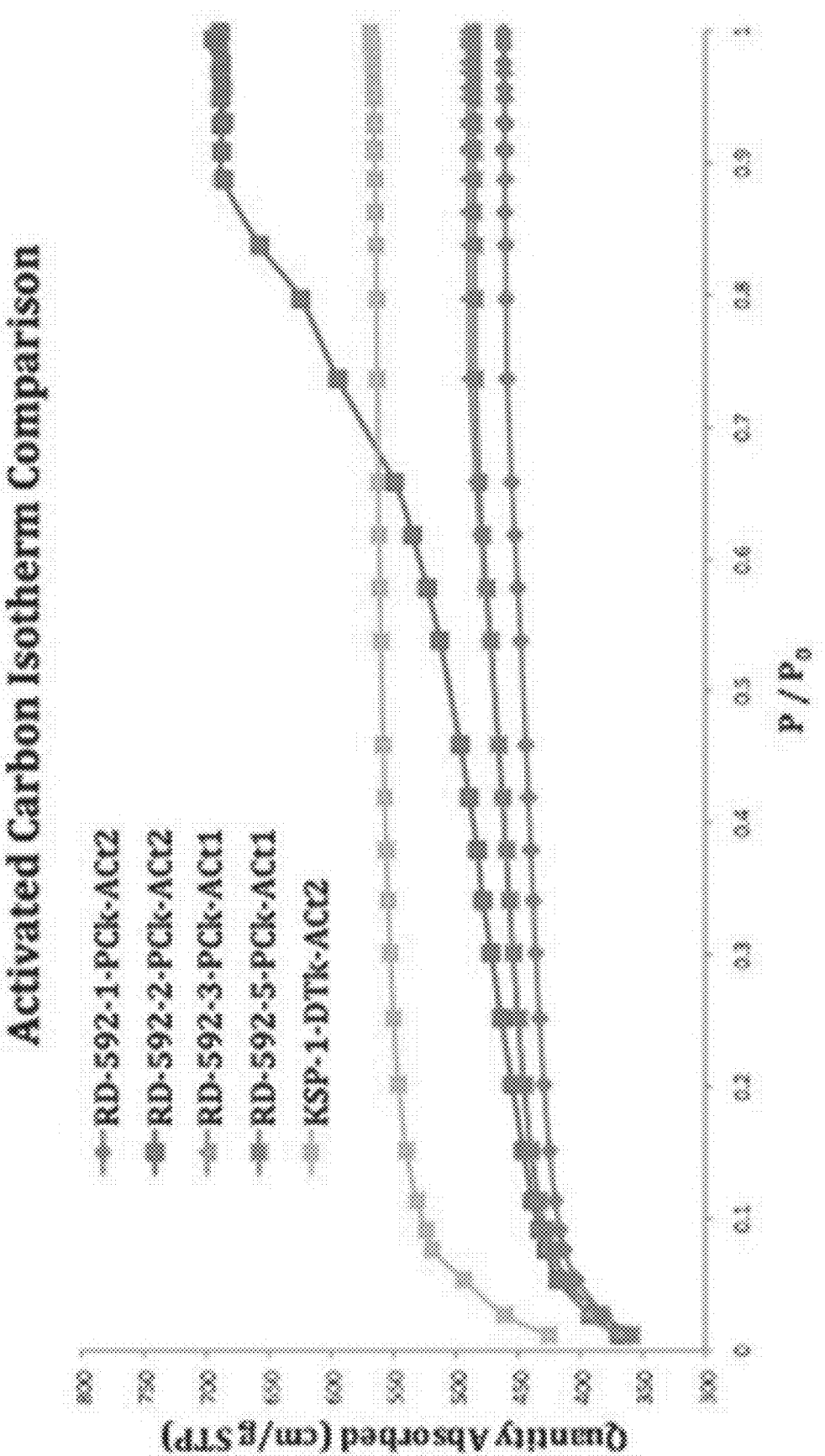
FIG. 17 shows nitrogen absorption isotherms for activated carbon samples.
Figure 18:
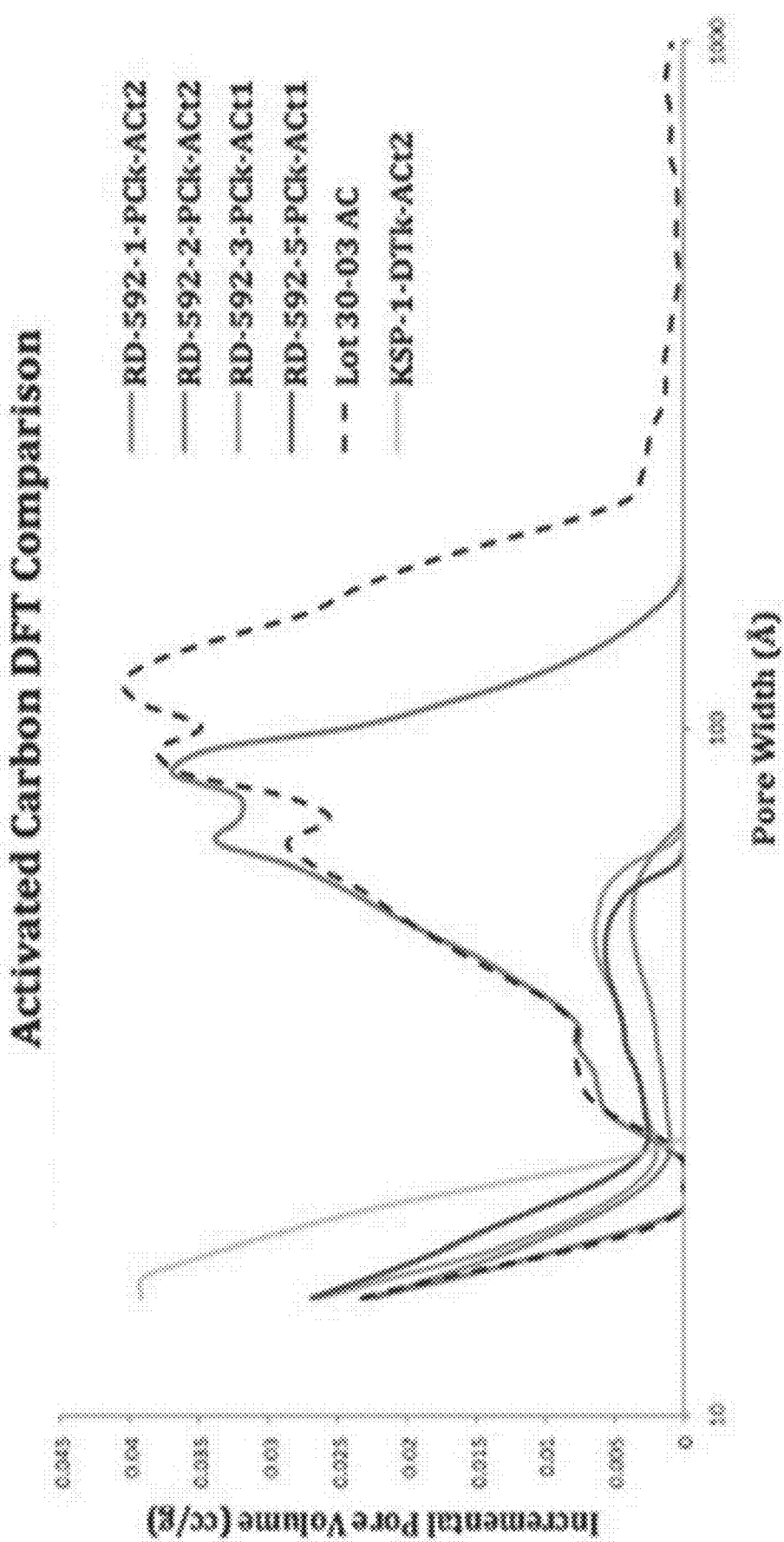
FIG. 18 presents pore size distributions for activated carbons.

Nitrogen isotherm, surface area, pore volume, and ECT data for RD-592 activated carbon samples are presented in FIG. 17 and in Tables 19 & 20. All samples were pyrolyzed at 900° C. in the kiln and held for 60 minutes at temperature using the fast pyrolysis technique. Samples 1 and 5 were pyrolyzed without drying using the DTk technique. All samples were activated at 900° C. in the tube furnaces to achieve a surface area of 1700-1900 $m^2/g$. TGA data was collected to determine activation rates. The isotherm and DFT data (FIGS. 18 & 19) shows the ability to make various carbon materials. With low solids and acid content a mesoporous carbon can be achieved in an oil continuous phase. FIGS. 17 & 18 also show the ability to make carbon with properties of a microporous carbon and a mixed microporous/mesoporous carbon.

ECT performance (Table 20) was measured after Fritsch milling the material for 15 minutes. Sample RD-592-2's ECT data showed adequate performance for a mesoporous carbon compared to current EnerG2's mesoporous product. Sample KSP-1's performance was at the same level as current EnerG2's microporous carbon. RD-592-1 produced a device with exceptional energy density.

Example 14

Preparation of Phenol Formaldehyde Based Gel

Five different gel solutions were made by admixing a phenol and formaldehyde (molar ratio of phenol:formaldehyde=0.5:1) solution with a water/acid solvent. In some cases an ammonium acetate catalyst was added. The ratios of the various gel reagents are indicated in Table 21 for the five samples. The gel solution was allowed to mix for 5-10 minutes before it was poured into the cyclohexane/SPAN80 solution and the temperature was set to 95° C. and held for 3-5 days before the excess continuous phase was decanted. Wet gel samples were pyrolyzed directly at 625° C. for 1 hour with weight loss between 50-75%. Representative carbonization and activation data is presented in Table 22.

TABLE 21

Gel Preparation Parameters

| Sample | Acid type | Phenol-Catalyst (g) | Water-Acid-Formaldehyde[1] | Continuous Phase (mL) | SPAN80 (mL) |
|---|---|---|---|---|---|
| RD-589-1 | acetic | 20-0 | 10-30-27 | Xylenes 200 | 5 |
| RD-589-2 | acetic | 20-0 | 10-30-27 | Parrafin oil 200 | 5 |
| RD-589-3 | Oxalic[2] | 20-1 | 10-2-27 | Xylenes 200 | 5 |
| RD-589-4 | Acetic | 20-0 | 10-30-27 | Parrafin oil 200 | 5 |
| RD-589-5 | Acetic | 20-0 | 10-25-27 | Parrafin oil 200 | 5 |

[1] Added in the form of a 37 wt % aqueous solution
[2] Added in the form of a 5 wt % aqueous solution

TABLE 21

Carbonization and Activation Data

| Sample | Carbonization wt loss (%) | TGA activation rate (% wt loss/min) | Surface Area ($m^2/g$) | Pore Volume (cc/g) | F/cc | F/g | ~45 Hz |
|---|---|---|---|---|---|---|---|
| RD-589-4 | 55 | 0.187 | 2209 | 0.972 | 1/14 | 1/14 | 1/14 |

* Frequency response = Frequency as calculated from the Bode plot at a 45° phase angle

Example 15

Surfactant-Free Emulsion Urea-Formaldehyde Synthesis

Microspheres of polymer gel can also be created through polymerization using an ultra-dilute solution. Polymer gels were prepared using the following general procedure. Urea and formaldehyde (1.6:1) were mixed into deionized water (143:1 water:urea) at room temperature, forming a dilute solution. The solution was mixed for 5 minutes, wherein formic acid is added. After about 30 minutes, the solution turned from clear to milky white, at which point the solution was allowed to sit, undisturbed until a collection of white polymer spheres were formed. In one embodiment, the specific surface area and pore volume as measured by nitrogen sorption for the polymer spheres is about 7.86 $m^2/g$ and about 0.57 $cm^3/g$, respectively. In some embodiments the ratio of urea:formaldehyde, urea:water, quantity of formic acid, dwell and stir time, and base or acid catalyst can be altered to yield a preferred polymer.

Figure 19:
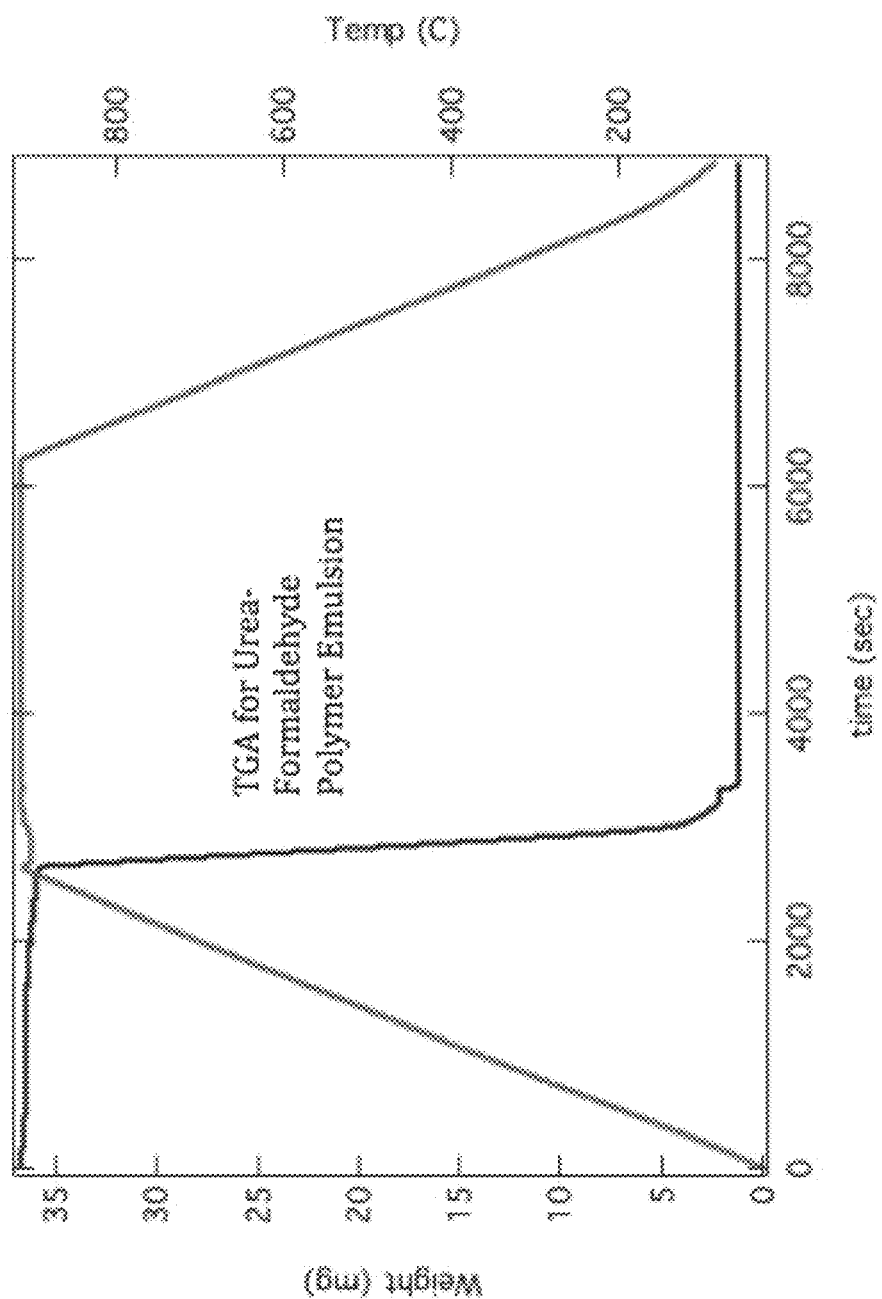
FIG. 19 illustrates TGA data for a urea-formaldehyde emulsion.

Polymers were then pyrolyzed to carbon in a kiln at 900° C., at a ramp rate of 20° C./min, with a dwell time of 1 hour. In one embodiment, the physical properties of the carbon after pyrolysis are a surface area of about 48.3 $m^2/g$ and a pore volume of about 0.036 $cm^3/g$. FIG. 19 shows the TGA for one embodiment of urea-formaldehyde polymer emulsion. Notice there a rapid weight loss >90% occurs at the dwell temperature.

Figure 20:
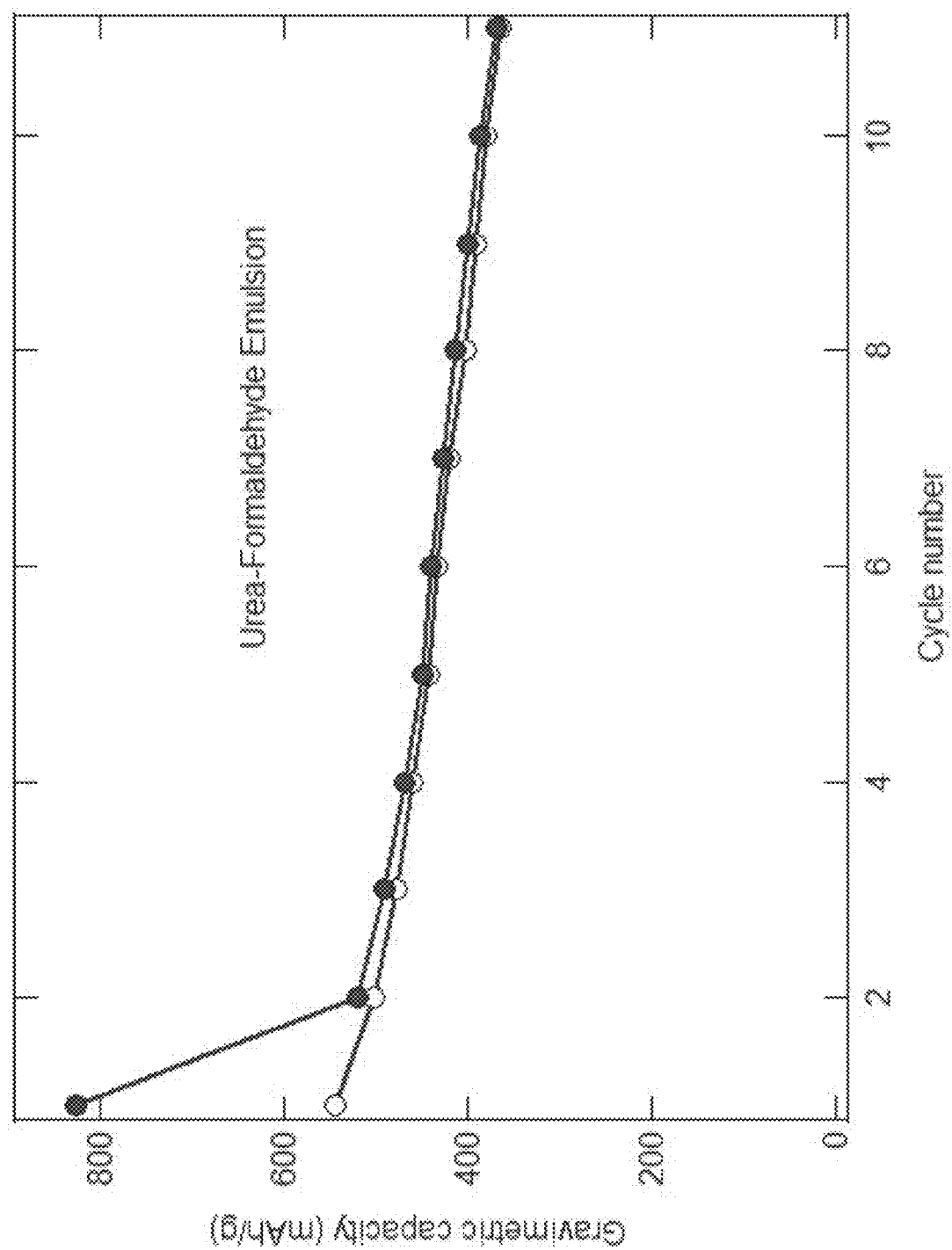
FIG. 20 shows electrochemical performance of a urea-formaldehyde based carbon material.

The carbon was tested in a lithium ion battery as a hard carbon anode material with lithium metal as a counter electrode, 1M $LiPF_6$ in 1:1 ethylene carbon/diethylcarbonate (EC:DEC) as the electrolyte, with a commercial polypropylene separator. In one exemplary embodiment, the electrochemical performance, shown in FIG. 20 with an 88:2:10 (hard carbon:carbon black, PVDF binder) composition, displays high gravimetric capacity (>500 mAh/g).

Example 16

Preparation of Silicon-Carbon Composite

A solution was prepared of resorcinol and formaldehyde (0.5:1 molar ratio) in water and acetic acid (40:1 molar ratio) and ammonium acetate (10:1 molar ratio resorcinol to ammonium acetate). Lastly, 1 molar equivalent (resorcinol to silicon) of micronized (-325 mesh) silicon powder was added to the mixture. The final mixture was stirred for five minutes followed by sonication for 10 minutes. This mixture was poured into a 1:100 by volume solution of SPAN 80 (surfactant) in cyclohexane and heated to 45° C. After five hours the temperature was increased to 65° C. and allowed to stir (covered) for 24 hours. Once the powder settled from solution, the cyclohexane was decanted and the recovered powder was dried at 88° C. for 10 minutes then pyrolyzed at 650° C. in nitrogen flow for 1 hour. The obtained powder had a surface area of 476 m2/g, pore volume of 0.212 $cm^3/g$ and average pore width of 17.8 angstroms.

Figure 21:
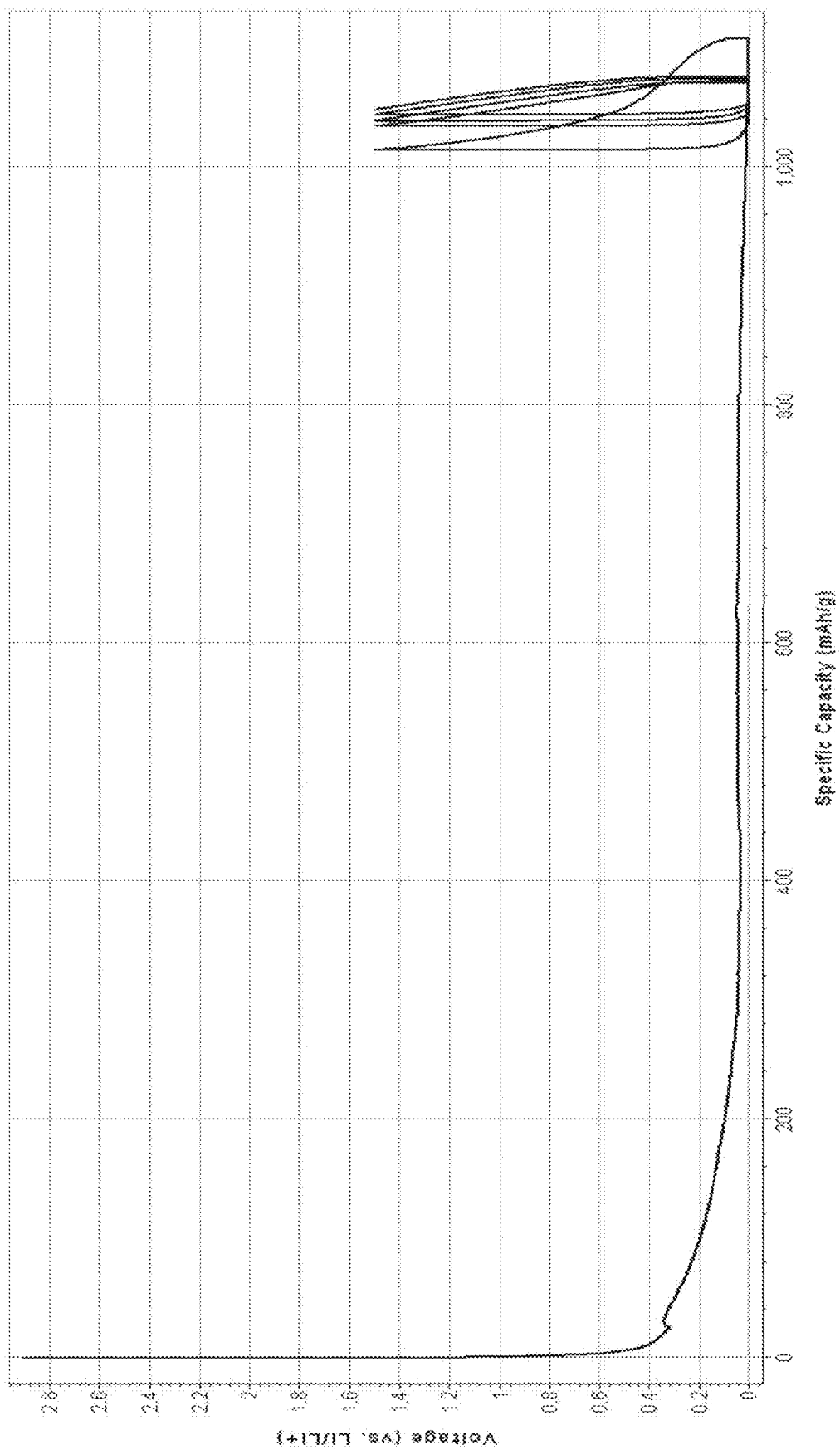
FIG. 21 depicts electrochemical performance of a silicon-carbon composite material.

Voltage vs. specific capacity of the Si—C composite material was tested and results are shown in FIG. 21. Cells were tested using lithium metal as the counter electrode and the working electrode comprised of 88:2:10 by weight Si—C composite material—conductivity enhancer (Super P)—binder (polyvinylidene fluoride). The electrodes were separated by a Rayon 33 micron membrane and the electrolyte was 1M $LiPF_6$ in 1:1 by weight ethylene carbonate-diethylene carbonate. The cells were first discharged to 0.005V at constant current of 40 mA/g and then charged to 2V at the same current.

Example 17

Particle Size Distribution and Shape

Figure 22:
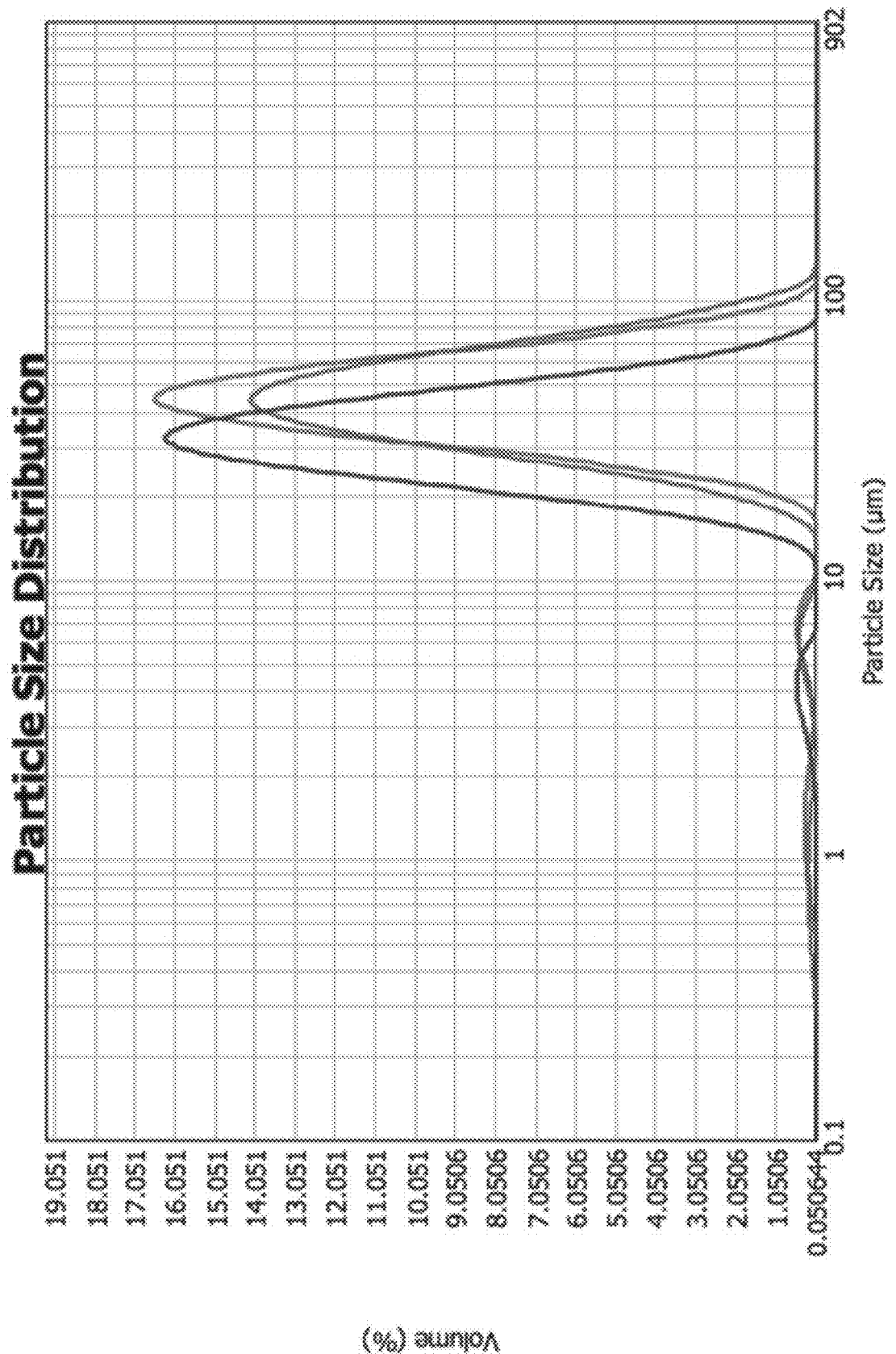
FIG. 22 shows particle size distributions for gels and carbon materials.

Emulsion polymerizations were performed as described above and activated carbon particles prepared. FIG. 22 demonstrates the near monodisperse particle size distribution for wet gel, dry gel and activated carbon particles obtained via emulsion polymerization (RD-507-3 wet gel particles, dry gel particles and activated carbon particles, respectively from left to right). Emulsion formulations and process parameters (e.g., stirring rate, etc.) are modified to control the particle size and extent of mono-dispersity of the resulting products. FIGS. 23A and 23B demonstrate the spherical nature of the gel and carbon particles, respectively. The spherical shape has advantages in certain electrochemical applications where packing of carbon particles affects the electrochemical performance of the device.

Example 18

Exemplary Monolith Preparation of Gels and Carbon Materials

A polymer gel was prepared by polymerization of resorcinol and formaldehyde (0.5:1) in a water/acetic acid solvent (75:25) in the presence of ammonium acetate catalyst. The resorcinol to solvent ration (R/S) was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. The sieved particles were flash frozen by immersion in liquid nitrogen, loaded into a lyophilization tray at a loading of 3 to 7 $g/in^2$, and lyophilized at approximately 50 mTorr. The time to dry (as inferred from time for product to reach within 2° C. of shelf temperature) varied with product loading on the lyophilizer shelf.

Other monolith gels and carbon materials are prepared according to the above general procedures. Modifications to the procedure, including different gel formulations and/or no freeze drying are also used.

Example 19

General Testing of Electrochemical Properties

The carbon samples were analyzed for their electrochemical performance, specifically as an electrode material in EDLC coin cell devices. Specific details regarding fabrication of electrodes, EDLCs and their testing are described below.

Capacitor electrodes comprised about 97 parts by weight carbon particles (average particle size 5-15 microns) and about 3 parts by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

When complete, the capacitor was ready for electrical testing with a potentiostat/function generator/frequency response analyzer. Capacitance was measured by a constant current discharge method, comprising applying a current pulse for a known duration and measuring the resulting voltage profile. By choosing a given time and ending voltage, the capacitance was calculated from the following $C=It/\Delta V$, where C=capacitance, I=current, t=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported for discharge between 2.43 and 1.89V.

Example 20

Electrochemical Stability of the Carbons

The follow example illustrates how the electrochemical stability can be measured. (physicochemical properties of one of the test carbons is described in the table below).

| Test | | Result |
|---|---|---|
| Particle Size | Dv, 100 | 20.6 um |
| | Dv, 99 | 17.6 um |
| | Dv, 50 | 7.4 um |
| | Dv, 1 | 1.1 um |
| Tap Density | | 0.52 g/cm3 |
| Specific Surface Area | | 1709 m2/g |
| Total Pore Volume | | 0.710 cm3/g |
| GM (SSA/PV) | | 0.710 cm3/g |
| PIXE (Purity Analysis) | | Calcium = 4.664 ppm |
| | | Iron = 2.512 ppm |
| | | Nickel = 1.345 ppm |
| | | All other elements not detected |

In this case, the electrochemical performance was measured in terms of capacitance retention after exposure to high temperature at voltage hold. Specifically, this carbon was processed at pilot scale into electrodes produced via aqueous slurry processing of a 95:5:3 carbon:carbon black:styrene-butadiene copolymer mixture according to methods known in the art, and the electrodes were assembled into 100 F electric double layer capacitors with 1 M tetraethylammonium tetrafluoroborate in acetonitrile solvent employing methods known in the art. The ultracapacitors were subjected to incubation at 85 C and held under a voltage of 2.85 V. Following incubation at this condition for 32 hours, this device was cooled to room temperature within 1 hour and measured for its capacitance retention. The capacitance retention was found to retain 91.2% of the original capacitance, compared to a control case for a 100 F commercially available ultracapacitor produced from a commercial carbon which was found under the same conditions to exhibit a maximum theoretical capacitance of 19.9 F/cc, corresponding to 90.4% of its original capacitance.

Based on the above data, and without being bound by theory, the techniques described herein to produce carbon with a maximum theoretical capacitance of greater than 26 F/cc would result in a carbon with greater than 23.7 F/cc after 32 hour exposure to 2.85 V hold and 85 C. Additionally, the techniques described herein to produce carbon with a maximum theoretical capacitance of greater than 27 F/cc would result in a carbon with greater than 24.6 F/cc after 32 hour exposure to 2.85 V hold and 85 C.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery electrode composition comprising a plurality of composite particles having an average particle size, Dv,50, of less than 1 mm and wherein individual composite particles comprise:
   (a) a carbon material comprising:
      (i) a pore structure having micropores and mesopores,
      (ii) a maximum theoretical capacitance greater than 25 $F/cm^3$ as measured at a current density of 0.5 Amp/g employing an electrolyte comprising tetraethylammonium tetrafluoroborane in acetonitrile,
      (iii) a BET specific surface area of at least 500 $m^2/g$, and
      (iv) less than 500 ppm of all atoms having a molecular weight between 11 and 92, as measured by photon induced x-ray emissions; and
   (b) an electrochemical modifier incorporated within the pore structure of the carbon material, wherein the electrochemical modifier comprises silicon in elemental form.

2. The battery electrode composition of claim 1, wherein the carbon material further comprises a total pore volume of at least 0.5 cc/g.

3. The battery electrode composition of claim 1, wherein the carbon material is electrically conductive.

4. The battery electrode composition of claim 1, wherein a content of the electrochemical modifier in the composite particles is at least 25% to 95% weight percent.

5. The battery electrode composition of claim 1, wherein the carbon material further comprises at least 0.1 cc/g of pores with a pore size greater than 20 Angstroms.

6. The battery electrode composition of claim 1, wherein the composite particles further comprise greater than 100 ppm of the electrochemical modifier.

7. The battery electrode composition of claim 1, wherein the carbon material further comprises a peak pore volume ranging from 2 to 100 nm.

8. The battery electrode of claim 1, wherein the carbon material further comprises a BET specific surface area of at least 1000 $m^2/g$.

9. The battery electrode of claim 1, wherein the carbon material further comprises a tap density of at least 0.3 g/cc.

10. A battery, comprising an anode and cathode, wherein the anode comprises the battery electrode composition of claim 1.

11. A battery electrode composition comprising a plurality of composite particles having an average particle size, Dv,50, of less than 1 mm and wherein individual composite particles comprise:
    (a) a carbon material comprising:
       (i) a pore structure having micropores and mesopores,
       (ii) a maximum theoretical capacitance greater than 25 $F/cm^3$ as measured at a current density of 0.5 Amp/g employing an electrolyte comprising tetraethylammonium tetrafluoroborane in acetonitrile,
       (iii). a total pore volume of at least 0.7 $cm^3/g$, and
       (iv) less than 500 ppm of all atoms having a molecular weight between 11 and 92, as measured by photon induced x-ray emissions; and
    (b) an electrochemical modifier incorporated within the pore structure of the carbon material, and wherein the electrochemical modifier comprises silicon in elemental form.

12. The battery electrode composition of claim 11, wherein the carbon material comprises a total pore volume of at least 0.9 $cm^3/g$.

13. The battery electrode composition of claim 11, wherein the carbon material is electrically conductive.

14. The battery electrode composition of claim 11, wherein a content of the electrochemical modifier in the composite particles is at least 25% to 95% weight percent.

15. The battery electrode composition of claim 11, wherein the carbon material further comprises at least 0.1 cc/g of pores with a pore size greater than 20 Angstroms.

16. The battery electrode composition of claim 11, wherein the composite particles further comprise greater than 100 ppm of the electrochemical modifier.

17. The battery electrode composition of claim 11, wherein the carbon material further comprises a peak pore volume ranging from 2 to 100 nm.

18. The battery electrode of claim 11, wherein the carbon material further comprises a BET specific surface area of at least 400 $m^2/g$.

19. The battery electrode of claim 11, wherein the carbon material further comprises a tap density of at least 0.3 g/cc.

20. A battery comprising an anode and cathode, wherein the anode comprises the battery electrode composition of claim 11.

* * * * *

UNITED STATES PATENT AND TRADEMARK OFFICE
CERTIFICATE OF CORRECTION

| | |
|---|---|
| PATENT NO. | : 11,732,079 B2 |
| APPLICATION NO. | : 17/887296 |
| DATED | : August 22, 2023 |
| INVENTOR(S) | : Katharine Geramita et al. |

It is certified that error appears in the above-identified patent and that said Letters Patent is hereby corrected as shown below:

In the Specification

Column 6, Lines 7-8:
"tetraethylammonium tetrafluoroborane" should be "tetraethylammonium tetrafluoroborate".

Column 6, Line 21:
"tetraethylammonium tetrafluoroborane" should be "tetraethylammonium tetrafluoroborate".

Signed and Sealed this
Nineteenth Day of September, 2023

*Katherine Kelly Vidal*

Katherine Kelly Vidal
*Director of the United States Patent and Trademark Office*